(12) United States Patent
Shmueli et al.

(10) Patent No.: US 11,531,671 B2
(45) Date of Patent: Dec. 20, 2022

(54) ESTIMATING QUERY CARDINALITY

(71) Applicant: TECHNION RESEARCH & DEVELOPMENT FOUNDATION LIMITED, Haifa (IL)

(72) Inventors: Oded Shmueli, Nofit (IL); Rojeh Hayek, Nazareth (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 102 days.

(21) Appl. No.: 16/997,126

(22) Filed: Aug. 19, 2020

(65) Prior Publication Data

US 2021/0056108 A1 Feb. 25, 2021

Related U.S. Application Data

(60) Provisional application No. 62/888,624, filed on Aug. 19, 2019.

(51) Int. Cl.
*G06F 16/2453* (2019.01)
*G06N 5/04* (2006.01)
*G06N 20/00* (2019.01)
*G06F 16/2455* (2019.01)

(52) U.S. Cl.
CPC .. *G06F 16/24545* (2019.01); *G06F 16/24556* (2019.01); *G06N 5/04* (2013.01); *G06N 20/00* (2019.01)

(58) Field of Classification Search
CPC ........ G06F 16/24545; G06F 16/24556; G06N 5/04; G06N 20/00
See application file for complete search history.

(56) References Cited

U.S. PATENT DOCUMENTS

| | | | |
|---|---|---|---|
| 2010/0082599 A1* | 4/2010 | Graefe | G06F 16/217 707/E17.014 |
| 2019/0005044 A1* | 1/2019 | Bell | G06F 16/24578 |
| 2019/0303475 A1* | 10/2019 | Jindal | G06N 5/003 |
| 2020/0065413 A1* | 2/2020 | Sakamuri | G06F 7/24 |
| 2020/0089684 A1* | 3/2020 | Gotmanov | G06F 16/953 |
| 2020/0125568 A1* | 4/2020 | Idicula | G06N 3/0454 |
| 2020/0379963 A1* | 12/2020 | Lopes | G06F 11/3419 |

OTHER PUBLICATIONS

Hayek, R., & Shmueli, O. (2020). Nn-based transformation of any sql cardinality estimator for handling distinct, and, or and not. arXiv preprint arXiv:2004.07009.

(Continued)

*Primary Examiner* — Dangelino N Gortayo
(74) *Attorney, Agent, or Firm* — The Roy Gross Law Firm, LLC; Roy Gross

(57) ABSTRACT

A method comprising: receiving a plurality of pairs of queries associated with a database, wherein the queries in each pair in the plurality of pairs of queries have an identical FROM clause; at a training stage, training a machine learning model on a training set comprising: (i) the plurality of pairs of queries, and (ii) labels associated with containment rates between each of the pairs of queries over the database; and at an inference stage, applying the trained machine learning model to a pair of target queries, to estimate containment rates between the target pair of queries over the database.

17 Claims, 31 Drawing Sheets

(56) References Cited

OTHER PUBLICATIONS

PostgreSQL, The World's Most Advanced Open Source Relational Database, https://www.postgresql.org/.

Abadi, M., Barham, P., Chen, J., Chen, Z., Davis, A., Dean, J., & Zheng, X. (2016). {TensorFlow}: A System for {Large-Scale} Machine Learning. In 12th USENIX symposium on operating systems design and implementation (OSDI 16) (pp. 265-283).

Abiteboul, Serge & Hull, Richard & Vianu, Victor. (1995). Foundations of Databases. ISBN: 0-201-53771-0; Addison-Wesley.

Bressan, M., Peserico, E., & Pretto, L. (2015). Simple set cardinality estimation through random sampling. arXiv preprint arXiv:1512.07901.

W. Cai, M. Balazinska, & D. Suciu. 2019. Pessimistic Cardinality Estimation: Tighter Upper Bounds for Intermediate Join Cardinalities. In Proceedings of the 2019 International Conference on Management of Data (SIGMOD '19). Association for Computing Machinery, New York, NY, USA, 18-35. DOI:https://doi.org/10.1145/3299869.3319894.

A. K. Chandra and P. M. Merlin. 1977. Optimal implementation of conjunctive queries in relational data bases. In Proceedings of the ninth annual ACM symposium on Theory of computing (STOC '77). Association for Computing Machinery, New York, NY, USA, 77-90. DOI:https://doi.org/10.1145/800105.803397.

P. J. Haas, J. F. Naughton, S. Seshadri, and L. Stokes. 1995. Sampling-Based Estimation of the Number of Distinct Values of an Attribute. In Proceedings of the 21th International Conference on Very Large Data Bases (VLDB '95). Morgan Kaufmann Publishers Inc., San Francisco, CA, USA, 311-322.

Hayek, R., & Shmueli, O. (2019). Improved cardinality estimation by learning queries containment rates. arXiv preprint arXiv:1908.07723.

David S. Johnson and Anthony C. Klug. 1984. Testing Containment of Conjunctive Queries under Functional and Inclusion Dependencies. J. Comput. Syst. Sci. 28, 1 (1984), 167-189. https://doi.org/10.1016/0022-0000(84)90081-3.

Kingma, D. P., & Ba, J. (2014). Adam: A method for stochastic optimization. arXiv preprint arXiv:1412.6980.

Kipf, A., Kipf, T., Radke, B., Leis, V., Boncz, P., & Kemper, A. (2018). Learned cardinalities: Estimating correlated joins with deep learning. arXiv preprint arXiv:1809.00677.

Kipf, A., Vorona, D., Müller, J., Kipf, T., Radke, B., Leis, V., & Kemper, A. (Jun. 2019). Estimating cardinalities with deep sketches. In Proceedings of the 2019 International Conference on Management of Data (pp. 1937-1940).

Kraska, T., Beutel, A., Chi, E. H., Dean, J., & Polyzotis, N. (May 2018). The case for learned index structures. In Proceedings of the 2018 international conference on management of data (pp. 489-504). https://doi.org/10.1145/3183713.3196909.

Krishnan, S., Yang, Z., Goldberg, K., Hellerstein, J., & Stoica, I. (2018). Learning to optimize join queries with deep reinforcement learning. arXiv preprint arXiv:1808.03196.

V. Leis, A. Gubichev, A. Mirchev, P. Boncz, A. Kemper, and T. Neumann. 2015. How good are query optimizers, really? Proc. VLDB Endow. 9, 3 (Nov. 2015), 204-215. DOI:https://doi.org/10.14778/2850583.2850594.

Leis, V., Radke, B., Gubichev, A., Kemper, A., & Neumann, T. (2017). Cardinality Estimation Done Right: Index-Based Join Sampling. CIDR. Available online at: https://www.cidrdb.org/cidr2017/papers/p9-leis-cidr17.pdf.

Leis, V., Radke, B., Gubichev, A., Mirchev, A., Boncz, P.A., Kemper, A., & Neumann, T. (2017). Query optimization through the looking glass, and what we found running the Join Order Benchmark. The VLDB Journal, 27, 643-668. https://doi.org/10.1007/s00778-017-0480-7.

Marcus, R., & Papaemmanouil, O. (Jun. 2018). Deep reinforcement learning for join order enumeration. In Proceedings of the First International Workshop on Exploiting Artificial Intelligence Techniques for Data Management (pp. 1-4). arXiv:1803.00055.

G. Moerkotte, T. Neumann, and G. Steidl. 2009. Preventing bad plans by bounding the impact of cardinality estimation errors. Proc. VLDB Endow. 2, 1 (Aug. 2009), 982-993. DOI:https://doi.org/10.14778/1687627.1687738.

Raghunath Nambiar and Meikel Poess (Eds.). 2018. TPCTC. Lecture Notes in Computer Science, vol. 10661. Springer. https://doi.org/10.1007/978-3-030-11404-6.

Nwankpa, C., Ijomah, W., Gachagan, A., & Marshall, S. (2018). Activation functions: Comparison of trends in practice and research for deep learning. arXiv preprint arXiv:1811.03378.

F. Olken and D. Rotem. 1990. Random sampling from database files: a survey. In Proceedings of the fifth international conference on Statistical and scientific database management (SSDBM V). Springer-Verlag, Berlin, Heidelberg, 92-111.

Ortiz, J., Balazinska, M., Gehrke, J., & Keerthi, S. S. (Jun. 2018). Learning state representations for query optimization with deep reinforcement learning. In Proceedings of the Second Workshop on Data Management for End-To-End Machine Learning (pp. 1-4). https://doi.org/10.1145/3209889.3209890.

Prechelt L. (2012) Early Stopping—But When?. In: Montavon G., Orr G.B., Müller KR. (eds) Neural Networks: Tricks of the Trade. Lecture Notes in Computer Science, vol. 7700. Springer, Berlin, Heidelberg. https://doi.org/10.1007/978-3-642-35289-8_5.

Y. Sagiv and M. Yannakakis. 1980. Equivalences Among Relational Expressions with the Union and Difference Operators. J. ACM 27, 4 (Oct. 1980), 633-655. DOI:https://doi.org/10.1145/322217.322221.

Selinger, P.G., Astrahan, M.M., Chamberlin, D.D., Lorie, R.A., & Price, T.G. (1979). Access path selection in a relational database management system. SIGMOD '79.

Kyu-Young Whang, Brad T. Vander Zanden, and Howard M. Taylor. 1990. A Linear-Time Probabilistic Counting Algorithm for Database Applications. ACM Trans. Database Syst. 15, 2 (1990), 208-229. https://doi.org/10.1145/78922.78925.

Eldon Whitesitt. 1961. Boolean algebra and its applications. Courier Corporation.

L. Woltmann, C. Hartmann, M. Thiele, D. Habich, and W. Lehner. 2019. Cardinality estimation with local deep learning models. In Proceedings of the Second International Workshop on Exploiting Artificial Intelligence Techniques for Data Management (aiDM '19). Association for Computing Machinery, New York, NY, USA, Article 5, 1-8. DOI:https://doi.org/10.1145/3329859.3329875.

A. V. Aho, Y. Sagiv, and J. D. Ullman. Equivalences among relational expressions. SIAM J. Comput., 8(2):218{246, 1979.

G. Aurelien. Hands-on machine learning with Scikit-Leam and TensorFlow : concepts, tools, and techniques to build intelligent systems. O'Reilly Media.

D. Bogdanova, C. N. dos Santos, L. Barbosa, and B. Zadrozny. Detecting semantically equivalent questions in online user forums. In Proceedings the 19th Conference on Computational Natural Language Learning, CoNLL, pp. 123-131, 2015. DOI: 10.18653/v1/K15-1013.

Bowman, S. R., Gauthier, J., Rastogi, A., Gupta, R., Manning, C. D., & Potts, C. (2016). A fast unified model for parsing and sentence understanding. arXiv preprint arXiv:1603.06021.

J. Brownlee. When to use mlp, cnn, and mn neural networks, https://machinelearningmastery.com/when-to-use-mlp-cnn-and-mn-neural-networks/, 2018.

A. Cali. Containment the conjunctive queries over conceptual schemata. In Proceedings the Database Systems for Advanced Applications conference, DASFAA, pp. 628-643, 2006.

E. P. F. Chan. 1992. Containment and minimization of positive conjunctive queries in OODB's. In Proceedings of the eleventh ACM SIGACT-SIGMOD-SIGART symposium on Principles of database systems (PODS '92). Association for Computing Machinery, New York, NY, USA, 202-211. DOI:https://doi.org/10.1145/137097.137869.

Chatzopoulou, Gloria & Eirinaki, Magdalini & Polyzotis, Neoklis. (2009). Query Recommendations for Interactive Database Exploration. Mar. 2018. DOI: 10.1007/978-3-642-02279-1_2.

Chekuri, C., & Rajaraman, A. (2000). Conjunctive query containment revisited. Theoretical Computer Science, 239(2), 211-229. https://doi.org/10.1016/S0304-3975(99)00220-0.

(56) References Cited

OTHER PUBLICATIONS

Chung, J., Gulcehre, C., Cho, K., & Bengio, Y. (2014). Empirical evaluation of gated recurrent neural networks on sequence modeling. arXiv preprint arXiv:1412.3555.

M. Eirinaki, S. Abraham, N. Polyzotis, and N. Shaikh. Querie: Collaborative database exploration. IEEE Trans. Knowl. Data Eng., 26(7):1778-1790, 2014. DOI:10.1109/TKDE.2013.79.

Farré, Nutt, W., Teniente, E., & Urpí, T. (2006). Containment of Conjunctive Queries over Databases with Null Values. Database Theory—ICDT 2007, 389-403. https://doi.org/10.1007/11965893_27.

A. Ganapathi, H. A. Kuno, U. Dayal, J. L. Wiener, A. Fox, M. I. Jordan, and D. A. Patterson. Predicting multiple metrics for queries: Better decisions enabled by machine learning. In Proceedings ICDE, pp. 592-603, 2009.

Kirkpatrick, J., Pascanu, R., Rabinowitz, N., Veness, J., Desjardins, G., Rusu, A. A., & Hadsell, R. (2017). Overcoming catastrophic forgetting in neural networks. Proceedings of the national academy of sciences, 114(13), 3521-3526. https://doi.org/10.1073/pnas.1611835114.

M. S. Lakshmi and S. Zhou. Selectivity estimation in extensible databases—A neural network approach. In Proceedings VLDB'98, pp. 623-627, 1998.

Li, J., König, A. C., Narasayya, V., & Chaudhuri, S. (2012). Robust estimation of resource consumption for sql queries using statistical techniques. arXiv preprint arXiv:1208.0278.

G. Lohman. Is query optimization a solved problem? https://wp.sigmod.org/?p=1075, 2014.

M. A. Nielsen. Neural Networks and Deep Learning. Determination Press, 2017.

G. Rull, P. A. Bernstein, I. G. dos Santos, Y. Katsis, S. Melnik, and E. Teniente. Query containment in entity SQL. In Proceedings ACM SIGMOD, pp. 1169-1172, 2013.

Y. Saraiya. Subtree elimination algorithms in deductive databases. PhD thesis, Department of Computer Science, Stanford University., 1991.

Y. P. Saraiya. 1990. Polynomial-time program transformations in deductive databases. In Proceedings of the ninth ACM SIGACT-SIGMOD-SIGART symposium on Principles of database systems (PODS '90). Association for Computing Machinery, New York, NY, USA, 132-144. DOI:https://doi.org/10.1145/298514.298551.

Zhang, W.E., Sheng, Q.Z., Qin, Y. et al. Learning-based SPARQL query performance modeling and prediction. World Wide Web 21, 1015-1035 (2018). https://doi.org/10.1007/s11280-017-0498-1.

Brian A. Davey and Hilary A. Priestley. 1990. Introduction to Lattices and Order, Second Edition. Cambridge University Press.

H. Liu, M. Xu, Z. Yu, V. Corvinelli, and C. Zuzarte. Cardinality estimation using neural networks. In Proceedings the 25th Annual International Conference on Computer Science and Software Engineering, CASCON, pp. 53-59, 2015.

Cristina Sirangelo. 2018. Positive Relational Algebra. In Encyclopedia of Database Systems, Second Edition.

I. J. Goodfellow, Y. Bengio, and A. C. Courville. Deep Learning. Adaptive computation and machine learning. MIT Press, 2016. http://www.deeplearningbook.org.

\* cited by examiner

SELECT * FROM title t, movie_companies mc WHERE t.id = mc.movie_id AND t.production_year > 2013 AND mc.company_id = 8

Set T: {[010000...0], [000100...0]} Set J: {[0...01000..0 00010...0 ...0]} Set P: {[0...00100..0 100 0.94], [0...00001..0 010 0.31]}

T-seg Rest T-seg Rest     J1-seg J2-seg Rest     C-seg O-seg V-seg Rest C-seg O-seg V-seg

FIG. 2

EstimateCardinality(Query $Q_{new}$, Queries Pool $QP$):
    $results$ = empty list For every pair $(Q_{old}, |Q_{old}|)$ in $QP$:
        if $Q_{old}$'s FROM clause $\neq Q_{new}$'s FROM clause:
            continue
        Calculate $x\_rate = Q_{old} \, C_\% \, Q_{new}$
        Calculate $y\_rate = Q_{new} \, C_\% \, Q_{old}$
        if $y\_rate <=$ $epsilon$: /* y equals zero */
            continue
        $results$.append($x\_rate/y\_rate * |Q_{old}|$)

return F($results$)

FIG. 8

```
GenCrdRec(DNF_list):
    if len(DNF_list) == 1:
        if ImplyFalse(DNF_list[0]):
            return 0
        return CardinalityEstimation(DNF_list[0])
    else:
        first_cnj_q = [DNF_list[0]]
        smaller_list = DNF_list[1:end]
        updated_list = [q ∩ first_cnj_q For q in smaller_list]
        return GenCrdRec(first_cnj_q)
            + GenCrdRec(smaller_list)
            - GenCrdRec(updated_list)

GenCrd(Q):
    return GenCrdRec(GetDNFlist(Q))
```

FIG. 13

Q: SELECT * FROM title t, movie_companies mc WHERE t.id = mc.movie_id AND
   (((mc.company_id = 8 AND NOT t.production_year <= 2013 ) OR t.production_year = 2010 OR t.production_year = 2000)

Q1: SELECT * FROM title t, movie_companies mc WHERE t.id = mc.movie_id AND t.production_year > 2013 AND mc.company_id = 8

Q2: SELECT * FROM title t, movie_companies mc WHERE t.id = mc.movie_id AND t.production_year = 2010

Q3: SELECT * FROM title t, movie_companies mc WHERE t.id = mc.movie_id AND t.production_year = 2000

$|Q| = |Q1| + |Q2| + |Q3| - |Q1 \cap Q2| - |Q1 \cap Q3| - |Q2 \cap Q3|^* + |Q1 \cap Q2 \cap Q3|^*$

FIG. 14

```
ImplyFalse(Query Q):
    minVals = { [col]:-∞ for all the columns used in query Q}
    maxVals = { [col]:∞ for all the columns used in query Q}
    exactVals = { [col]:⊥ for all the columns used in query Q}
    For-each join clause (col1,=,col2) in Q:
        UnionClasses(col1,col2)

For-each column predicate (col,op,val) in Q:
        if op == '>':
            minVals[col] = Max(val, minVals[col])
        if op == '<':
            maxVals[col] = Min(val, maxVals[col])
        if op == '=':
            if exactVals[col] , ⊥ and exactVals[col] , val:
                return True
            exactVals[col] = val
    For-each col in all the columns used in query Q:
        if maxVals[col] ≤ minVals[col]:
            return True
    if exactVals[col] , ⊥ and not
        minVals[col] ≤ exactVals[col] ≤ maxVals[col]:
        return True
    return False
```

FIG. 15

SELECT t.name FROM title t, movie_companies mc WHERE t.id = mc.movie_id AND t.production_year > 2013 AND mc.company_id = 8

Set A: {[0001.0 ...0]} Set T: {[0...01000...0], [000100 ...0]} Set J: {[0...01000...0 00010...0 ...0]} Set P: {[0...00100...0 100 0.94], [0...00001.0 010 0.31]}

A-seg  Rest    T-seg  Rest   Y-seg    Rest    J1-seg    J2-seg    Rest    T-seg    C-seg  D-seg V-seg    Rest    C-seg    O-seg  V-seg

FIG. 18

```
GenCrdRec(DNF_list):
   if len(DNF_list) == 1:
      if ImplyFalse(DNF_list[0]):
         return 0
      return Cardinality(DNF_list[0])
   else:
      cnj_q = [DNF_list[0]]
      smaller_list = DNF_list[1:end]
      updated_list = [q ∩ cnj_q For q in smaller_list ]
      return GenCrdRec(cnj_q)
         + GenCrdRec(smaller_list)
         - GenCrdRec(updated_list)

GenCrd(Q):
   return GenCrdRec(GetDNFlist(Q))
```

FIG. 24

Q: SELECT * FROM title t, movie_companies mc WHERE t.id = mc.movie_id AND ((mc.company_id = 8 AND NOT t.production_year <= 2013 ) OR t.production_year = 2010 OR t.production_year = 2000)

Q1: SELECT * FROM title t, movie_companies mc WHERE t.id = mc.movie_id AND t.production_year > 2013 AND mc.company_id = 8

Q2: SELECT * FROM title t, movie_companies mc WHERE t.id = mc.movie_id AND t.production_year = 2010

Q3: SELECT * FROM title t, movie_companies mc WHERE t.id = mc.movie_id AND t.production_year = 2000

$|Q| = |Q1| + |Q2| - |Q1 \cap Q2| + |Q3| - |Q1 \cap Q3|^* - |Q2 \cap Q3|^* + |Q1 \cap Q2 \cap Q3|^*$

FIG. 25

ImplyFalse(Query Q):
    minVals = { [col]: -∞ | col is a column used in Q}
    maxVals = { [col]: ∞ | col is a column used in Q}
    exactVals = { [col]: ⊥ | col is a column used in Q}

For-each join clause (col1,=,col2) in Q:
        UnionClasses(col1,col2)

For-each column predicate (col,op,val) in Q:
        if op == '>':
            minVals[col] = Max(val, minVals[col])
        if op == '<':
            maxVals[col] = Min(val, maxVals[col])
        if op == '=':
            if exactVals[col] ≠ ⊥ *and* exactVals[col] ≠ val:
                return True
            exactVals[col] = val For-each col in all the columns used in Q:
        if maxVals[col] ≤ minVals[col]:
            return True if exactVals[col] ≠ ⊥ *and not*
            minVals[col] ≤ exactVals[col] ≤ maxVals[col]:
            return True return False

FIG. 26

ESTIMATING QUERY CARDINALITY

CROSS REFERENCE TO RELATED APPLICATIONS

This application claims the benefit of priority under 35 U.S.C. § 119(e) of U.S. Provisional Patent Application No. 62/888,624, filed on Aug. 19, 2019. The contents of the above applications are all incorporated by reference as if fully set forth herein in their entirety.

FIELD OF THE INVENTION

The invention relates generally to the field of machine learning.

BACKGROUND OF THE INVENTION

Computer systems incorporating Relational Database Management System software using a Structured Query Language (SQL) interface are well known. SQL queries, with AND, OR, and NOT operators, constitute a broad class of frequently used queries. Estimating the cardinality of queries has been the subject of much research for over the years. Thus, cardinality estimation for these queries is a core issue in query optimization processes.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

There is provided in an embodiment, a method comprising: receiving a plurality of pairs of queries associated with a database, wherein the queries in each pair in the plurality of pairs of queries have an identical FROM clause; at a training stage, training a machine learning model on a training set comprising: (i) the plurality of pairs of queries, and (ii) labels associated with containment rates between each of the pairs of queries over the database; and at an inference stage, applying the trained machine learning model to a pair of target queries, to estimate containment rates between the target pair of queries over the database.

In some embodiments, the method further comprises generating a vector representation of (i) each query of each of the plurality of pairs of queries and (ii) the target pair of queries, and wherein the training set comprises the vector representations.

In some embodiments, all of the queries in the plurality of pairs of queries and the target pair of queries are conjunctive queries without OR and NOT operators.

There is also provide, in an embodiment, a method comprising: receiving a target query; forming an intersection query of the target query and a provided query, wherein the intersection query has SELECT and FROM clauses identical to the target query and the provided query; applying a cardinality estimation model to the target query and the intersection query, to determine cardinality values of each of the target query and intersection query over a database; and estimating a containment rate between the target query and the provided query over the database, based, at least in part, on the cardinality values of the target query and the intersection query.

There is further provided in an embodiment, a method comprising: providing (a) a set of queries and (b) a cardinality value of each query in the set of queries over a database; receiving a target query having a specified FROM clause; selecting, from the set of queries, a query having a FROM clause identical to the specified FROM clause; applying a containment rate estimation model to estimate (i) a containment rate between the selected query and the target query, and (ii) a containment rate between the target query and the selected query; and determining a cardinality value of the target query over the database, based, at least in part, on (i), (ii), and the provided cardinality value of the selected query.

In some embodiments, the containment rate estimation model is a machine learning model trained over a training set comprising: (i) a plurality of pairs of queries associated with a database, wherein the queries in each of the pairs of queries have an identical FROM clause; and (ii) labels associated with containment rates between each of the pairs of queries over the database.

In some embodiments, the determining does not comprise executing the target query over the database.

In some embodiments, the selecting comprises selecting, from the set of queries, two or more queries having a FROM clause identical to the specified FROM clause, and wherein the applying comprises applying the containment rate estimation model to estimate (i) a containment rate between each of the two or more selected queries and the target query, and (ii) a containment rate between the target query and each of the two or more selected queries.

In some embodiments, the determining comprises determining two or more cardinality values of the target query over the database, using, with respect to each of the two or more selected queries, (i), (ii), and the cardinality value of the selected query.

In some embodiments, the method further comprises determining a combined cardinality value of the target value based on at least one of: a median value of all of the determined two or more cardinality values, a mean value of all of the determined two or more cardinality values, and a modified mean value of all of the determined two or more cardinality values based on excluding a specified percentage of outlier values from the determined two or more cardinality values.

There is further provided, in an embodiment, a method comprising receiving a plurality of queries associated with a database; at a training stage, training a machine learning model on a training set comprising: (i) the plurality of queries, and (ii) labels associated with a uniqueness rate of each of the queries over the database; and at an inference stage, applying the trained machine learning model to a target query to estimate a uniqueness rate of the target query over the database.

In some embodiments, the target query comprises a DISTINCT keyword.

In some embodiments, the uniqueness rate of the target query represents a proportion of unique result rows in a set of result rows set of an execution of the target query on the database.

In some embodiments, the method further comprises calculating a set-theoretic cardinality value of the target query based, at least in part, on the uniqueness rate and a known cardinality value of the target query.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below:

FIG. 2: Query featurization as sets of feature vectors obtained from sets T, J and P (Rest denotes zeroed portions of a vector), according to exemplary embodiments of the present invention;

FIG. 8: Cardinality Estimation Technique, according to exemplary embodiments of the present invention;

FIG. 13: The GenCrd algorithm, according to exemplary embodiments of the present invention;

FIG. 14: Converting a general SQL query Q with AND, OR, and NOT operators into a DNF form, according to exemplary embodiments of the present invention;

FIG. 15: The ImplyFalse algorithm, according to exemplary embodiments of the present invention;

FIG. 18: Query featurization as sets of feature vectors obtained from sets A, T, J and P, according to exemplary embodiments of the present invention.

FIG. 24: The GenCrd Algorithm, according to exemplary embodiments of the present invention.

FIG. 25: Converting a general SQL query Q with AND, OR, and NOT operators into a DNF form, according to exemplary embodiments of the present invention.

FIG. 26: The ImplyFalse Algorithm, according to exemplary embodiments of the present invention.

DETAILED DESCRIPTION OF THE INVENTION

Figure 1:
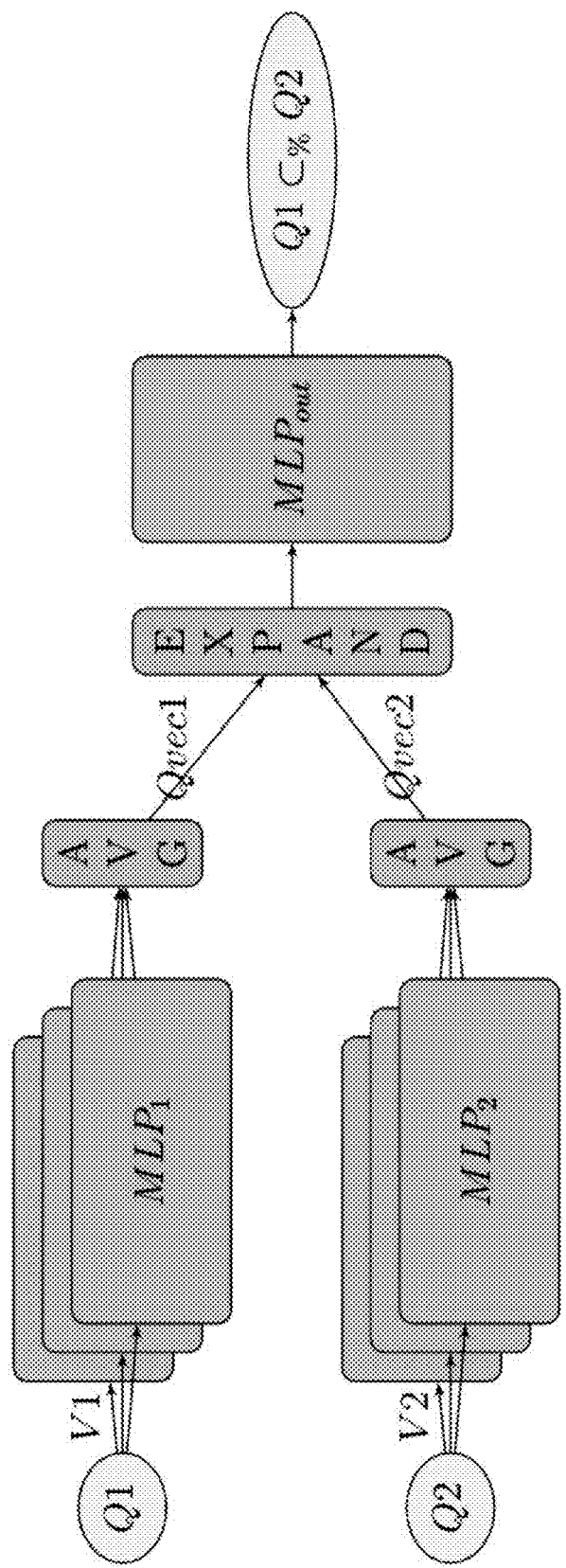
FIG. 1: CRN Model Architecture, according to exemplary embodiments of the present invention.

The present disclosure, in some embodiments, provides for a system, method, and computer program product for determining a cardinality rate of a query on a database, based on learning a containment rate between said query and a previous query with a known cardinality value. The present disclosure, in some embodiments, can be utilized for cardinality estimators for SQL queries.

Result-cardinality estimation is a core component of query optimization. In some embodiments the present disclosure provides for a novel approach for estimating queries result-cardinalities using estimated containment rates among queries. The containment rate of query Q1 in query Q2 over database D is the percentage of Q1's result tuples over D that are also in Q2's result over D. In some embodiments, the present disclosure directly estimates containment rates between pairs of queries over a specific database. For this, a specialized deep learning scheme may be used, which is configured to represent pairs of SQL queries. Experiments conducted by the present inventors on a real-world database, have shown that the present disclosure for estimating cardinalities, using containment rates between queries, realizes significant improvements over known cardinality estimation methods.

Query Q1 is contained in (resp. equivalent to), query Q2, analytically, if for all the database states D, Q1's result over D is contained in (resp., equals) Q2's result over D. Query containment is a well-known concept that has applications in query optimization. It has been extensively researched in database theory, and many algorithms were proposed for determining containment under different assumptions. However, determining query containment analytically is not practically sufficient. Two queries may be analytically unrelated by containment, although, the execution result on a specific database of one query may actually be contained in the other. For example, consider the queries:

Q1: select * from movies where title='Titanic'
Q2: select * from movies where release=1997 and director='James Cameron'.

Both queries execution results are identical since there is only one movie called Titanic that was released in 1997 and directed by director James Cameron (who has not directed any other movie in 1997). Yet, using the analytic criterion, the queries are unrelated at all by containment. According to the current knowledge, while query containment and equivalence have been well researched in past decades, determining the containment rate between two queries on a specific database, has not been considered by past research.

By definition, the containment rate of query Q1 in query Q2 on database D is the percentage of rows in Q1's execution result over D that are also in Q2's execution result over D. Determining containment rates allows to solve other problems, such as determining equivalence between two queries, or whether one query is fully contained in another, on the same specific database.

In addition, containment rates can be used in many practical applications, for instance, query clustering, query recommendation, and in cardinality estimation as will be described subsequently.

The present approach for estimating containment rates is based on a specialized deep learning model, termed herein Containment Rate Network (CRN), which enables expressing query features using sets of vectors. An input query is converted into three sets, T, J and P, representing the query's tables, joins and column predicates, respectively. Each element of these sets is represented by a vector. Using these input vectors, CRN generates a single vector that represents the whole input query. Finally, to estimate the containment rate of two represented queries, CRN measures the distance between the representative vectors of both queries, using another specialized neural network.

Thus, the present CRN model relies on the ability of the neural network to learn the vector representation of queries relative to the specific database, and as a result, a small and accurate model for estimating containment rates can be obtained.

In addition to the present CRN model, a novel technique is disclosed herein for estimating query cardinality using estimated query containment rates. In some embodiments, by using the proposed technique, other known cardinality estimation techniques can be improved significantly. This is especially the case when there are multiple joins, where the known cardinality estimation techniques suffer from underestimated results and errors that grow exponentially as the number of joins increases. The technique, disclosed herein, estimates the cardinalities more robustly (x150/x175 with 4 joins queries, and x1650/x120 with 5 joins queries, compared with such methods as PostgreSQL and MSCN, respectively).

The technique disclosed herein can be compared with PostgreSQL and the MSCN model, by examining, on the real-world IMDb database (https://www.imdb.com), join crossing correlations queries which are known to present a tough challenge to cardinality estimation methods. In some embodiments, by employing known existing cardinality estimation methods for containment estimation, their cardinality estimates can be improved as well, without changing the methods themselves. Thus, the present novel approach is highly promising for solving the cardinality estimation problem, the "Achilles heel" of query optimization, a cause of many performance issues.

Containment Rate Definition

A new problem can be introduced, that is of determining containment rates between conjunctive queries on a specific database. Query Q1 is x %-contained in query Q2 on database D if precisely x % of Q1's execution result rows on database D are also in Q2's execution result on database D. For simplicity, the containment rate value (x %) of query Q1 in query Q2 is denoted as Q1 c % Q2. The containment rate is defined only on pairs of queries whose SELECT and FROM clauses are identical. The containment rate is formally a function from Q×Q×D to R, where Q is the set of all queries, D is the set of all databases, and R the Real numbers. This function can be directly calculated using the cardinality of the results of queries Q1 and Q2 as follows: Estimating the containment between two queries, can be calculated using cardinality estimation models, since by definition:

$$x\ \% = \frac{|Q1(D) \cap Q2(D)|}{|Q1(D)|} * 100 \qquad (1)$$

where Q(D) denotes Q's execution result on database D. (in case Q1's execution result is empty, then Q1 is 0% contained in Q2). Note that the containment rate is defined only on pairs of queries whose SELECT and FROM clauses are identical.

The containment rate operator between queries Q1 and Q2 on database D is denoted as:

$$Q1 \subset_{\%}^{D} Q2$$

Operator $\subset_{\%}^{D}$ returns the containment rate between the given input queries on database D. That is, $Q1 \subset_{\%}^{D} Q2$ returns x % if Q1 is x % contained in query Q2 on database D. Typically, the specific database can be identified from context, therefore the containment rate operator may be written as c %.

Learned Containment Rates

From a high-level perspective, applying machine learning to the containment rate estimation problem is straightforward. Following the training of the present CRN model with pairs of queries (Q1, Q2) and the actual containment rates Q1⊆Q2, the model is used as an estimator for other, target unknown pairs of queries. There are, however, several questions whose answers determine whether the machine learning model (CRN) will be successful:

(1) Which supervised learning algorithm/model should be used;
(2) How to represent queries as input and the containment rates as output to the model ("featurization"); and
(3) How to obtain the initial training dataset ("cold start problem").

Next, the present disclosure describes how each one of these questions is addressed.

Cold Start Problem

Defining the Database

A training-set was generated and later on the disclosed model was evaluated on it by using the IMDb database (https://www.imdb.com). This database contains a plethora of information about movies and related facts about actors, directors, and production companies, with more than 2.5 M movie titles produced over 130 years (starting from 1880) by 235,000 different companies with over 4 M actors. IMDb contains many correlations and has been shown to be very challenging for cardinality estimators.

Generating the Development Dataset

The disclosed approach for solving the "cold start problem" is to obtain an initial training corpus using a specialized queries generator that randomly generates queries based on the IMDb schema and the actual columns values. The queries generator generates the dataset in three main steps. In the first step, it repeatedly generates multiple SQL queries as follows. It randomly chooses a set of tables t, that can join with each other in the database. Then, it adds the corresponding join edges to the query. For each base table bt in the chosen set of tables t, it uniformly draws the number of query predicates $P_{bt}$ ($0 \leq P_{bt} \leq$ number of non-key columns in table bt). Subsequently, for each predicate, it uniformly draws a non-key column from the relevant table bt, a predicate type ($<$, $=$, or $>$), and a value from the corresponding column values range in the database. To avoid a combinatorial explosion, and to simplify the problem that the model needs to learn, the queries generator can be made to create queries with up to two joins and let the model generalize to a larger number of joins. Note that all the generated queries include a SELECT * clause. They are denoted as initial queries. To create pairs of queries that are contained in each other with different containment rates, in the second step, queries that are "similar" to the initial queries, but still, different from them, are generated as follows.

For each query Q in initial queries, the generator repeatedly creates multiple queries by randomly changing query Q's predicate types and/or predicate values, and by randomly adding additional predicates to the original query Q. This way, a "hard" dataset can be created, which includes pairs of queries that look "similar," but have mutual containment rates that vary significantly.

Finally, in the third and last step, using the queries obtained from both previous steps, the queries generator generates pairs of queries whose FROM clauses are identical. After generating the dataset, the dataset queries can be executed on the IMDb database, to obtain their true containment rates. Using this process, an initial training set can be obtained for the model, which consists of, e.g., 100,000 pairs of queries with zero to two joins. The training samples can be split into 80% training samples and 20% validation samples.

Machine Learning Model

Featurizing all the queries' literals and predicates as a single vector, over all the possible words that may appear in the queries, is impractical. Also, serializing the queries' SELECT, FROM, and WHERE clauses elements into an ordered sequence of elements is not practical, because the order in these clauses is arbitrary Thus, standard deep neural network architectures such as simple multi-layer perceptron, convolutional neural networks, or recurrent neural networks, are not suitable for this problem. Accordingly, the present Containment Rate Network (CRN) model uses a specialized vector representation for representing the input queries and the output containment rates. As depicted in FIG. 1, the present CRN model runs in three main stages. Consider an input queries pair (Q1, Q2). In the first stage, Q1 can be converted (resp., Q2) into a set of vectors V1 (resp., V2). Thus (Q1, Q2) is represented by (V1, V2). In the second stage, a set V1 (resp., V2) can be converted into a unique single representative vector Qvec1 (resp., Qvec2), using a specialized neural network, $MLP_i$, for each set separately. In the third stage, the containment rate Q1% Q2 can be estimated using the representative vectors Qvec1 and Qvec2, and another specialized neural network, $MLP_{out}$.

First Stage—From (Q1, Q2) to (V1, V2)

In the same way as in the MSCN model, each query Q can be represented as a collection of three sets (T, J, P). T is the set of all the tables in Q's FROM clause. J is the set of all the joins (i.e., join clauses) in Q's WHERE clause. P is the set of all the (column) predicates in Q's WHERE clause. Using sets T, J, and P, a set of vectors V can be obtained representing the query, as described later.

In some embodiments, in the present model, all vectors of set V have the same dimension and the same segmentation as depicted in Table 1, where #T is the number of all the tables in the database, #C is the number of all the columns in all the database tables, and #O is the number of possible predicates operators. In total, the vector dimension is #T+3*#C+#O+1, denoted as L.

The queries tables joins and column predicates (sets T, J and P) are inseparable, hence, treating each set individually using different neural networks may disorientate the model. Therefore, featuring these sets by using the same vector format in order to ease learning, can be chosen.

TABLE 1

| | | | | | | |
|---|---|---|---|---|---|---|
| Vector Segmentation. | | | | | | |
| Type | Table | Join | | Column Predicate | | |
| Segment | T-seg | J1-seg | J2-seg | C-seg | O-seg | V-seg |
| Segment size | #T | #C | #C | #C | #O | 1 |
| Featurization | One Hot | One Hot | One Hot | One Hot | One Hot | Norm |

Element of sets T, J, and P are represented by vectors as follows (see, e.g., FIG. 2A). All the vectors have the same dimension L. Each table t ∈T is represented by a unique one-hot vector (a binary vector of length #T with a single non-zero entry, uniquely identifying a specific table) placed in the T-seg segment. Each join clause of the form (col1, =, col2) ∈J is represented as follows: col1 and col2 are represented by a unique one-hot vectors placed in the J1-seg and J2-seg segments, respectively. Each predicate of the form (col, op, val)P∈ is represented as follows: col and op are represented by a unique one-hot vectors placed in the C-seg and V-seg segments, respectively; val is represented as a normalized value in the interval [0, 1], normalized using the minimum and maximum values of the respective column, placed in the V-seg segment. For each vector, all the other unmentioned segments are zeroed. Given input queries pair, (Q1;Q2), query Q1 can be converted (resp., Q2) into sets T, J and P, and each element of these sets is represented by a vector as described above, together generating set V1 (resp., V2).

Second Stage—From (V1; V2) to (Qvec1; Qvec2)

Given set of vectors $V_i$, each vector of the set can be presented into a fully connected one-layer neural network, denoted as MLPi, converting each vector into a vector of dimension H. The final representation Qvec1 for this set is then given by the average over the individual transformed representations of its elements, i.e., $$Qveci = \frac{1}{|vi|}\sum_{v \in Vi} MPLi(v)$$

$$MLPi(V) = ReLU(vUi) + bi$$

where, $U_i \in R^{L \times H}$, $b_i \in R^H$ are the learned weights and bias, and $v \in R^L$ is the input row vector. An average (instead of, e.g., sum) can be chosen to ease generalization to different numbers of elements in the sets, as otherwise the overall magnitude of Qvec would vary depending on the number of elements in the set $V_i$.

Third Stage—From (Qvec1; Qvec2) to Q1 ⊆% Q2

Given the representative vectors of the input queries, (Qvec1, Qvec2), an aim can be to predict the containment rate Q1⊆% Q2 as accurately as possible. Since it may not be known what a "natural" distance measure in the representative queries vector space, it is encoded by the neural networks of the second step, a fully-connected two-layer neural network, denoted as $MLP_{out}$ can be used, to compute the estimated containment rate of the input queries, leaving it up to this neural network to learn the correct distance function. $MLP_{out}$ takes as input a vector of size 4H which is constructed from Qvec1 and Qvec2. The first layer converts the input vector into a vector of size 2H. The second layer converts the obtained vector of size 2H, into a single value representing the containment rate.

$$\hat{y} = MLP_{out}(EXPand(Qvec1, Qvec2))$$

$$MLP_{out}(v) = Sigmoid(ReLU(vU_{out1} + b_{out1})U_{out2} + b_{out2})$$

$$Expand(v1, v2) = [v1, v2, abs(v1-v2), v1 \odot v2]$$

Here, $\hat{y}$ is the estimated containment rate, $U_{out1} \in R^{4H \times 2H}$, $b_{out1} \in R^{2H}$ and $U_{out2} \in R^{2H \times 1}$, $b_{out2} \in R^1$ are the learned weights and bias, and is the dot-product function.

In order to estimate the containment rates more accurately, the Expand function which creates a row concatenated vector of size 4H using vectors Qvec1 and Qvec2 can be used. The ReLU activation function can be used for hidden layers in all the neural networks, as they show strong empirical performance advantages and are fast to evaluate. (ReLU(x)=max(0,x)). In the Final step, applying the Sigmoid activation function in the second layer to output a float value in the range [0,1], as the containment rate values are within this interval. Therefore, any featurization may not be applied on the containment rates (the output of the model) and the model is trained with the actual containment rate values without any featurization steps.

Loss Function

Since minimizing the ratio between the predicted and the actual containment rates is desirable, the q-error metric can be used in the current evaluation. The disclosed model can be trained to minimize the mean q-error, which is the ratio between an estimated and the actual contaminate rate (or vice versa). Let y be the true containment rate, and y the estimated rate, then the q-error is defined as follows:

$$q-\text{error}(y, \hat{y}) = \hat{y} > y ? \frac{\hat{y}}{y} : \frac{y}{\hat{y}}$$

In addition to optimizing the mean q-error, the mean squared error (MSE) and the mean absolute error (MAE) as optimization goals were also examined. MSE and MAE would optimize the squared/absolute differences between the predicted and the actual containment rates. Optimizing with theses metrics makes the model put less emphasis on heavy outliers (that lead to large errors). Therefore, optimizations can be done in the disclosed model by using the q-error metric which yielded better results.

Training and Testing Interface

Building CRN involves two main steps:
(1) Generating a random training set using the schema and data information as described above; and
(2) Repeatedly using this training data to train the present CRN model until the mean q-error of the validation test starts to converge to its best absolute value.

In some embodiments, the early stopping technique can be used and stop the training before convergence to avoid overfitting. Both steps are performed on an immutable snapshot of the database. After the training phase, to predict the containment rate of an input query pair, the queries first need to be transformed into their feature representation, and then they are presented as input to the model, and the model outputs the estimated containment rate. The disclosed model can be trained using the Tensor-Flow framework and make use of the efficient Adam optimizer for training the model.

Hyperparameter Search

To optimize the model's performance, a search can be conducted over its hyperparameter space. In particular, tuning the neural networks hidden layer size (H) can be in the focus. Note that the same H value is shared in all the neural networks of the present CRN model.

Figure 3:
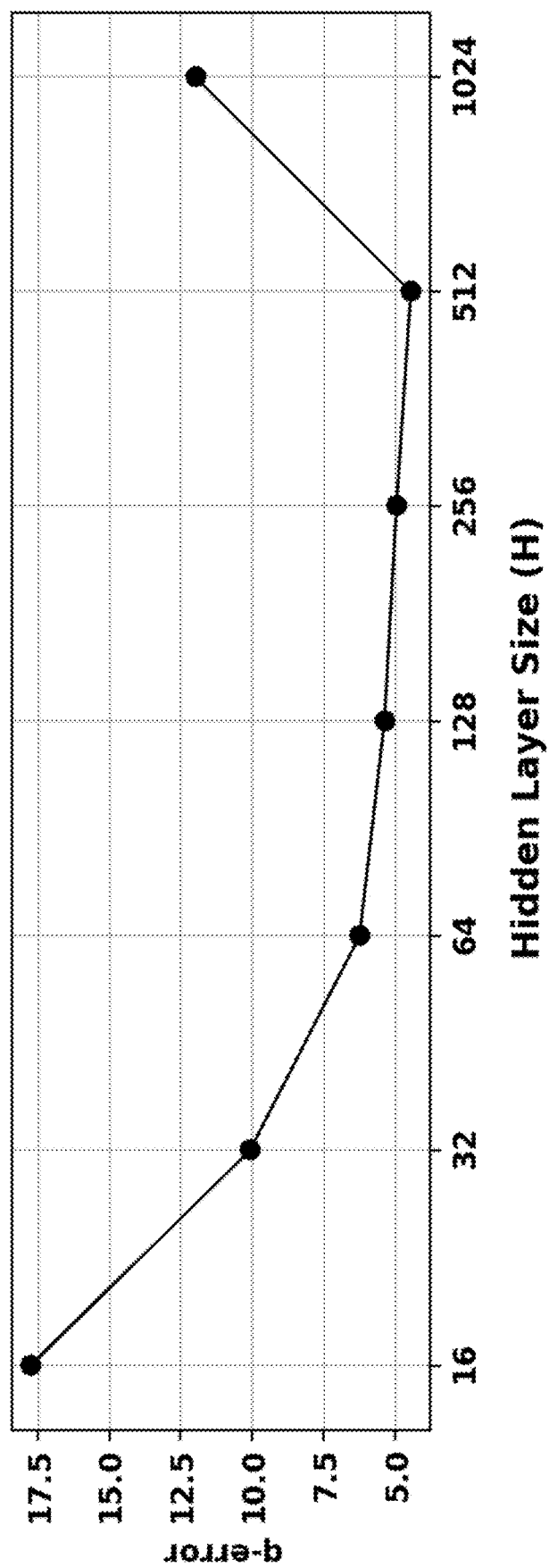
FIG. 3: The mean q-error on the validation set with different hidden layer sizes, according to exemplary embodiments of the present invention.

During the tuning of the size hyperparameter of the neural network hidden layer, increasing the size of the hidden layer generally may lead to an increase in the model accuracy, till it reaches the best mean q-error on the validation test. Afterwards, the results began to decline in quality because of over-Fitting (See FIG. 3). Hence, a hidden layer of size 512 can be chosen, as a good balance between accuracy and training time. Overall, the disclosed model can perform similarly well across a wide range of settings when considering different batch sizes and learning rates.

Model Computational Costs

Analyzing the training, prediction, and space costs of the present CRN model with the default hyperparameters (H=512, batch size=128, learning rate=0.001) may be performed.

Training Time

Figure 4:
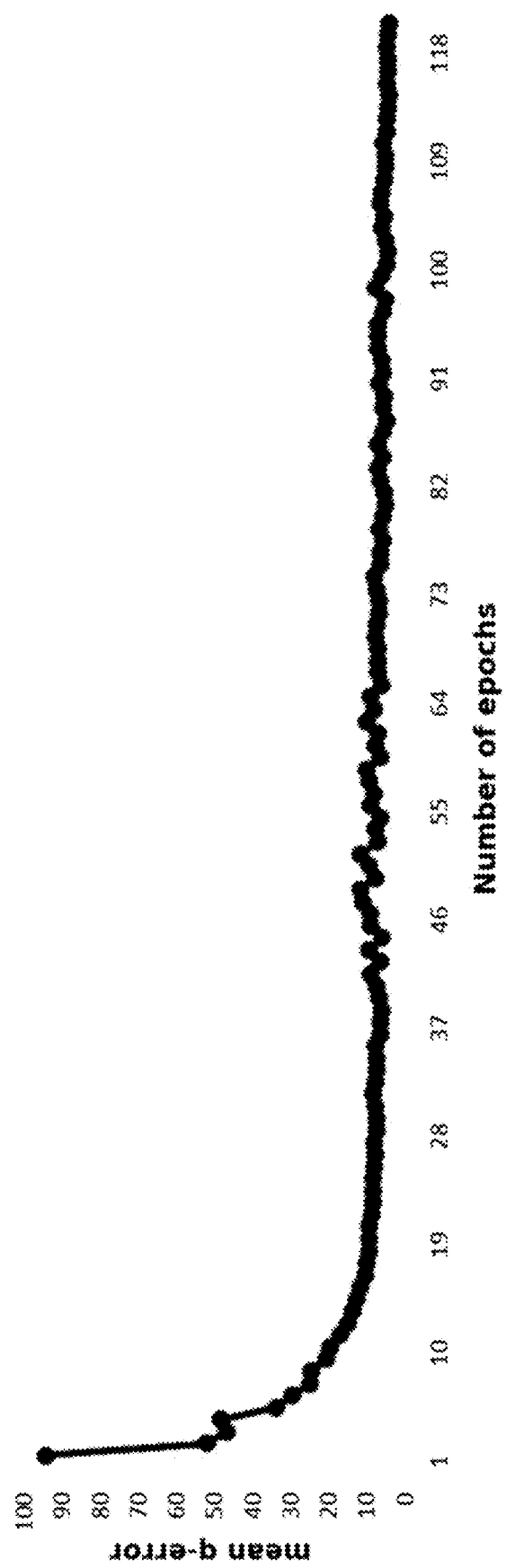
FIG. 4: Convergence of the mean q-error on the validation set, according to exemplary embodiments of the present invention.

FIG. 4 shows how the mean q-error of the validation set decreases with additional epochs, until convergence to a mean q-error of around 4.5. The present CRN model requires almost 120 passes on the training set to converge. On average, measured across six runs, a training run with 120 epochs takes almost 200 minutes.

Inference

The inference process comprises converting the input queries into corresponding vector representations, and then presenting these vectors as input to the present CRN model. On average, the prediction time is 0.5 ms per single pair of queries, including the overhead introduced by the Tensor-Flow framework.

Model Size

The present CRN model includes all the learned parameters mentioned above (U1, U2, Uout1, Uout2, b1, b2, bout1, bout2). In total, there are $2*L*H+8*H^2+6*H+1$ learned parameters. In practice, the size of the model, when serialized to disk, is roughly 1.5 MB.

Model Evaluation Results

This section details results of a comparison between the present CRN model and known methods.

From Cardinality to Containment

The present disclosure addresses the problem of containment rate estimation. In order to compare the results with different baseline methods, existing cardinality estimation methods may be used to predict the containment rates, using, e.g., the Crd2Cnt transformation, as depicted in the middle part diagram in FIG. 7.

The Crd2Cnt Transformation

Given a cardinality estimation model M, it can be converted into a containment rate estimation model using the Crd2Cnt transformation which returns a model M' for estimating containment rates. The obtained model M' functions as follows. Given input queries Q1 and Q2, whose containment rate Q1 ⊆% Q2 needs to be estimated:

Calculate the cardinality of query Q1∩Q2 using M.
Calculate the cardinality of query Q1 using M.
Then, the containment rate estimate is:

$$Q1 \subseteq \% \; Q2 = \frac{|Q1 \cap Q2|}{|Q1|}$$

Here, Q1∩Q2 is the intersection query of Q1 and Q2 whose SELECT and FROM clauses are identical to Q1's (or Q2's) clauses, and whose WHERE clause is Q1's AND Q2's WHERE clauses. Note that, by definition, if |Q1|=0 then Q1⊆% Q2=0. Given model M, wherein the obtained model M', obtained via the Crd2Cnt transformation, is denoted as Crd2Cnt(M). The present CRN model predictions can be compared to those based on the other examined cardinality estimation models, using the Crd2Cnt transformation.

In order to make a comparison between the present CRN model and the MSCN model, the MSCN model was trained on the same data that was used to train the present CRN model. The present CRN model takes two queries as input, whereas the MSCN model takes one query as input. Therefore, to address this issue, the training dataset for the MSCN was created model as follows. For each pair of queries (Q1;Q2) used in training the present CRN model, the following two input queries were added to the MSCN training set:

Q1∩Q2, along with its actual cardinality.
Q1, along with its actual cardinality.

Finally, the training was examined to ensure that it includes only unique queries without repetition. This way, both models, MSCN and CRN, are trained with the same information.

Comparing with PostgreSQL does not require generating an appropriate training set, since the PostgreSQL cardinality estimation component is based on database profiling techniques and does not require training.

Evaluation Workloads

CRN was evaluated on the IMDb dataset as described above, using two different query workloads:

cnt_test1, a synthetic workload generated by the same queries generator as the one used for generating the training data (using a different random seed) with 1200 unique query pairs, with zero to two joins.

cnt_test2, a synthetic workload generated by the same queries generator as the one used for generating the training data (using a different random seed) with 1200 unique query pairs, with zero to five joins. This dataset is used to examine how CRN generalizes to additional joins (see table 2).

TABLE 2

| | Distribution of joins. | | | | | | |
|---|---|---|---|---|---|---|---|
| Number of joins | 0 | 1 | 2 | 3 | 4 | 5 | overall |
| cnt_test1 | 400 | 400 | 400 | 0 | 0 | 0 | 1200 |
| ntc_test2 | 200 | 200 | 200 | 200 | 200 | 200 | 1200 |

The Quality of Estimates

Figure 5:
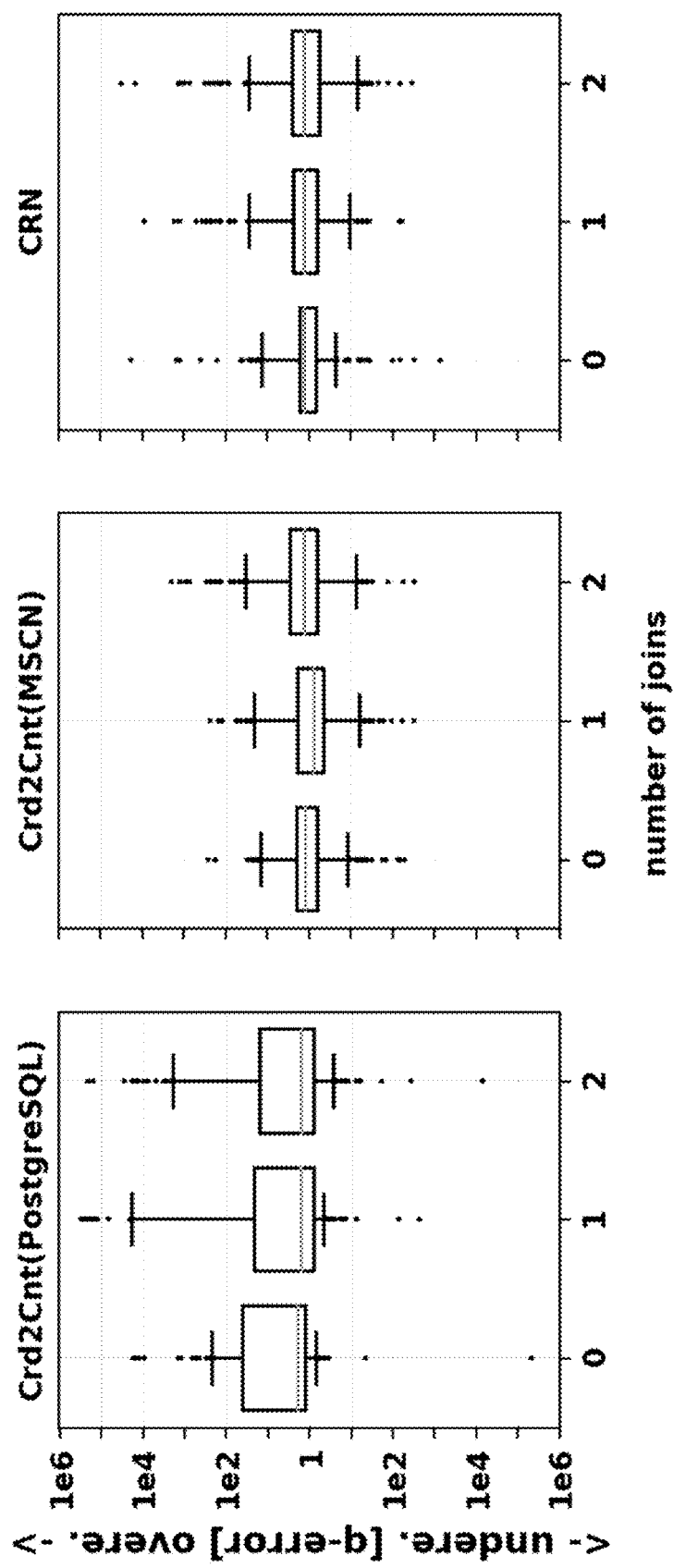
FIG. 5: Estimation errors on the cnt_test1 workload in all the similar plots presented in this paper, the box boundaries are at the 25th/75th percentiles and the horizontal lines mark the 5th/95th percentiles, according to exemplary embodiments of the present invention.

FIG. 5 depicts the q-error of the present CRN model compared to the Crd2Cnt(PostgreSQL) and Crd2Cnt (MSCN) models on the cnt_test1 workload. While Crd2Cnt (PostgreSQL)'s errors are more skewed towards the positive spectrum, Crd2Cnt(MSCN) performs extremely well as does the present CRN model.

Observe that MSCN was trained in such away that it will predict containment rates efficiently, while the primary purpose of the MSCN model in cardinality estimation. That is, were the MSCN model trained for its main purpose, with "independent" queries, the results for MSCN may have been worse. To provide a fuller picture, percentiles, maximum, and mean q-errors are shown. As depicted in Table 3, CRN provides the best results in 75% of the tests, whereas MSCN is more robust in the margins, resulting in a better mean.

TABLE 3

Estimation errors on the cnt test1 workload. In all the similar tables presented in this paper, the percentiles, maximum, and the mean q-errors of the tests are provided. The p'th percentile, is the q-error value below which p % of the test q-errors are found.

| | $50^{th}$ | $75^{th}$ | $90^{th}$ | $95^{th}$ | $99^{th}$ | max | mean |
|---|---|---|---|---|---|---|---|
| Crd2Cnt(PostgreSQL) | 3.5 | 41.18 | 365 | 3399 | 268745 | 493474 | 5492 |
| Crd2Cnt(MSCN) | 2.84 | 7.38 | 19.95 | 41.43 | 274 | 3258 | 17.08 |
| CRN | 2.52 | 6.17 | 23.04 | 44.85 | 991 | 51873 | 111 |

4.4 Generalizing to Additional Joins

This section examines how the present CRN model generalizes to queries with a higher number of joins without having seen such queries during training. To do so, the crd_test2 workload is used which includes queries with zero to five joins. Recall that both the present CRN model and the MSCN model were trained only with query pairs that have between zero and two joins.

Figure 6:
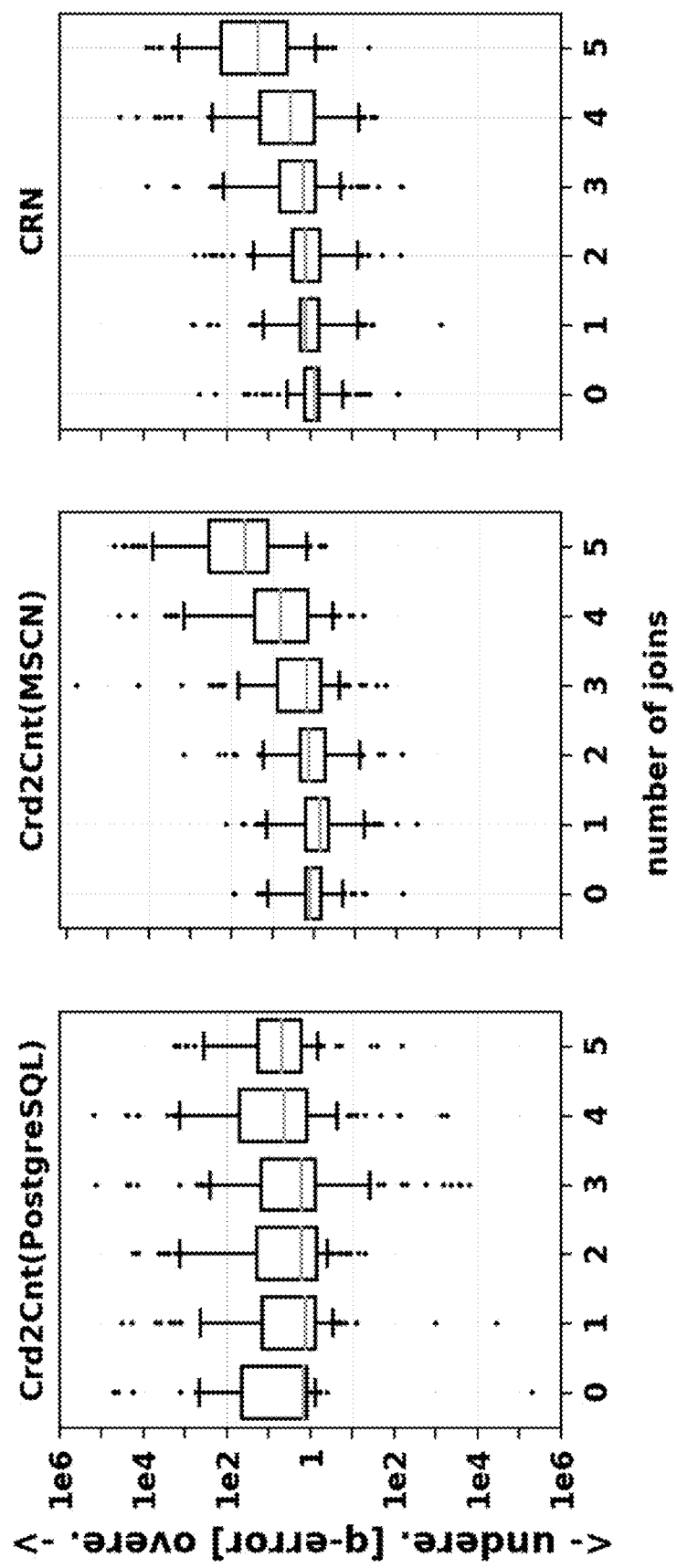
FIG. 6: Estimation errors on the cnt_test2 workload, according to exemplary embodiments of the present invention.

Examining the results, described in Table 4 and FIG. 6, the present CRN model is noticeably more robust in generalizing to queries with additional joins. The mean q-error of the present CRN model is smaller by a factor of almost 8 than the mean q-errors of the other models.

TABLE 4

| Estimation errors on the cnt_test2 workload. | | | | | | | |
|---|---|---|---|---|---|---|---|
| | $50^{th}$ | $75^{th}$ | $90^{th}$ | $95^{th}$ | $99^{th}$ | max | mean |
| Crd2Cnt(PostgreSQL) | 4.5 | 46.22 | 322 | 1330 | 3905 | 316122 | 1345 |
| Crd2Cnt(MSCN) | 4.1 | 17.85 | 157 | 754 | 14197 | 768051 | 1238 |
| CRN | 3.64 | 13.19 | 96.6 | 255 | 2779 | 56965 | 161 |

Cardinality Estimation Using Containment Rates

In this section, one application of the proposed containment rate estimation model is considered: cardinality estimation. The present disclosure introduces a novel approach for estimating cardinalities using query containment rates, and shows that using the proposed approach, cardinality estimations are improved significantly, especially in the case when there are multiple joins.

A traditional query optimizer is crucially dependent on cardinality estimation, which enables choosing among different plan alternatives by using the cardinality estimation of intermediate results within query execution plans. Therefore, the query optimizer must use reasonably good estimates. However, estimates produced by all widely used database cardinality estimation models are routinely significantly wrong (under/over-estimated), resulting in not choosing the best plans, leading to slow executions.

In today's databases, the answer to a previous query is rarely useful for speeding up new queries, and the work performed in answering past queries is often ignored afterwards. Using the present CRN model for predicting containment rates, the underlying relations between the new queries and the previous ones can be revealed. The disclosed technique for estimating cardinalities mainly relies on two key ideas. The first one is the new framework for solving the task of cardinality estimation. The second is the use of a queries pool that maintains multiple previously executed queries along with their actual cardinalities, as part of the database meta information. The queries pool provides new information that enables the disclosed technique to achieve better estimates. Using a containment rate estimation model, previously executed queries along with their actual cardinalities may be used to estimate the result-cardinality of a new query. This is done with the help of a simple transformation from the problem of containment rate estimation to the problem of cardinality estimation.

From Containment to Cardinality

Figure 7:
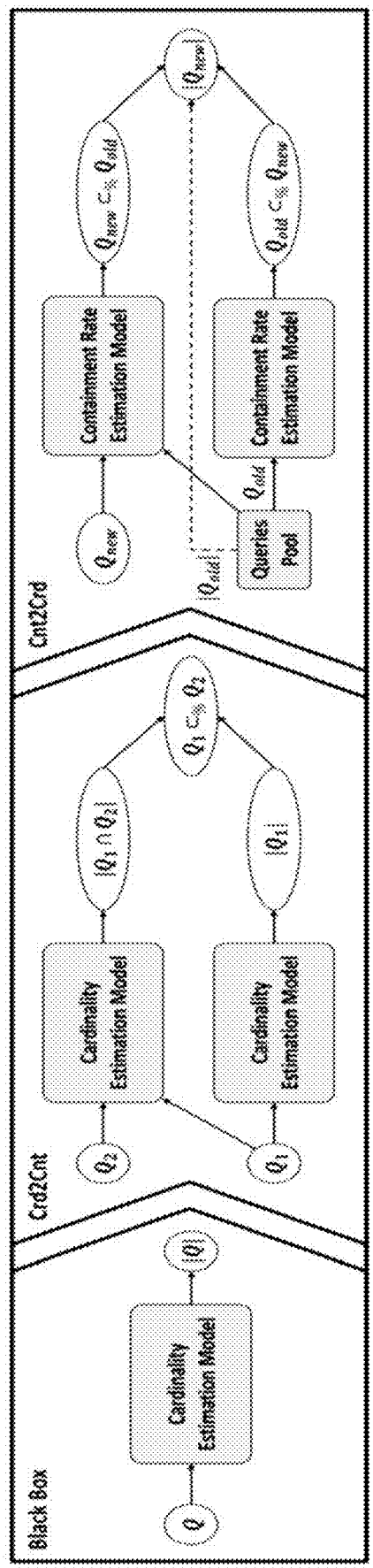
FIG. 7: A novel approach, from cardinality estimation to containment rate estimation, and back to cardinality estimation by using a queries pool, according to exemplary embodiments of the present invention.

Using containment rate estimation models, cardinality estimates using the Cnt2Crd transformation may be performed, as depicted in FIG. 7.

The Cnt2Crd Transformation

Given a containment rate estimation model M, it may be converted into a cardinality estimation model using the Cnt2Crd transformation which returns a model M' for estimating cardinalities. The obtained model M' functions as follows Given a "new" query, denoted as $Q_{new}$, as input to cardinality estimation, and assuming that there is an "old" query denoted as $Q_{old}$, whose FROM clause is the same as $Q_{new}$'s FROM clause, that has already been executed over the database, and therefore $|Q_{old}|$ is known:

Calculate x_rate=$Q_{old} \subseteq \%$ $Q_{new}$ using M
Calculate y_rate=$Q_{new} \subseteq \%$ $Q_{old}$ using M.
Then, the cardinality estimate equals to:

$$|Q_{new}| = \frac{X\_rate}{Y\_Rate} * |Q\_\{old\}|$$

provided that y rate=$Q_{new} \subseteq \%$ $Q_{old} \neq 0$.

Given model M, the obtained model M', obtained via the Cnt2Crd transformation, is denoted as Cnt2Crd(M).

Queries Pool

The disclosed technique for estimating cardinality mainly relies on a queries pool that includes records of multiple queries. The queries pool is envisioned to be an additional component of the DBMS, along with all the other customary components. It includes multiple queries with their actual cardinalities, without the queries execution results. Therefore, holding such a pool in the DBMS as part of its meta information does not require significant storage space or other computing resources. Maintaining a queries pool in the DBMS is thus a reasonable expectation. The DBMS continuously executes queries, and therefore, the DBMS can be configured to store these queries along with their actual cardinalities in the queries pool. In addition, a queries pool using a queries generator that randomly creates multiple queries with many of the possible joins, and with different column predicates may be generated in advance.

Then these queries can be executed on the database to obtain and save their actual cardinalities in the queries pool. Notice that, both approaches (actual computing and a generator) can be combined to create the queries pool. The advantage of the first approach is that in a real-world situation, queries that are posed in sequence by the same user, may be similar and therefore more accurate cardinality estimates can be obtained. The second approach helps in cases where the queries posed by users are diverse (e.g., different FROM clauses). Therefore, in such cases, there is a need to make sure, in advance, that the queries pool contains sufficiently many queries that cover all the possible cases.

Given a query Q whose cardinality is to be estimated, it is possible that finding any appropriate query will fail, in the queries pool, to match with query Q. That happens when all the queries in the queries pool have a different FROM clause than that of query Q, or that they are not contained at all in query Q.

In such cases it is possible to rely on the known basic cardinality estimation models. In addition, it is possible to make sure that the queries pool includes queries with the most frequent used FROM clauses, with empty column predicates. That is, queries of the following form. SELECT * FROM-set of tables-WHERE TRUE. In this case, for most of the queries posed in the database, there is at least one query that matches in the queries pool with the given query, and hence, it is possible to estimate the cardinality without resorting to the basic cardinality estimation models.

A Cardinality Estimation Technique

Consider a new query $Q_{new}$ and assume that the DBMS includes a queries pool as previously described. To estimate the cardinality of $Q_{new}$ accurately, it is possible to use multiple old queries instead of one query, using the same Cnt2Crd above described transformation, as depicted in FIG. 8.

Estimating cardinality considers all the matching queries whose FROM clauses are identical to $Q_{new}$'s FROM clause (a subset of up to k, k a system parameter, matching queries could be used as well). For each matching query, it is possible to estimate $Q_{new}$'s cardinality using the Cnt2Crd transformation and save the estimated result in the results list. The final cardinality is obtained by applying the final function, F, that converts all the estimated results recorded in the results list, into a single final estimation value. Note that the technique can be easily parallelized since each iteration in the For loop is independent, and thus can be calculated in parallel.

Comparing Different Final Functions

The various final functions (F) were examined, including:
Median, returning the median value of the results list.
Mean, returning the mean value of the results list.
Trimmed mean, returning the trimmed mean of the results list without the 25% outliers (trimmed mean removes a designated percentage of the largest and smallest values before calculating the mean).

Experimentally, the cardinality estimates using the various functions were very similar in terms of q-error. But the Median function yielded the best estimates.

Cardinality Evaluation

The proposed technique was evaluated for estimating cardinality, with different test sets, while using the present CRN model as defined above for estimating containment rates. The cardinality estimates were compared with those of the PostgreSQL version 11 cardinality estimation component, and the MSCN model. We train both the present CRN model and the MSCN model with the same training set as described above. Also, we create the test workloads using the same queries generator used for creating the training set of the present CRN and the MSCN models (described above), while skipping its last step. That is, we only run the first two steps of the generator. The third step creates query pairs which are irrelevant for the cardinality estimation task.

Evaluation Workloads

The disclosed approach was evaluated on the (challenging) IMDb dataset, using three different query workloads:
crd_test1, a synthetic workload generated by the same queries generator that was used for creating the training data of the present CRN model, as described above (using a different random seed) with 450 unique queries, with zero to two joins.

TABLE 5

Distribution of joins.

| Number of joins | 0 | 1 | 2 | 3 | 4 | 5 | overall |
|---|---|---|---|---|---|---|---|
| crd_test1 | 150 | 150 | 150 | 0 | 0 | 0 | 450 |
| crd_test2 | 75 | 75 | 75 | 75 | 75 | 75 | 450 |
| Scale | 115 | 115 | 107 | 88 | 75 | 0 | 500 |

Queries Pool

The proposed technique relies on a queries pool, we thus created a synthetic queries pool, QP, generated by the same queries generator as the training data of the containment rate estimation model, as described above (using a different random seed) with 300 queries, equally distributed among all the possible FROM clauses over the database.

In particular, QP, covers all the possible FROM clauses that are used in the tests workloads. Note that, there are no shared queries between QP queries and the test workloads queries. Consider a query Q whose cardinality needs to be estimated. On the one hand, the generated QP contains "similar" queries to query Q, these can help the machine in predicting the cardinality. On the other hand, it also includes queries that are not similar at all to query Q, that may cause erroneous cardinality estimates. Therefore, the generated queries pool QP, faithfully represents a real-world situation Experimental Environment In all the following cardinality estimation experiments, for predicting the cardinality of a given query Q in a workload W, we use the whole queries pool QP as described above with all its 300 queries. That is, the old queries used for predicting cardinalities, are the queries of QP. In addition, in all the experiments we use the Median function as the final F function.

The Quality of Estimates

Figure 9:
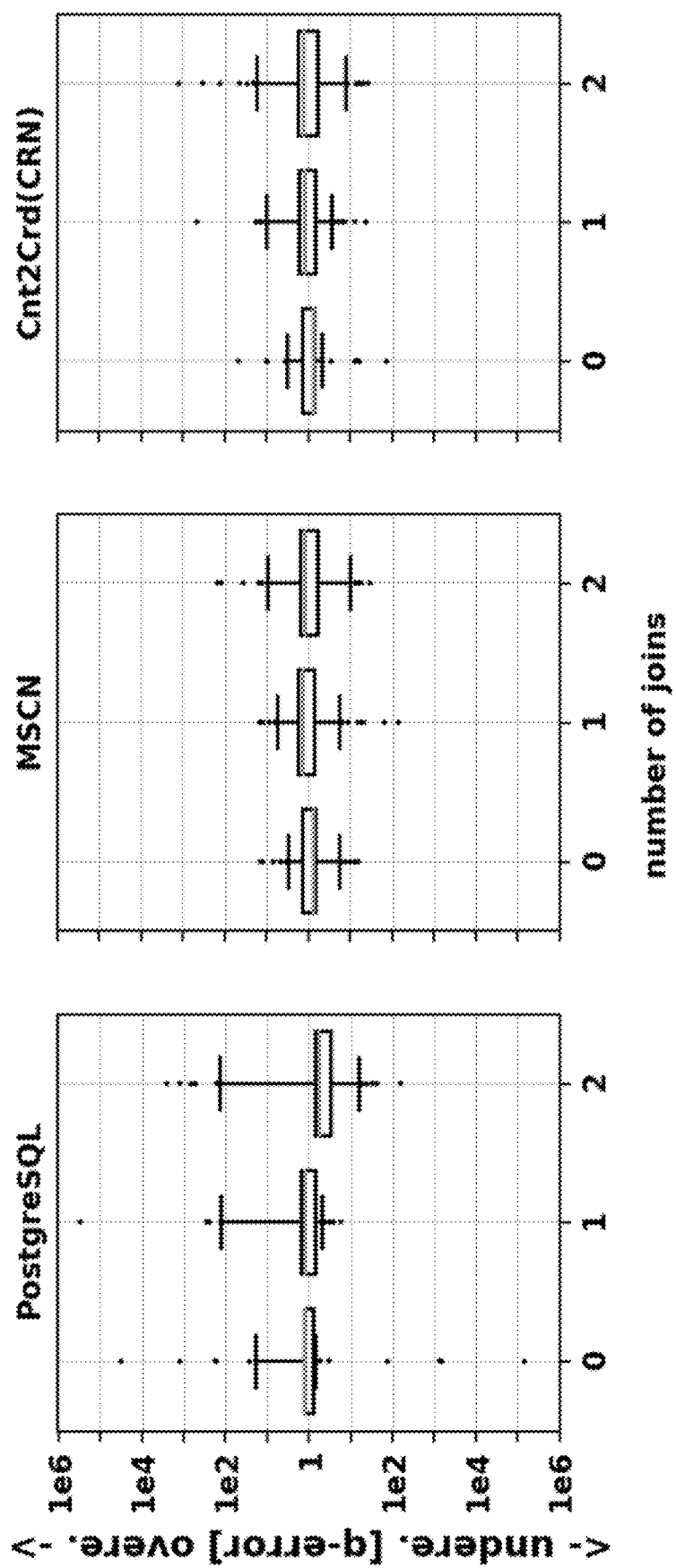
FIG. 9: Estimation errors on the crd_test1 workload, according to exemplary embodiments of the present invention.

FIG. 9 depicts the q-error of the Cnt2Crd(CRN) model as compared to MSCN and PostgreSQL on the crd_test1 workload. While PostgreSQL's errors are more skewed towards the positive spectrum, MSCN is competitive with Cnt2Crd (CRN) in all the described values. As can be seen in Table 6, while MSCN provides the best results in the margins, the Cnt2Crd(CRN) model is more accurate in 75% of the tests. In addition, we show in the next section (Section 6.5) that the Cnt2Crd(CRN) model is more robust when considering queries with more joins than in the training dataset.

TABLE 6

Estimation errors on the crd_test1 workload.

| | $50^{th}$ | $75^{th}$ | $90^{th}$ | $95^{th}$ | $99^{th}$ | max | mean |
|---|---|---|---|---|---|---|---|
| PostgreSQL | 1.74 | 3.72 | 22.46 | 149 | 1372 | 499266 | 1623 |
| MSCN | 2.11 | 4.13 | 7.79 | 12.24 | 51.04 | 184 | 4.66 |
| Cnt2Crd(CRN) | 1.83 | 3.71 | 10.01 | 18.16 | 76.54 | 1106 | 9.63 | crd_test2, a synthetic workload generated by the same queries generator as the training data of the present CRN model, as described above (using a different random seed) with 450 unique queries, with zero to five joins. This dataset is designed to examine how the technique generalizes to additional joins.

Scale, another synthetic workload, with 500 unique queries, derived from the MSCN test set as introduced earlier. This dataset is designed to examine how the technique generalizes to queries that were not created with the same trained queries' generator Generalizing to Additional Joins An examination was conducted on how the proposed technique can be generalized to queries with additional joins, without having seen such queries during training. To do so, the crd_test2 workload which includes queries with zero to five joins was used. Recall that both the present CRN model and the MSCN model were trained only with query pairs that have between zero and two joins. From Tables 7 and 8, and FIG. 10, it is clear that Cnt2Crd(CRN) model is significantly more robust in generalizing to queries with additional joins. In terms of mean q-error, the Cnt2Crd (CRN) model reduces the mean by a factor x100 compared with MSCN and by a factor of x1000 compared with PostgreSQL.

TABLE 7

Estimation errors on the crd_test2 workload.

| | $50^{th}$ | $75^{th}$ | $90^{th}$ | $95^{th}$ | $99^{th}$ | max | mean |
|---|---|---|---|---|---|---|---|
| PostgreSQL | 9.22 | 289 | 5189 | 21202 | 576147 | 4573136 | 35169 |
| MSCN | 4.49 | 119 | 3018 | 6880 | 61479 | 388328 | 3402 |
| Cnt2Crd(CRN) | 2.66 | 6.50 | 18.72 | 72.74 | 528 | 6004 | 34.42 |

TABLE 8

Estimation errors on the crd_test2 workload considering only queries with three to five joins, that is three to five columns equality predicates.

| | $50^{th}$ | $75^{th}$ | $90^{th}$ | $95^{th}$ | $99^{th}$ | max | mean |
|---|---|---|---|---|---|---|---|
| PostgreSQL | 229 | 3326 | 22249 | 166118 | 2069214 | 4573136 | 70569 |
| MSCN | 121 | 1810 | 6900 | 25884 | 83809 | 388328 | 6801 |
| Cnt2Crd(CRN) | 4.28 | 6.50 | 18.72 | 72.74 | 528 | 6004 | 34.42 |

Figure 10:
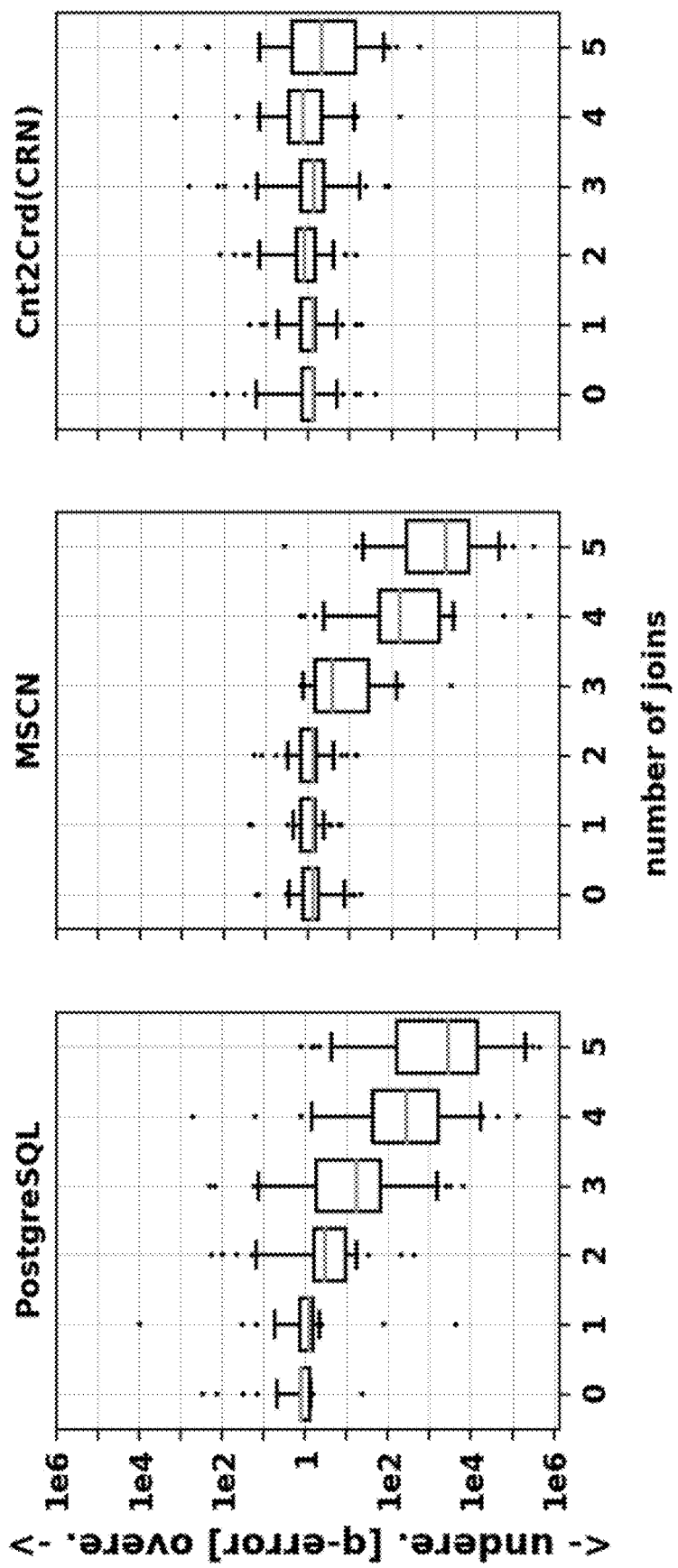
FIG. 10: Estimation errors on the crd_test2 workload, according to exemplary embodiments of the present invention.
Figure 11:
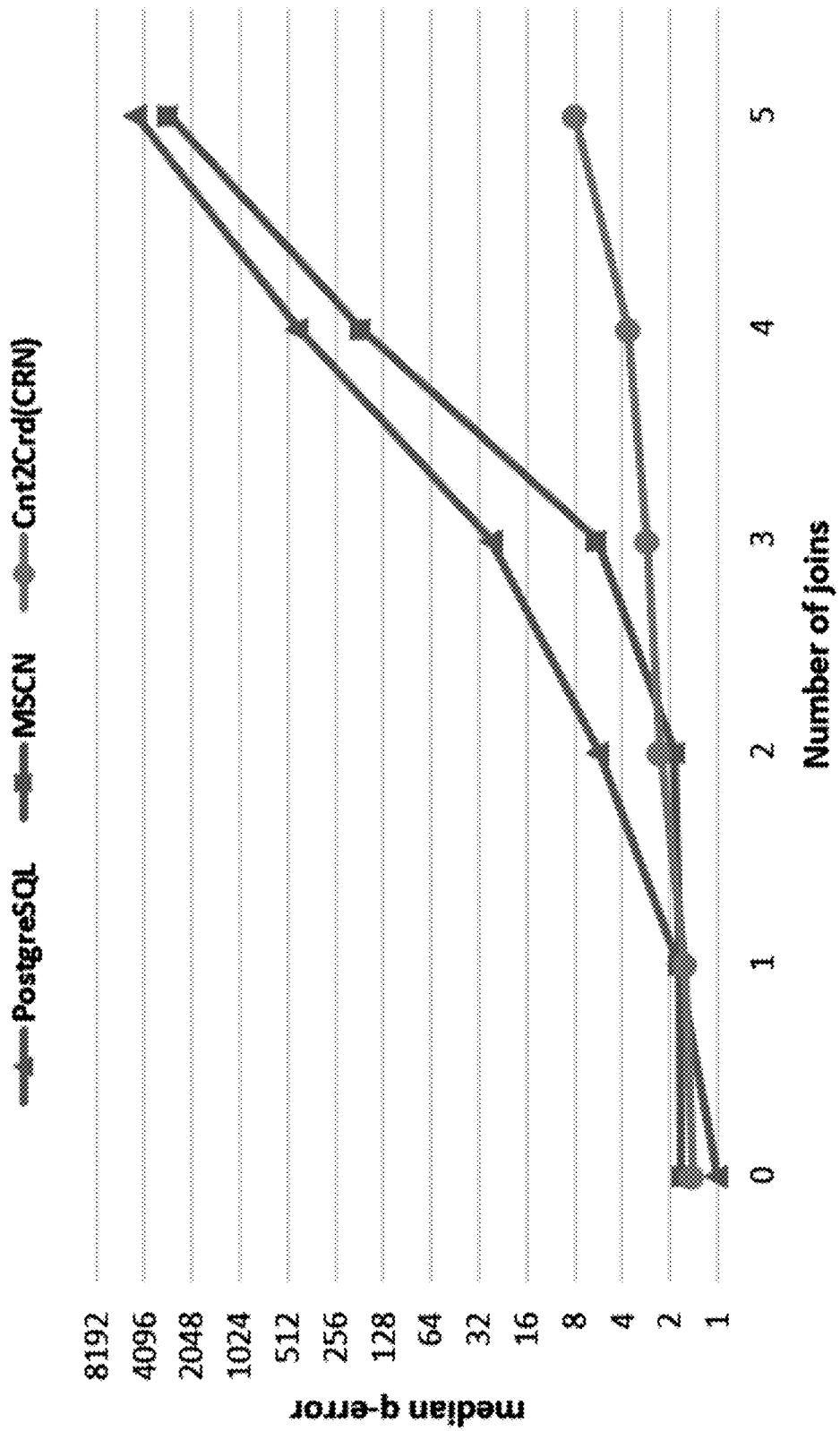
FIG. 11: Q-error medians for each number of joins, according to exemplary embodiments of the present invention.

As depicted in FIG. 10, the Cnt2Crd(CRN) model generalizes more accurately to additional joins (note that the boxes are still on the same q-error interval). To highlight these improvements, Table 9 and FIG. 11 show the mean and median q-error for each possible number of joins separately (note the logarithmic y-axis scale in FIG. 11).

The known cardinality estimation models suffer from under-estimated results and errors that grow exponentially as the number of joins increases, as also happens in the cases we examined. The Cnt2Crd(CRN) model was better at handling additional joins (even though CRN was trained only with queries with up to two joins, as was MSCN).

TABLE 9

Q-error means for each number of joins.

| Number of Joints | 0 | 1 | 2 | 3 | 4 | 5 |
|---|---|---|---|---|---|---|
| PostgreSQL | 10.41 | 216 | 25.38 | 355 | 4430 | 210657 |
| MSCN | 3.44 | 3.56 | 3.31 | 81.95 | 5427 | 14895 |
| Cnt2Crd(CRN) | 12.43 | 3.54 | 6.77 | 23.24 | 30.51 | 129 |

Generalizing to Different Kinds of Queries

In this experiment, we explore how the Cnt2Crd(CRN) model generalizes to a workload that was not generated by the same queries generator that was used for creating the present CRN model training set. To do so, we examine the scale workload that was generated using another queries generator.

As shown in Table 10, clearly Cnt2Crd(CRN) is more robust than MSCN and PostgreSQL in all the described values. Examining FIG. 12, it is clear that the Cnt2Crd (CRN) model is significantly more robust with queries with 3 and 4 joins. Recall that the QP queries pool in this experiment was not changed, while the scale workload is derived from another queries generator. In summary, this experiment shows that Cnt2Crd(CRN) generalizes to workloads that were created with a different generator than the one used to create the training data.

TABLE 10

Estimation errors on the scale workload.

| | $50^{th}$ | $75^{th}$ | $90^{th}$ | $95^{th}$ | $99^{th}$ | max | mean |
|---|---|---|---|---|---|---|---|
| PostgreSQL | 2.62 | 15.42 | 183 | 551 | 2069 | 233863 | 586 |
| MSCN | 3.76 | 16.84 | 100 | 448 | 3467 | 47847 | 204 |
| Cnt2Crd(CRN) | 2.53 | 5.88 | 24.07 | 95.26 | 598 | 19632 | 69.85 |

To further examine how Cnt2Crd(CRN) generalizes, we conducted the following experiment. We compared the Cnt2Crd(CRN) model with an improved version of the MSCN model that combines the deep learning approach and sampling techniques by using samples of 1000 materialized base tables. For simplicity we denote this model as MSCN1000.

Figure 12:
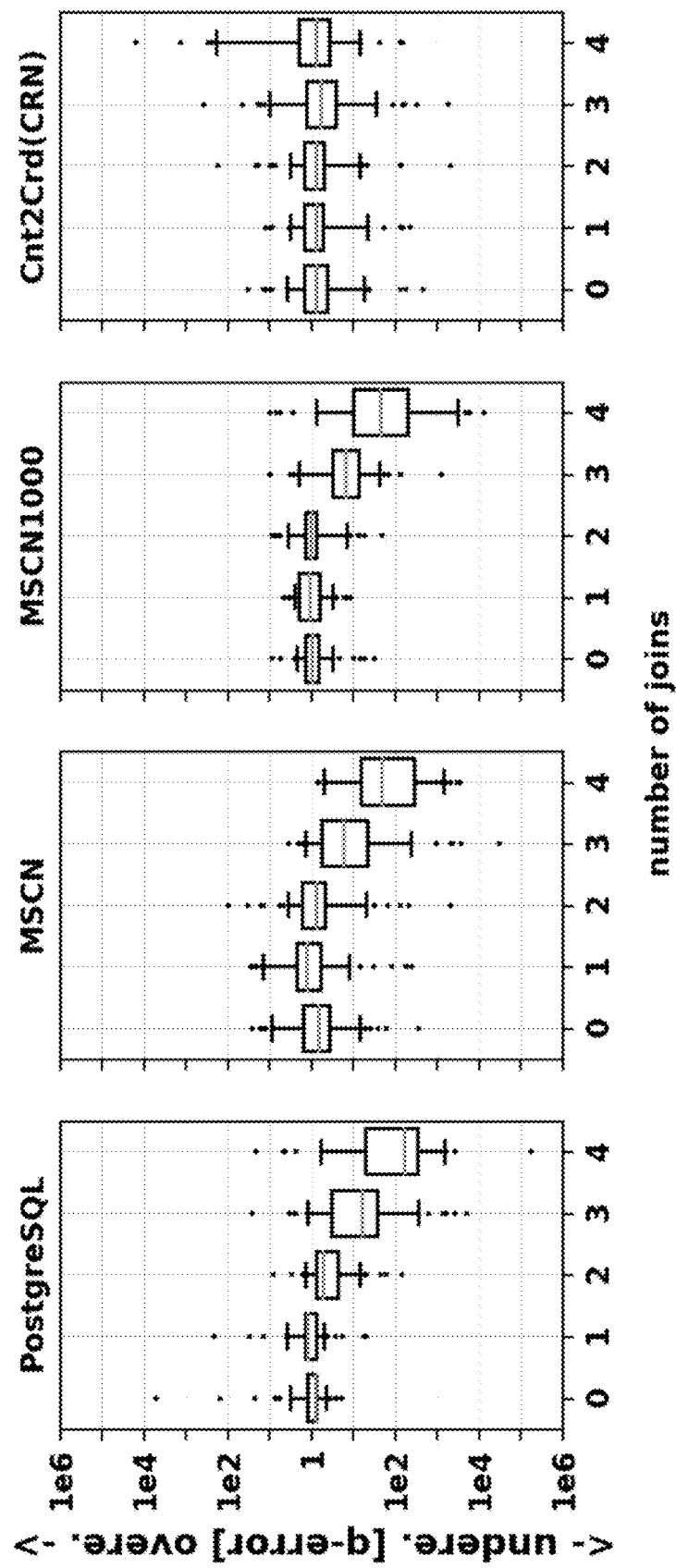
FIG. 12: Estimation errors on the scale workload, according to exemplary embodiments of the present invention.

We make the test easier for MSCN1000 model by training the MSCN1000 model with a training set that was created with the same queries generator that was used for generating the scale workload. As depicted in FIG. 12, while the MSCN1000 model is more robust in queries with zero to two joins, still, the Cnt2Crd(CRN) model was found to be superior on queries with additional joins. Recall that the present CRN model training set was not changed, while the MSCN1000 model was trained with queries obtained from the same queries generator that was used for creating the testing (i.e., scale) workload. In addition, note that MSCN1000 model uses sampling techniques whereas Cnt2Crd(CRN) does not. Thus, this experiment demonstrates the superiority of Cnt2Crd(CRN) over MSCN in generalizing to additional joins.

Improving Existing Cardinality Estimation Models

In this section we describe how existing cardinality estimation models can be improved using the idea underlying the proposed idea of using containment rates to predict cardinalities. The proposed technique for improving existing cardinality estimation models relies on the same technique for predicting cardinalities using a containment rate estimation model, as described above. Previously we used the present CRN model in predicting containment rates. CRN can be replaced with any other method for predicting containment rates. In particular, it can be replaced with any existing cardinality estimation model after "converting" it to estimating containment rates using the Crd2Cnt transformation, as described above.

At first glance, the proposed technique seems to be more complicated for solving the problem of estimating cardinalities. However, we show that by applying it to known existing models, we improve their estimates, without changing the models themselves. These results indicate that the traditional approach, which directly addressed this problem, straightforwardly, using models to predict cardinalities, can be improved upon. In the remainder of this section, we described the proposed approach, and show how existing cardinality estimation methods are significantly improved upon, by using this technique.

Approach Demonstration

Given an existing cardinality estimation model M, we first convert M to a model M' for estimating containment rates, using the Crd2Cnt transformation, as described above. Afterwards, given the obtained containment rate estimation model M', we convert it to a model M'0 for estimating cardinalities, using the Cnt2Crd transformation, as described above, which uses a queries pool. To summarize, the proposed technique converts an existing cardinality estimation model M to an intermediate model M' for estimating containment rates, and then, using M' we create a model M'0 for estimating cardinalities with the help of the queries pool, as depicted in FIG. 7 from left to right. For simplicity, given cardinality estimation model M, we denote the model M'0 described above, i.e., model Cnt2Crd(Crd2Cnt(M)), as Improved M model.

7.2 Existing Models Vs. Improved Models

The proposed technique was examined to see how it improves the PostgreSQL and the MSCN models, by using the crd_test2 workload as defined above, as it includes the highest number of joins. Table 11 depicts the estimates when using directly the PostgreSQL model, compared with the estimates when adopting the proposed technique with PostgreSQL (i.e., the Improved PostgreSQL model). Similarly, Table 12 depicts the estimates when using directly the MSCN model, compared with the Improved MSCN model.

From both tables, it is clear that the proposed technique significantly improves the estimates (by factor x7 for PostgreSQL and x122 for MSCN in terms of mean q-error) without changing the models themselves (embedded within the Improved version). These results highlight the power of the proposed approach that provides an effective and simple technique for improving existing cardinality estimation models. By adopting the proposed approach and creating a queries pool in the database, cardinality estimates can be improved significantly.

TABLE 11

Estimation errors on the crd_test2 workload.

| | $50^{th}$ | $75^{th}$ | $90^{th}$ | $95^{th}$ | $99^{th}$ | max | mean |
|---|---|---|---|---|---|---|---|
| PostgreSQL | 9.22 | 289 | 5189 | 21202 | 576147 | 4573136 | 35169 |
| Improved PostgreSQL | 2.61 | 19.3 | 155 | 538 | 17697 | 1892732 | 5081 |

TABLE 12

Estimation errors on the crd_test2 workload.

| | $50^{th}$ | $75^{th}$ | $90^{th}$ | $95^{th}$ | $99^{th}$ | max | mean |
|---|---|---|---|---|---|---|---|
| MSCN | 4.49 | 119 | 3018 | 6880 | 61479 | 388328 | 3402 |
| Improved MSCN | 2.89 | 7.43 | 25.26 | 55.73 | 196 | 3184 | 27.78 |

Improved Models vs. Cnt2Crd(CRN)

Using the crd_test2 workload, the proposed technique was examined for how it improves PostgreSQL and MSCN, compared with Cnt2Crd(CRN). Adopting the proposed technique improves the existing models as described above. Examining Table 13, it is clear that in 90% of the tests, the best estimates are those obtained when directly using the present CRN model to estimate the containment rates, instead of converting existing cardinality estimation models to obtain containment rates (Improved MSCN and Improved PostgreSQL).

TABLE 13

Estimation errors on the crd_test2 workload.

| | $50^{th}$ | $75^{th}$ | $90^{th}$ | $95^{th}$ | $99^{th}$ | max | mean |
|---|---|---|---|---|---|---|---|
| Improved PostgreSQL | 2.61 | 19.3 | 155 | 538 | 17697 | 1892732 | 5081 |
| Improved MSCN | 2.89 | 7.43 | 25.26 | 55.73 | 196 | 3184 | 27.78 |

TABLE 13-continued

Estimation errors on the crd_test2 workload.

| | $50^{th}$ | $75^{th}$ | $90^{th}$ | $95^{th}$ | $99^{th}$ | max | mean |
|---|---|---|---|---|---|---|---|
| Improved Cnt2Crd(CRN) | 2.66 | 6.50 | 18.72 | 72.74 | 528 | 6004 | 34.42 |

Cardinality Prediction Computation Time

Using the proposed idea of using containment rates estimations to predict cardinalities, the cardinality prediction process is dominated by calculating the containment rates of the given input query with the relevant queries in the queries pool, and calculating the final function F on these results to obtain the predicted cardinality, as described above. Therefore, the larger the queries pool is, the more accurate the predictions are, and the longer the prediction time is. Table 14, shows the medians and the means estimation errors on the crd_test2 workload, along with the average prediction time for a single query, when using the Cnt2Crd(CRN) model for estimating cardinalities, with different sizes of QP (equally distributed over all the possible FROM clauses in the database) while using the same final function F (the Median function)).

TABLE 14

Median and mean estimation errors on the crd_test2 workload, and the average prediction time, considering different queries pool (QP) sizes.

| QP Size | 50 | 100 | 150 | 200 | 250 | 300 |
|---|---|---|---|---|---|---|
| Median | 3.68 | 2.55 | 2.63 | 2.55 | 2.61 | 2.66 |
| Mean | 1894 | 90 | 41 | 40 | 35 | 34 |
| Prediction dime | 3.2 ms | 7.1 ms | 9.8 ms | 11.3 ms | 14.5 ms | 16.1 ms |

In table 15, we compare the average prediction time for estimating the cardinality of a single query using all the examined models (when using the whole QP queries pool of size 300). While the default MSCN model is the fastest model, since it directly estimates the cardinalities without using a queries pool, the Cnt2Crd(CRN) model is the fastest among all the models that use a queries pool.

That is, the Cnt2Crd(CRN) model is faster than the Improved MSCN model and the Improved PostgreSQL model. This is the case, since in the Improved MSCN model or the Improved PostgreSQL model, to obtain the containment rates, both models need to estimate cardinalities of two different queries as described above, whereas the present CRN model directly obtains a containment rate in one pass.

Although the prediction time of the models that use queries pools is higher than the most common cardinality estimation model (PostgreSQL), the prediction time is still in the order of a few milliseconds. In particular, it is similar to the average prediction time of models that use sampling techniques, such as the MSCN version with 1000 base tables as samples.

Recall that for the results in Table 15, we used a queries pool (QP) of size 300. We could have used a smaller pool, resulting in faster prediction time, and still obtaining better results using the models which employ a queries pool, as depicted in Table 14. Furthermore, all the models that use queries pools may be easily parallelized as discussed above, and thus, reducing the prediction time (in the tests these models run serially).

TABLE 15

Average prediction time of a single query.

| Model | Prediction Time |
|---|---|
| PostgreSQL | 2.1 ms |
| MSCN | 1.1 ms |
| MSCN with 1000 samples | 33 ms |
| Improved PostgreSQL | 70 ms |
| proved MSCN | 35 ms |
| Cnt2Crd(CRN) | 16 ms |

We introduced a new problem, that of estimating containment rates between queries over a specific database, and introduced the present CRN model, a new deep learning model for solving it. We trained CRN with generated queries, uniformly distributed within a constrained space, and showed that CRN usually obtains the best results in estimating containment rates as compared with other examined models.

In some embodiments, the present disclosure provides for a novel approach for cardinality estimation, based on the present CRN-based containment rate estimation model, and with the help of a queries pool. We showed the superiority of the present approach in estimating cardinalities more accurately than state-of-the-art approaches. Further, we showed that it addresses the weak spot of existing cardinality estimation models, which is handling multiple joins. In addition, we proposed a technique for improving any existing cardinality estimation model without the need to change the model itself, by embedding it within a three-step method.

Given that the estimates of state-of-the-art models are quite fragile, and that the present approach for estimating cardinalities is simple, has low overhead, and is quite effective, we believe that it is highly promising and practical for solving the cardinality estimation problem. To make the present containment-based approach suitable for more general queries, the present CRN model for estimating containment rates can be extended to support other types of queries, such as the union queries, and queries that include complex predicates. In addition, the present CRN model can be configured to support databases that are updated from time to time. Next, we discuss some of these extensions, and sketch possible future research directions. Strings. A simple addition to the present implementation may support equality predicates on strings. To do so, we could hash all the possible string literals in the database into the integer domain (similarly to MSCN). This way, an equality predicate on strings can be converted to an equality predicate on integers, which the present CRN model can handle.

Complex predicates: Complex predicates, such as LIKE, are not supported since they are not represented in the present CRN model.

To support complex predicates we need to change the model architecture to handle such predicates. Note that predicates such as BETWEEN and IN, may be converted to ordinary predicates.

SELECT clause: In this work we addressed only queries with a SELECT * clause. We can handle queries with SELECT clauses that include specific columns. Given such a query Q, Q's cardinality is equivalent to the cardinality of the query with a SELECT * clause instead, as long as the DISTINCT keyword is not used.

EXCEPT Operator: Given a query Q of the form Q1 EXCEPT Q2, the present CRN model can handle Q. In terms of containment rates:

$$(Q1 \text{EXCEPT} Q2) \subseteq \% \ Q3 = (Q1 \emptyset \% \ Q3 - (Q1 \cap Q2) \subseteq \% \ Q3)$$

Union Queries: Given a query Q of the from Q1 UNION Q2, the present CRN model can handle Q as follows:

$$(Q1 \text{UNION} Q2) \subseteq \% \ Q3 = Q1 \subseteq \% \ Q3 + Q2 \subseteq \% \ Q3 - (Q1 \cap Q2) \subseteq \% \ Q3$$

Using the same idea, we can handle the opposite containment direction case, and the case where there are more than two queries, recursively. The case when considering cardinalities is similar.

$$|Q1 \text{ UNION } Q2| = |Q1| + |Q2|$$

The OR operator: Given queries that include the operator OR in their WHERE clause, the present CRN model does not handle such queries straightforwardly. But we can handle such queries using a recursive algorithm that converts the queries into multiple conjunctive queries by converting the WHERE clause to DNF and considering every conjunctive clause as a separate query.

$$(Q1 \text{ OR } Q2) \subseteq \% \ Q3 = (Q1 \text{ UNION } Q2) \downarrow \% \ Q3$$

Using the same idea, we can handle the opposite containment direction case, and the case where there are more than two queries, recursively. The case when considering cardinalities is similar.

$$|Q1 \text{ OR } Q2| = |Q1 \text{ UNION } Q2| - |Q1 \cap Q2|$$

Database updates: Thus far, we assumed that the database is static (read-only database). However, in many real-world databases, updates occur frequently. In addition, the database schema itself may be changed.

To handle updates, we can use one of the following approaches: (1) We can always completely re-train the present CRN model with a new updated training set. This comes with a considerable compute cost for re-executing queries pairs to obtain up-to-date containment rates and the cost for re-training the model itself. In this approach, we can easily handle changes in the database schema, since we can change the model encodings prior to re-training it. (2) We can incrementally train the model starting from its current state, by applying new updated training samples, instead of re-training the model from scratch. While this approach is more practical, a key challenge here is to accommodate changes in the database schema. To handle this issue, we could hold, in advance, additional place holders in the present model to be used for future added columns or tables. In addition, the values ranges of each column may change when updating the database, and thus, the normalized values may be modified as well. Ways to handle this problem are the subject of current research.

Cardinality Estimation of Queries with AND, OR and NOT Operators

The present disclosure, in some embodiments, can be utilized for cardinality estimators for SQL queries with AND, OR and NOT Operators.

Above, a problem is introduced for determining containment rates between two conjunctive queries on a specific database, with shows practical applications of the solution to this problem. The containment rate of query Q1 in query Q2 on database D is the percentage of rows in Q1's execution result over D that are also in Q2's execution result over D. To address this problem, the present disclosure introduces a deep learning network, CRN, which shows the superiority of this model in estimating containment rates, compared with other methods. One of the main containment rate applications is that of cardinality estimation.

The present disclosure discloses a novel approach for estimating cardinalities using containment rates, that improved cardinality estimates significantly over existing methods.

In some embodiments, the present disclosure further considers more general queries, that include the AND, OR, and NOT operators in their WHERE clauses. Such queries constitute a broad class of frequently used queries.

Their expressive power is roughly equivalent to that of the positive relational algebra i.e., Union-Select-Cartesian-Product queries). For this reason, this class of queries had been extensively researched. It was shown that testing equivalence of relational expressions with the operators select, project, join, and union is complete in the 1 of the polynomial-time hierarchy. It was also shown that determining containment of conjunctive queries is an NP-complete problem. This also holds under additional settings. To estimate the result cardinality of general queries, the present disclosure introduces a recursive algorithm, termed herein 'the present GenCrd,' that estimates the cardinality of a general query, using any restricted model, that only estimates cardinalities for conjunctive queries, as a "subroutine".

Lately, machine learning, and deep neural networks in particular, were employed in solving many "classical" database problems, such as concurrency control, index structures, join ordering, query optimization, and recently in cardinality estimation. In the cardinality estimation context, in addition to the deep learning approach, there were many previous approaches aimed at providing accurate estimates. The two principal approaches are database profiling and sampling techniques.

However, these approaches have addressed, conceptually, the problem directly as a black box, where the input is a query, and the output is the cardinality estimate. The present disclosure shows that the present novel approach for estimating cardinalities using containment rates, as it introduced above, provides a better solution.

The present novel approach disclosed above, combined with the present GenCrd algorithm, reduces the mean q-error by a factor of x150/x175 with 4 joins general queries, and x1650/x120 with 5 joins general queries, compared with PostgreSQL and MSCN, respectively.

These results indicate that the present GenCrd can support general queries using restricted cardinality estimation models as subroutines. While the known cardinality estimation techniques suffer from under-estimated results and errors that grow exponentially as the number of joins increases, the present approach combined with the present GenCrd algorithm suffers less and clearly outperforms other methods. A comparison can be made of a technique with PostgreSQL, and the MSCN model, by examining, on the real-world IMDb database, general queries that include the AND, OR, and NOT operators. In addition, the examined queries include join crossing correlations, that are known to present a real challenge to cardinality estimation methods.

Background

Estimating Queries Containment Rate

Above, a new problem is introduced, that of determining containment rates between conjunctive queries on a specific database. Query Q1 is x %-contained in query Q2 on database D if precisely x % of Q1's execution result rows on database D are also in Q2's execution result on database D. For simplicity, the containment rate value (x %) of query Q1 in query Q2, denoted as Q1% Q2. The containment rate is defined only on pairs of queries whose SELECT and FROM clauses are identical.

Estimating the containment between two queries, can be calculated using cardinality estimation models, since by definition:

$$Q1 \subseteq \% \ Q2 = \frac{|Q1 \cap Q2|}{|Q1|}$$

Where |Q1| is the result cardinality of query Q, and query Q1∩Q2 is the intersection query of Q1 and Q2 whose SELECT and FROM clauses are identical to Q1's (and Q2's) clauses, and whose WHERE clause is Q1's AND Q2's WHERE clauses.

For estimating containment rates more accurately, the present disclosure discloses the Containment Rate Network (CRN model), a specialized deep learning scheme, which is tailored to representing pairs of SQL queries as input.

The present CRN model uses a specialized vector representation for representing the input queries. As depicted in FIG. 1, the present CRN model runs in three main stages. In the first stage, it converts the input queries into a set of vectors (Vi) representing the queries' tables, joins and columns predicates. In the second stage, it converts each set into a unique single representative vector (Qvec1) using a specialized neural network, $MLP_i$, for each set separately. In the third stage, it estimates the containment rate Q1⊆% Q2, as follows. First, it expands the representative vectors using the Expand layer, and finally it presents the expanded vector to another specialized two-layered neural network, $MLP_{out}$.

From Containment Rates to Cardinality

In a novel approach for estimating cardinalities, using containment rates estimations between conjunctive queries, is introduced. It mainly relies on the use of a queries pool. A queries pool includes multiple SQL queries with their actual cardinalities (without the queries results), and it is envisioned to be an additional component of the DBMS, along with other customary meta-data components.

Given anew conjunctive query $Q_{new}$, whose cardinality needs to be estimated, the present approach for estimating cardinalities using containment rates operates as follows. For each query $Q_{old}$ in the queries pool whose FROM clause is identical to $Q_{new}$'s FROM clause, the cardinality of $Q_{new}$ using Equation 2 is estimated.

$$|Q_{new}| = \frac{Q_{old} \subseteq \% \ Q_{new}}{Q_{new} \subseteq \% \ Q_{old}} * |Q_{old}| \quad (2)$$

Finally, all the obtained estimated cardinalities (based on the various $Q_{old}$ queries) are converted into a single value, which represents the final cardinality estimate for $Q_{new}$; this can be done using simple functions such as Median or Mean.

Ways to operate the queries pool so that for any given query $Q_{new}$, there is always at least one matching query (i.e., query with the same FROM clause) in the pool, and other relevant considerations, are discussed above.

The present CRN algorithm can be used in conjunction with Equation 2 for cardinality estimation. The transformed model denoted as Cnt2Crd(CRN). The Cnt2Crd(CRN) model over several workloads, that included over 1200 queries with zero to five joins (equally distributed in the number of joins) was evaluated. To simulate the queries pool, a small synthetic queries pool of size 300 is used. As a result, current cardinality estimates is significantly improved (by a factor of up to 1650, in terms of mean q-error, on queries with four and five joins, compared with PostgreSQL (version 11) cardinality estimation component, and the MSCN model).

Improving Existing Cardinality Estimators

Using the idea for estimating cardinalities using containment rates, a technique to improve any existing cardinality estimation model is introduced, without changing the model itself.

This is done by simply embedding the model into a three steps model as follows. Given a cardinality estimation model, M, first converting M to a model M' for estimating containment rates using the transformation described in Equation 1. Next, using the obtained model for estimating containment rates, and using a queries pool, M' can be transformed back to estimate cardinalities, using the transformation described in Equation 2. The resulting model, is denoted as Improved M.

At first glance, the present technique for solving the cardinality estimation problem seems complex. However, this technique improves upon existing cardinality estimation models significantly.

Loss Function

In this disclosure, there is a usage of the q-error metric for evaluating the quality of cardinality estimates. The q-error is the ratio between an estimated (ŷ) and the actual cardinality (y) or vice versa, as follows:

$$q - \text{error}(y, \hat{y}) = \hat{y} > y ? \frac{\hat{y}}{y} : \frac{y}{\hat{y}}$$

Supporting and, or, not Operators

MSCN and Cnt2Crd(CRN) only considered conjunctive queries (i.e., queries that use AND operators only). Other frequently used operators are the OR and NOT operators. To estimate the cardinalities of queries with these operators with CRN, there may be a need to change the present CRN model architecture.

Changing the present CRN model so it can handle such operators may disorientate the model (the problem that the model needs to learn in this case is much harder). Therefore, in the present disclosure, an alternative approach can be introduced to estimate cardinalities for more general queries using the present GenCrd recursive algorithm.

Using this approach, we can similarly configure other restricted models, that only support conjunctive queries such as the MSCN model, to estimate cardinalities for queries with the AND, OR, and NOT operators.

The Present GenCrd Algorithm

Consider estimating the cardinality of a general query Q. The present GenCrd algorithm relies mainly on two important observations.

First Observation: Given a general query Q that includes AND, OR, and NOT operators, Q can be represented as multiple conjunctive queries, union-ed with OR. That is, query Q can be transformed to a query of the form Q1 OR Q2 OR . . . OR Qn. Query Q can therefore be represented as a list of conjunctive queries [Q1,Q2, . . . ,Qn] where each Qi includes only AND operators. This is done by converting the Q's WHERE clause into disjunctive normal form (DNF), using simple logical transformation rules, and by considering each conjunctive clause as a separate query. For simplicity, a reference is made to this list [Q1,Q2, . . . ,Qn] as the DNF-list, and denote it as Q1,2, . . . ,n.

Second Observation: Consider estimating the cardinality of a general query Q, using its representing DNF-list of conjunctive queries $[Q_1, Q_2, \ldots, Q_n]$. Query Q's cardinality can be calculated as follows:

Calculate a=|Q1|
Calculate b=|Q2,3, . . . , n|
Calculate c=|Q1∩ Q2,3, . . . , n|
Then, |Q|=a+b−c Variable a can be calculated using any cardinality estimation model that supports conjunctive queries. Variable b is calculated, recursively, using the same algorithm, since the list contains only conjunctive queries, and forms a proper input for the algorithm. Similarly, variable c is calculated, recursively, as described below:

$$Q1 \cap Q2,3, \ldots, n| = |Q1 \cap [Q2, Q3, \ldots, Qn]| \quad (3)$$

Note that Equation 3 is equivalent to Equation 4:

$$[Q1 \cap Q2, Q1 \cap Q3, \ldots, Q1 \cap Qn]| \quad (4)$$

Therefore, the same recursive algorithm can be used since the resulting list also contains conjunctive queries and forms a proper input.

The algorithm is exponential in the size of the DNF-list. Given a query Q for cardinality estimation, using the present GenCrd algorithm, the cardinality estimation model can be called, at most C(m) times, where m is the size of the representing DNF-list:$C(m)=2^m-1$. Note that C(m) is an upper bound (as the number of OR operators is usually small, this expression is practically not prohibitive).

FIG. 14 shows the GenCRD algorithm, where the operator n is as defined above. Function GetDNFlist returns the list of conjunctive queries representing query Q. Function CardinalityEstimation(Q) can be implemented by any method for estimating the cardinality of the given input conjunctive query Q (see a simple example in FIG. 15).

As described in FIG. 14, during the GenCrd algorithm, multiple conjunctive queries can be created from multiple smaller queries. These queries may contain contradictory predicates, with a high probability. Therefore, to reduce the prediction time and errors, a use of the ImplyFalse algorithm can be done, before directly using the cardinality estimation models. If ImplyFlase returns True, then query Q has zero-cardinality result, and therefore the cardinality estimation model may not be called. This way, the actual number of times the cardinality estimation model is called can be significantly smaller than the upper bound given in the formula for C(m).

The ImplyFalse algorithm takes as input a conjunctive query (Q) with equality joins, and checks whether there are any contradictory predicates, if there are, it returns True, otherwise, False. The ImplyFalse algorithm runs in four main stages, as described in FIG. 15:

(1) It first initializes three maps with single element classes. Initially, each class includes a single column, with initial values accordingly.

(2) In the first For-loop, it unions the classes of the columns that must be equal using the function UnionClasses(c1,c2) which unions the classes of columns c1 and c2 into a single class. Hence, each class includes all the columns that must have equal values.

(3) In the second For-loop, it updates the maps according to the columns' predicates.

(4) Finally, in the last For-loop, it checks whether there are any contradictory predicates.

Determining whether a Boolean expression is equivalent to False has been shown to be a co-NP-complete problem in its full generality. However, the present case is tractable, and the problem is solved in linear time in the number of columns used in the input query, as described in FIG. 3A. This is due to the structural restrictions on the examined conjunctive queries. The examined conjunctive queries do not include OR or NOT, they include joins of one type only, the equality joins (col1,op,col2) where op is =. In addition, the columns' predicates are of the form (col,op,val) where op $\in [<,=,>]$2.

Figure 16:
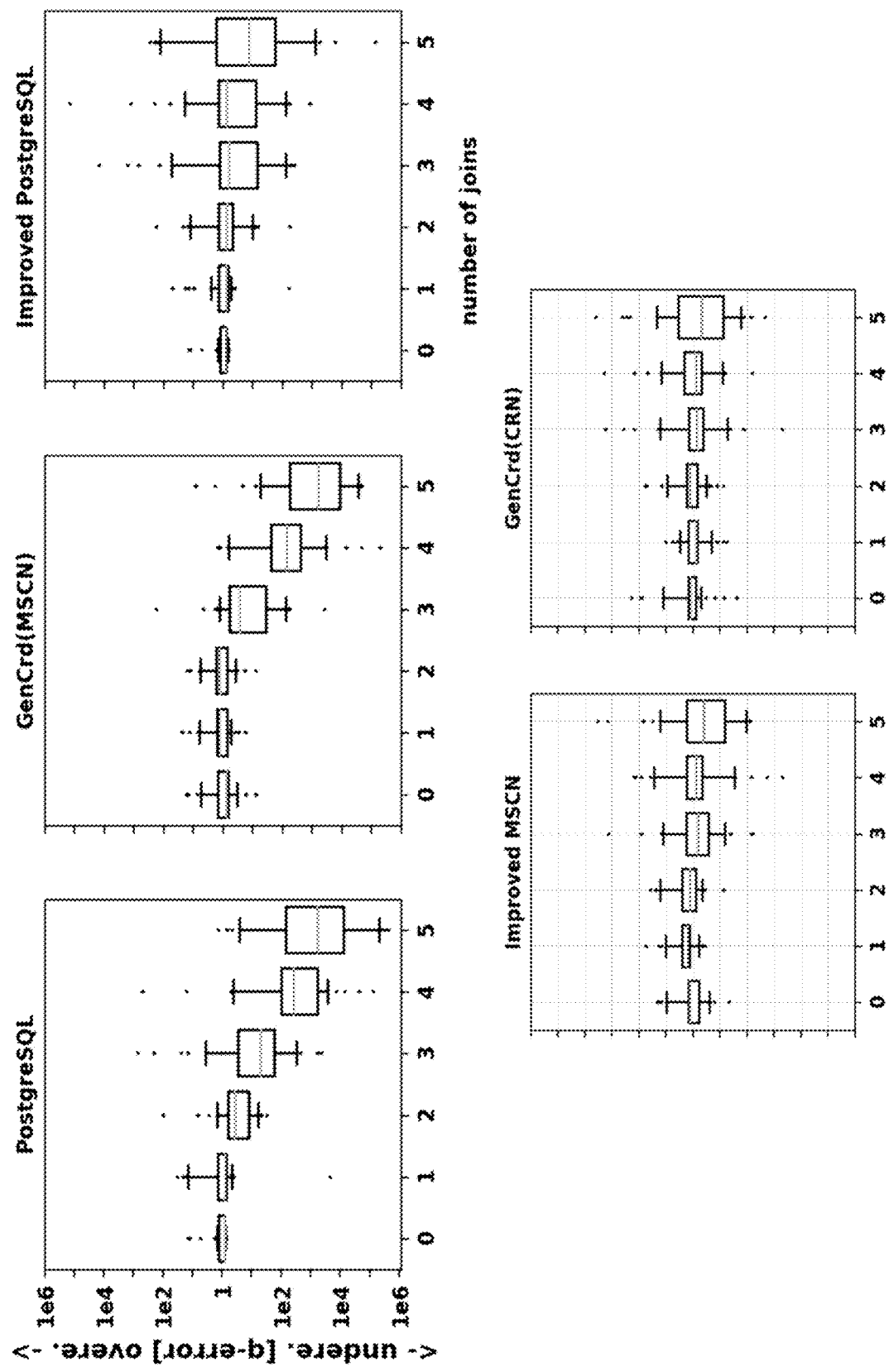
FIG. 16: Estimation errors on the GenCrd_test2 workload, according to exemplary embodiments of the present invention.

In FIG. 16, the Map[c] operator returns the corresponding value of the appropriate class in which column c is located. The ∞ symbol denotes an infinity value, and ⊥ denotes an uninitialized value. Function Min(x,y) and Max(x,y) return the minimum and the maximum between x and y, respectively.

Evaluation

The present GenCrd(CRN) (the present GenCrd algorithm can be evaluated with the Cnt2Crd(CRN) model as subroutine), was evaluated using two different test workloads. These results can be compared with those of the PostgreSQL version 11 cardinality estimation component, and the present GenCrd(MSCN) (the present GenCrd algorithm with the MSCN model as subroutine). The workloads were created using the same queries generator (using a different random seed) as disclosed above. To make a fair comparison between CRN and MSCN, both models can be trained with the same information, as described above. Both models were trained with conjunctive queries with up to two joins only.

Since the present approach for estimating cardinalities mainly relies on a queries pool, as described above a synthetic queries pool of size 300 (using the same queries generator) that includes queries was created with all the possible FROM clauses. In particular, for any query Q in the examined workloads, there is at least one matching query in the queries pool whose FROM clause is identical to Q's FROM clause.

Evaluation Workloads

The evaluation uses the challenging IMDb dataset, using two different query workloads:

the present GenCrd_test1, a synthetic workload with 450 unique queries, with zero to two joins.

the present GenCrd_test2, a synthetic workload with 450 unique queries, with zero to five joins. This dataset is designed to examine how the models generalize to additional joins.

Both workloads are equally distributed in the number of joins. From these workloads, DNF-lists can be generated, each representing a general query. For each number of joins, the queries are uniformly distributed with the size of the representing DNF-list, from 1 to 5. That is, each query has representing DNF-lists of size 1 (conjunctive query without any OR and NOT operators), up to 5 (general query whose representing DNF-list includes 5 conjunctive queries).

TABLE 16

Distribution of joins. For each number of joins the representing DNF-list size is equally distributed from 1 to 5.

| Number of joins | 0 | 1 | 2 | 3 | 4 | 5 | overall |
|---|---|---|---|---|---|---|---|
| the present GenCrd_test1 | 150 | 150 | 150 | 0 | 0 | 0 | 450 |
| the present GenCrd_test2 | 75 | 75 | 75 | 75 | 75 | 75 | 450 |

In the experiments described above, all the examined models, except for the PostgreSQL model, are restricted to supporting only conjunctive queries. Therefore, the present GenCrd algorithm can be used with these models embedded within it to estimate the cardinality of the examined general queries.

The Quality of Estimates

To examine how MSCN and Cnt2Crd(CRN) models handle general queries within the present GenCrd algorithm, the present GenCrd_test1 workload can be examined. Recall that this workload includes queries with up to two joins, as the MSCN and CRN models were trained with such conjunctive queries.

Figure 17:
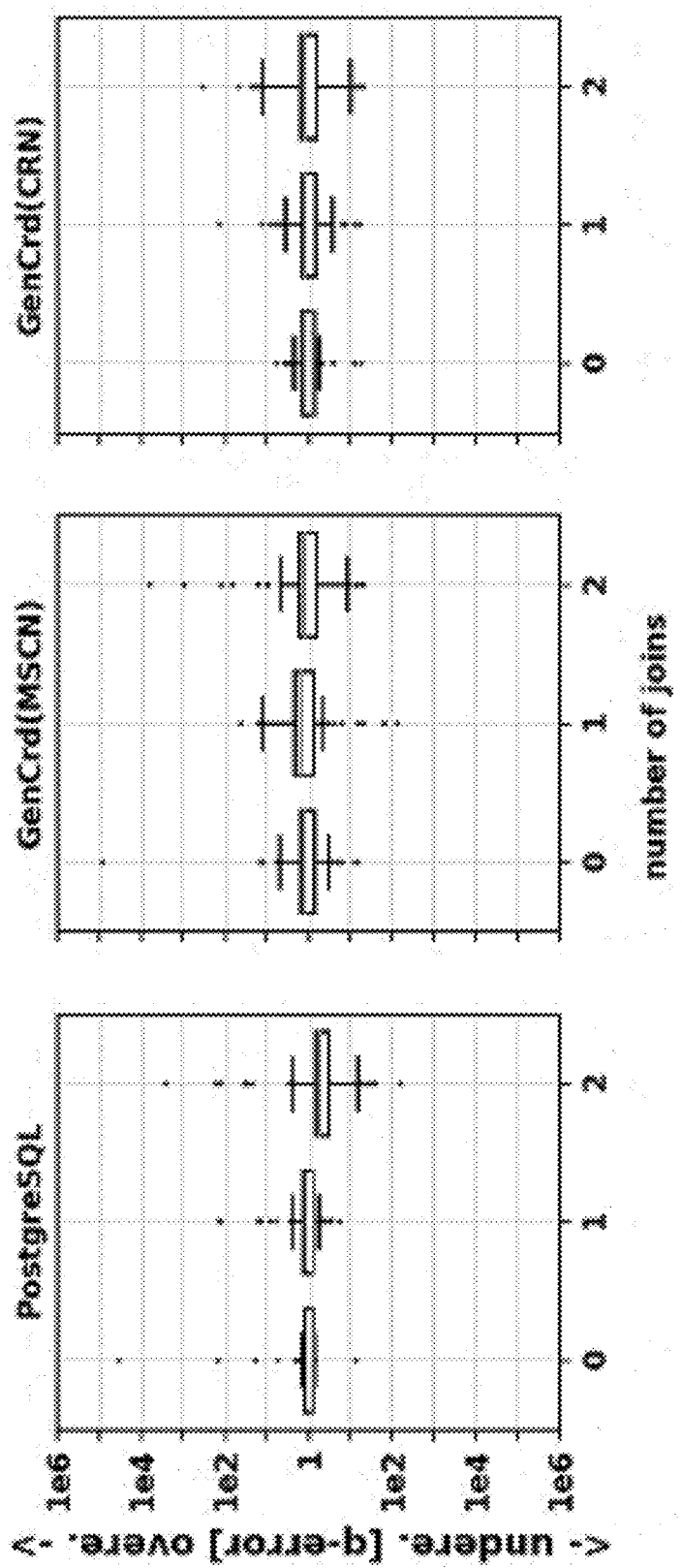
FIG. 17: Estimation errors on the GenCrd_test1 workload, according to exemplary embodiments of the present invention.

Although the MSCN and Cnt2Crd(CRN) models were initially tailored to estimate cardinalities for conjunctive queries only, examining the results in FIG. 17 and Table 17, it is apparent that when these models are expanded to support general queries using the present GenCrd algorithm, the estimates are still very accurate. While PostgreSQL obtains the best median (50th percentile), the present GenCrd(CRN) model obtains the best results in all the other considered categories. The errors are quite similar in 95% of the tested queries. The main difference is in the margin of 5% of the tested queries, where the present GenCrd(CRN) model is more robust and obtains the best mean q-error.

TABLE 17

Estimation errors on the present GenCrd_test1 workload. Depicting the percentiles, maximum, and the mean q-errors.

| | $50^{th}$ | $75^{th}$ | $90^{th}$ | $95^{th}$ | $99^{th}$ | max | mean |
|---|---|---|---|---|---|---|---|
| PostgreSQL | 1.32 | 2.57 | 7.42 | 16.57 | 154 | 52438 | 132 |
| the present GenCrd(MSCN) | 2.01 | 3.59 | 7.68 | 11.97 | 94.12 | 92684 | 232 |
| the present GenCrd(CRN) | 1.68 | 2.83 | 6.45 | 10.65 | 30.43 | 538 | 4.83 |

Generalizing to Additional Joins

The present GenCrd(MSCN) and the present GenCrd (CRN) models can be examined as to how they generalize to queries with additional joins. To do so, the present GenCrd_test2 workload which includes queries with zero to five joins can be used. It is noted herein that both the MSCN the present CRN models were trained with conjunctive queries that have only up to two joins.

Examining Table 18 and FIG. 18, it is clear that the present GenCrd(CRN) model is significantly more robust in generalizing to queries with additional joins. The present GenCrd(CRN) model reduces the mean q-error by a factor x55 compared with the present GenCrd(MSCN) and by a factor of x185 compared with PostgreSQL.

Recall that Cnt2Crd(CRN) was initially tailored to estimate cardinalities for conjunctive queries only. Therefore, these results highlight the fact that GneCrd algorithm quality of estimates, when considering general queries, are similar to those of the original models' quality (when considering conjunctive queries).

TABLE 18

Estimation errors on the present GenCrd_test2 workload.

| | $50^{th}$ | $75^{th}$ | $90^{th}$ | $95^{th}$ | $99^{th}$ | max | mean |
|---|---|---|---|---|---|---|---|
| PostgreSQL | 8.57 | 168 | 3139 | 12378 | 316826 | 647815 | 8811 |
| the present GenCrd(MSCN) | 4.17 | 84.92 | 1887 | 6769 | 60405 | 278050 | 2611 |
| the present GenCrd(CRN) | 2.26 | 6.03 | 17.49 | 71.17 | 632 | 6025 | 47.24 |

Using Improved Existing Cardinality Estimation Models

As described above using the idea of estimating cardinalities using containment rates, can improve existing cardinality estimation models. This proposed approach can be examined on how it is affected when considering general queries instead of conjunctive queries, by using the present GenCrd algorithm.

To do so, the present GenCrd_test2 workload can be examined, with the Improved MSCN and PostgreSQL models. Comparing the results of the basic models in Table 18, and those of the improved models in Table 19, it is clear that applying the present approach (i.e., containment to cardinality) to the existing cardinality estimation models, significantly improves the models, especially in the case where there are multiple joins. This holds even when considering general queries using the present GenCrd algorithm, as can be also seen in FIG. 18.

TABLE 19

Estimation errors on the present GenCrd_test2 workload.

| | $50^{th}$ | $75^{th}$ | $90^{th}$ | $95^{th}$ | $99^{th}$ | max | mean |
|---|---|---|---|---|---|---|---|
| Improved PostgreSQL | 2.18 | 10.97 | 82.75 | 286 | 2363 | 162894 | 750 |
| Improved MSCN | 2.89 | 8.45 | 27.1 | 73.59 | 537 | 5183 | 38.43 |

Prediction Time

To estimate cardinalities of general queries, with AND, OR, and NOT operators, the recursive algorithm the present GenCrd which uses models that are restricted to conjunctive queries as subroutines can be used. During the execution of the present GenCrd algorithm, there may be queries that are equivalent to False. Such queries using the ImplyFlase algorithm can be detected, thus reducing the total run time.

Examining the results of the experiments as described above, we discover that the size of the DNF-list does not affect the quality of the estimates. That is, queries with representing DN-lists of different sizes, are estimated similarly as long as they have the same number of joins (the higher the number of joins is, the worst the results are). However, the DNF-list size directly affects the prediction time. The larger the DNF-list is, the larger the prediction time is, according to the upper bound C(m) formula.

Table 20 depicts the average prediction time in milliseconds, for estimating the cardinality of a single query, when examining different models, with different DNF-list sizes.

TABLE 20

Average prediction time of a single query in ms.

| | DNF - list size | | | | |
|---|---|---|---|---|---|
| Model | 1 | 2 | 3 | 4 | 5 |
| PostgreSQL | 1.82 | 1.82 | 1.82 | 1.82 | 1.82 |
| the present GenCrd(MSCN) | 0.25 | 0.6 | 0.87 | 1.25 | 1.78 |
| Improved PostgreSQL | 75 | 166 | 261 | 374 | 541 |
| Improved MSCN | 35 | 77 | 120 | 186 | 254 |
| the present GenCrd(CRN) | 15 | 33 | 53 | 72 | 105 |

While the present GenCrd(MSCN) model is the fastest, the present GenCrd(CRN) model is the fastest among all the models that use a queries pool(the Improved models). This is so because to obtain the containment rates, in the Improved models, the models need to estimate cardinalities of two different queries as described above, whereas the present CRN model directly obtains a containment rate in a single model evaluation. Note that PostgreSQL is not affected by the size of the DNF-list, since it does not use the present GenCrd algorithm.

To conclude, the prediction time in the present GenCrd (CRN) model is still in the order of milliseconds, while it improves significantly the estimates. Note that the average prediction time is similar to that of the models that use the sampling techniques. Furthermore, some of the techniques disclosed herein can easily be parallelized as described above, thus reducing significantly the prediction time.

The present disclosure introduces the present GenCrd algorithm for generalizing cardinality estimation models that only estimate cardinalities for conjunctive queries, to support more general queries that include the AND, OR, and NOT operators. Using the present GenCrd, combined with the disclosed approach presented herein, for estimating cardinalities using containment rates, the present disclosure can improve cardinality estimates significantly as compared with state of-the-art estimators.

Further, the present disclosure shows that the technique disclosed inhere addresses the weak spot of existing cardinality estimation models, which is handling multiple joins. In addition, the present disclosure shows that the proposed recursive algorithm does not negatively affect the estimates, and the size of the DNF-list has no noticeable effect on the quality of the estimates. The proposed algorithm seems to handle arbitrary general queries efficiently. In order to handle more general queries, the present approach for estimating cardinalities, that is based on the present CRN model for estimating containment rates, can be extended to handle other types of queries.

The most interesting extension would be supporting queries that require additional knowledge regarding the number of unique values in a column or a combination of columns in the database. The main challenge in this context would be handling queries with a SELECT DISTINCT clause. Currently, the present approach cannot handle such queries since these queries return the results without duplicates, while the present approach assumes duplicates are retained. The present disclosure may assume that other types of queries (such as Group-By queries) can be transformed to queries with SELECT DISTINCT clauses. Therefore, handling SELECT DISTINCT queries would be a very challenging task that can open the door to handling many other query types. Ways to handle the DISTINCT keyword are the subject of current research.

NN-Based Transformation of SOL Cardinality Estimator for Handling DISTINCT, AND, OR and NOT SQL queries with the AND, OR, and NOT operators consytitue a broad class of highly used queries, and their cardinality estimation may be important for query optimization. A query planner requires the set-theoretic cardinality (i.e., without duplicates) for queries with DISTINCT as well as in planning. This methodology is used when considering sorting options. Yet, despite the importance of estimating query cardinalities in the presence of DISTINCT, AND, OR, and NOT, many cardinality estimation methods may be limited to estimating cardinalities of only conjunctive queries with duplicates counted.

In some embodiments, the present invention includes two methods for handling this deficiency.

In some embodiments, a specialized deep learning scheme, termed herein 'PUNQ,' which is tailored to representing conjunctive SQL queries and predicting the percentage of unique rows in the query's result with duplicate rows. In some embodiments, the predicted percentages obtained via PUNQ may be used for transforming any cardinality estimation method that only estimates for conjunctive queries, and which estimates cardinalities with duplicates (such as but not limited to: MSCN), to a method that estimates queries cardinalities devoid or substantially devoid of duplicates. In some embodiments, this enables estimating cardinalities of queries with the DISTINCT keyword.

In some embodiments, the invention further utilizes a recursive algorithm (such as but not limited to the present GenCrd algorithm) for extending any cardinality estimation method M that only handles conjunctive queries to one that estimates cardinalities for more general queries which comprise AND, OR, and NOT operators, without changing the method M itself.

In some embodiments, the present method is carried out on a challenging, real-world database with general queries that include either the DISTINCT keyword or the AND, OR, and NOT operators. In some embodiments, the methods utilized herein may be obtained by transforming different basic cardinality estimation methods. In some embodiments, these proposed methods obtain accurate cardinality estimates with the same level of accuracy as that of the original transformed methods.

In some embodiments, provided herein is a specialized deep learning method termed herein 'PUNQ') for tackling the lack of support for the set-theoretic cardinality estimation (cardinalities without duplicates). The present PUNQ model, according to some embodiments, is tailored to representing conjunctive SQL queries and predicting the percentage of unique rows within the query's result with duplicates. Given a query Q whose set-theoretic cardinality needs to be estimated, and a limited model M, the set-theoretic cardinality is estimated.

Assuming that U is the predicted percentage of unique rows in the query's result obtained from PUNQ, and C is the estimated cardinality with duplicates, obtained from model M the value C U is the estimated set-theoretic cardinality in some embodiments.

The present PUNQ model uses a tailored vector representation for representing the input queries, which enables a representation of the query's features. An input query is converted into multiple sets, each representing a different part of the query. Each element, of one of these sets, is represented by a vector. In some embodiments, these vectors are then passed into a specialized neural network that combines them into a single representative vector that represents the whole input query. In some embodiments, using a second neural network with the representative vector as input, PUNQ predicts the percentage of unique rows in the query's result with duplicates.

In some embodiments, the present PUNQ model relies on the ability of its neural network to learn the (representative) vector representation of queries. In some embodiments, a small and accurate model for estimating the percentage of unique rows in a query result that includes duplicates, is obtained.

Queries that include the AND, OR, and NOT operators in their WHERE clauses constitute a broad class of frequently used queries. Their expressive power is roughly equivalent to that of the positive relational algebra (i.e., Union-Select-Cartesian-Product queries). Therefore, estimating cardinalities for such queries is essential.

To estimate the result cardinality of such queries, In some embodiments, the invention includes introducing a recursive algorithm (such as but not limited to the present GenCrd), that estimates the cardinality of a general query (that includes the AND, OR, and NOT operators), using any limited model that only estimates cardinalities for conjunctive queries, as a "subroutine".

In some embodiments, the extension methods (both the present PUNQ model and the present GenCrd algorithm) are evaluated on a challenging database (such as real-world IMDb) with general queries that either include the DISTINCT keyword or the AND, OR, and NOT operators. In addition, the examined queries include join crossing correlations. In some embodiments, join crossing correlations present a significant challenge to cardinality estimation methods.

The extension methods of the invention, can be applied to a model such as: multi-set convolutional network (MSCN), containment rate network (CRN), Improved MSCN, and Improved PostgreSQL.

In some embodiments, the extended methods produce cardinality estimates with the same level of accuracy as that of the original methods. In some embodiments, this indicates the practicality of these extension methods, offering a simple and efficient tool for extending, any limited cardinality estimation method, to support queries that are more general.

The DISTINCT Keyword

Several cardinality estimation models are designed to estimate cardinalities with duplicates, ignoring the importance of the set-theoretic cardinality estimation in query optimization. In some embodiments, cardinality estimation models are extended without changing them, to produce set-theoretic cardinality estimates. To this end, a NN based model, PUNQ, was designed. This model is tailored to estimate the uniqueness rate of its input query. In some embodiments, a limited model (such as but not limited to: MSCN model) is transformed using the present PUNQ model, to estimate cardinalities without duplicates. In some embodiments, estimating cardinalities without duplicates results in supporting queries with the DISTINCT keyword.

Uniqueness Rate

In some embodiments, uniqueness rate of query Q on a specific database D, is defined as follows: The uniqueness rate of query Q equals to x % on database D if precisely x % of Q's execution result rows (with duplicates) on database D are unique. The uniqueness rate is formally a function from QxD to [0,1], where Q is the set of all queries, and D of all databases. This function can be directly calculated using the cardinality of the results of query Q as follows:

$$x\ \% = \frac{\|Q(D)\|}{|Q(D)|}$$

where, Q(D) denotes Q's execution result on database D. The operator $\|\cdot\|$ returns the set theoretic cardinality, and the operator $|\cdot|$ returns the cardinality with duplicates. (In case Q's execution result is empty, then Q has 0% unique rows).

In some embodiments, query Q's one column result, on database D, includes 10 rows with value 1, and 4 rows with value 2 and 1 row with value 3. By definition, query Q's cardinality with duplicates equals to 15, and the cardinality without duplicates equals to 3. Thus, Q's uniqueness rate equals to 20%. This is true, since by definition:

$$Q's\ \text{Uniqueness Rate} = \frac{\|Q(D)\|}{|Q(D)|} = \frac{3}{15} = 0.2$$

In some embodiments, provided a given a cardinality estimate C with duplicates of some query Q on D, obtained from some cardinality estimation model. By uniqueness rate definition, the set-theoretic cardinality estimation is obtained by multiplying the cardinality estimate C with the uniqueness rate of query Q. In some embodiments, using the uniqueness rates of queries we can simply transform any limited cardinality estimation method to one that estimates set-theoretic cardinality.

Learned Uniqueness Rates

In some embodiments, machine learning is applied to the uniqueness-rate estimation problem, and the following issue arise: Cold start problem: obtaining the initial training dataset, Model: determining which supervised algorithm/model should be used, and Featurization: determining useful representations of the inputs and the outputs of the model.

Cold Start Problem

In some embodiments, a training-set of queries was generated and the present model was evaluated on it (such as using the IMDb database). The IMDb database stores information about over 2.5 M movies, about 4 M related movie actors, directors, and production companies. IMDb data has many internal correlations. Thus IMDb is a legitimate database for challenging for cardinality estimators with the present PUNQ based method.

An initial training corpus was obtained by using a specialized queries generator. The generator randomly generated queries based on the IMDB schema. It uses potential columns' values for constants. The queries generator forms a query as follows: the number of tables in the query's FROM clause is chosen randomly, the specific tables are also chosen randomly, join edges are then randomly set, then, for each chosen table t, column predicates (comparison to constants) are chosen. The generator first chooses the number $p_t$ of columns predicates on table t. Then, it generates $p_t$ random column predicates. A column predicate is defined by randomly chosen three values: a column name Col, a type (<, =, or >), and a constant within the range of values in the actual database column Col.

Observe that the specifics of the SELECT clause have no impact on the result cardinality when considering cardinalities with duplicates (i.e., no DISTINCT keyword). Since the MSCN model and the present CRN model were designed to estimate cardinalities with duplicates, the queries generator can be thought of as assuming a SELECT * clause for all the generated queries. However, the specifics of the SELECT clause are extremely important for this task (predicting uniqueness rates). Therefore, the queries generator was reconfigured with the following additional step. After generating the query with the SELECT * clause, the * in the SELECT clause was replaced by randomly choosing the number of columns c to be in the query's SELECT clause, and then choosing at random c different columns from the possible columns of the chosen tables.

In order to avoid a combinatorial explosion of the number of possible queries, and to facilitate the learning of the model, in some embodiments, queries with up to two joins only were created.

Once generating the dataset of queries, the dataset queries were executed on the IMDb database, resulting in obtaining true uniqueness rates (ground truth). In this process, an initial training set was obtained for the present model comprising of 20,000 queries with zero to two joins. In some embodiments, the training samples were split into 80% training samples and 20% validation samples.

Model

The present PUNQ model for estimating the uniqueness rates (the percentage of rows in the input query's result with duplicates that are unique) was formed. In some embodiments, the present PUNQ model comprises three main stages: $1^{st}$ first stage converts the input query into a set V of vectors. A vector represents either the query's columns, tables, joins or columns predicates; $2^{nd}$ stage using a specialized neural network, $MLP_{mid}$, the set V of vectors is transformed into Qvec, a single representative vector that represents the whole input query; $3^{rd}$ stage, the percentage of unique rows is estimated using $MLP_{out}$, a two-layers neural network.

In some embodiments, a first stage comprises deriving V from Q. Each query Q was represented as a collection of four sets (A, T, J, P).

A: set of the attributes in Q's SELECT clause.
T: set of the tables in Q's FROM clause.
J: set of the join clauses in Q's WHERE clause.
P: set of the columns predicates in Q's WHERE clause.

Each element in each of the 4 sets is then represented with a vector. Together these vectors form the set V of vectors. To facilitate learning, all the vectors in V are of the same dimension and the same format as depicted in Table 21, where:

T: the number of tables in the whole database.
C: the number of columns in the whole database.
0: the number of all possible operators in predicates.

Hence, the vector size is #T+4*#C+#O+1, denoted as L.

TABLE 21

Vector Segmentation

| Type | Att. | Table | Join | | Column Predicate | | |
|---|---|---|---|---|---|---|---|
| Segment | A-seg | T-seg | J1-seg | J2-seg | C-seg | O-seg | V-seg |
| Seg. size | #C | #T | #C | #C | #C | #O | 1 |
| Feat. | hot vec. | hot vec. | 1hot vec. | hot vec. | hot vec. | hot vec. | norm. |

Figure 19:
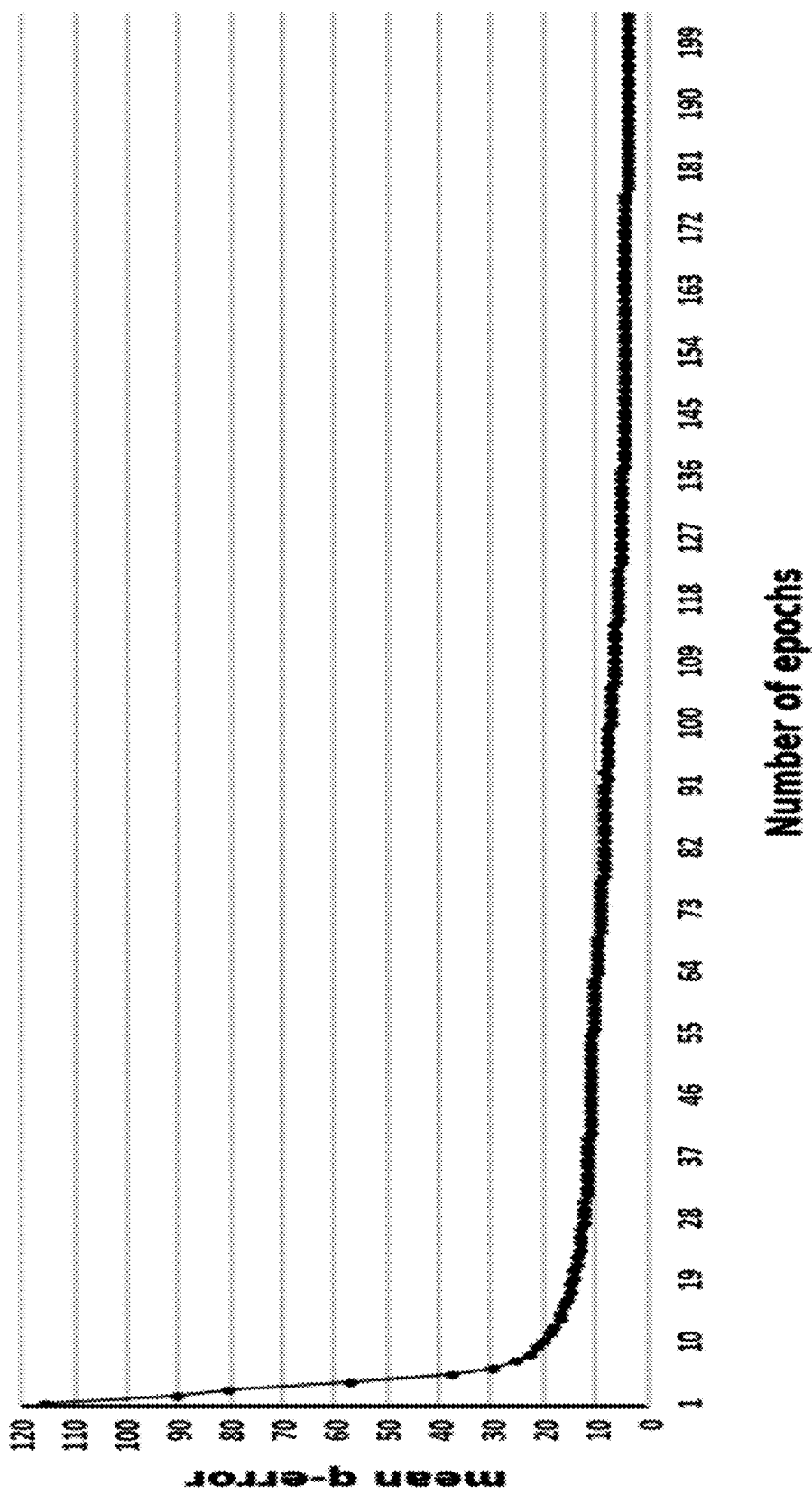
FIG. 19: Convergence of the mean q-error on the validation set, according to exemplary embodiments of the present invention.
Figure 20:
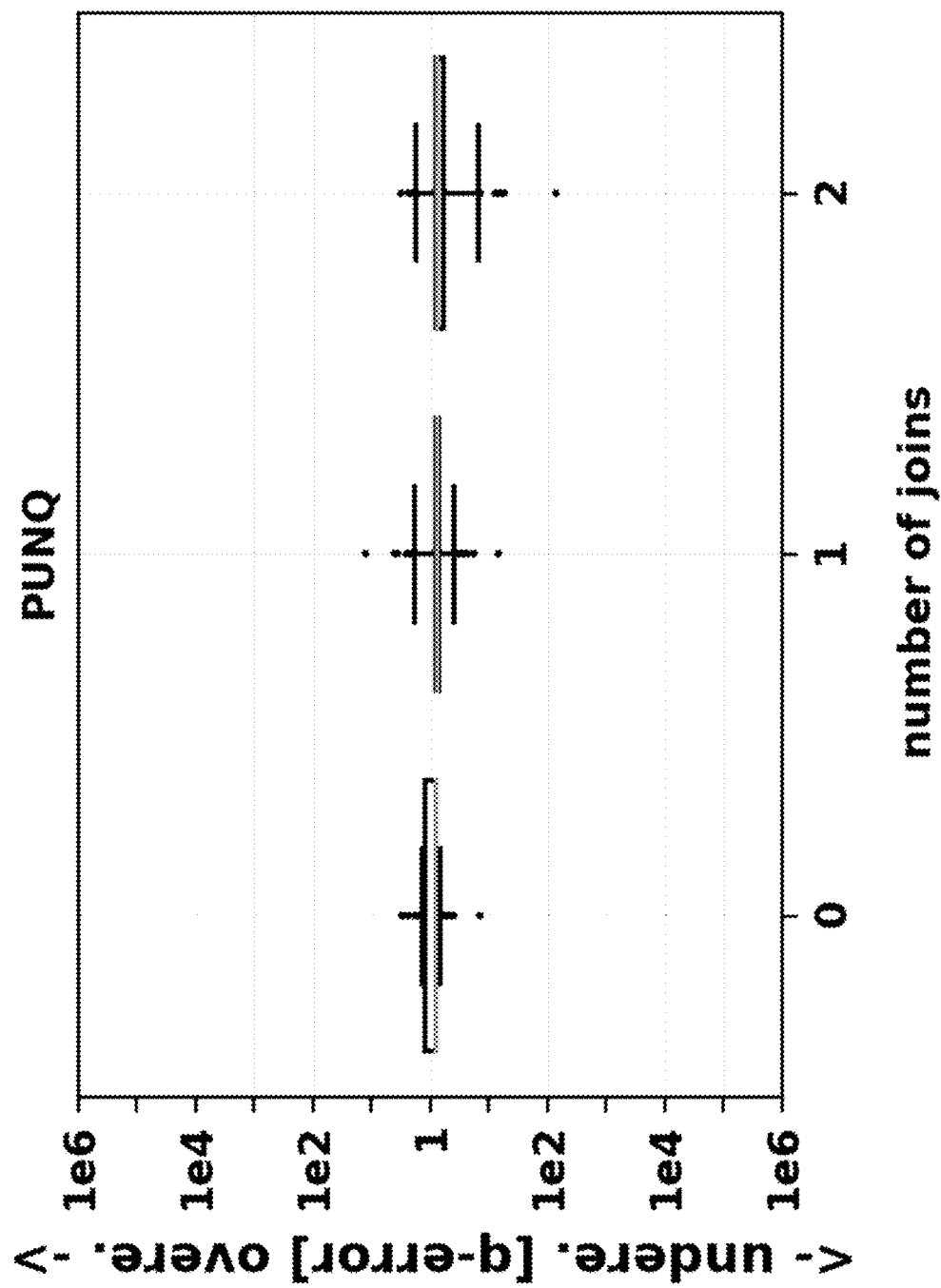
FIG. 20: Uniqueness rates estimation q-errors on the UnqCrd_test1 workload, according to exemplary embodiments of the present invention.

For each element the A, T, P, an J sets, a vector of dimension L was created, that includes zeros in all its segments, except for those that are relevant for representing its element, as follows. (see a simple example in FIG. 19)

Elements of set A, are represented in the A-seg segment. Elements of set T, are represented in the T-seg segment. Elements (col1,=, col2) of set j are represented in two segments. col1 and col2 are represented in J-seg and J2-seg segments, respectively.

Elements (col, op, val) of set P are represented in three segments. col and op are represented in the C-seg and O-seg segments, respectively; val is represented in the V-seg segment.

All the segments, except for the V-seg, are represented by a binary vector with a single non-zero entry, uniquely identifying the corresponding element (one-hot vector). For example, T-seg segment, is represented with one-hot vector uniquely identifying the corresponding table name.

In the V-seg segment, the predicates values were represented. Since their domain is usually large, representing them using one hot vectors is not practical. Therefore, these values are represented using their normalized value (a value E [0,1]).

In some embodiments, a second stage comprises deriving Qvec from V. Given the set of vectors V, each vector of V was presented as input to $MLP_{mid}$, a fully-connected one-layer neural network. $MLP_{mid}$ transforms each presented vector into a vector of dimension H. The final representation for the whole of set V is then given by Qvec, the average over the individual transformed representations of its elements, i.e., $$Qvec = \frac{1}{|V|}\sum_{v \in V} MPL_{mid}(v)$$

$$MLP_{mid}(v) = RelU(vU_{mid} + b_{mid})$$

where $U_{mid} \in R^{L \times H}$, $b_{mid} \in R^H$ are the learned weights and bias, and $v \in R^L$ is the input row vector. An average (instead of, say, sum) was used to facilitate generalization to a different number of elements in V. Had used was sum, the overall magnitude of Qvec would depend on the cardinality of the set V.

In some embodiments, a third stage comprises deriving Uniqueness rate from Qvec. Given the representative vector of the input query, Qvec, it was aimed to predict the uniqueness rate. To do so, the $MLP_{out}$, a fully-connected two-layer neural network, was used to compute the estimated uniqueness rate of the input query. $MLP_{out}$ takes as input the Qvec vector of size H. The first layer in $MLP_{out}$ converts the input vector into a vector of size 0.5H. The second layer converts the obtained vector of size 0.5H, into a single value representing the uniqueness rate. This architecture allows $MLP_{out}$ to learn the uniqueness rate function.

$$\hat{y} = MLP_{out}(Qvec)$$

$$MLP_{out}(v) = Sigmoid(ReLU(vU_{out1} + b_{out1})U_{out2} + b_{out2})$$

where $\hat{y}$ is the estimated uniqueness rate, $U_{out1} \in R^{H \times 0.5H}$ $b_{out1} \in R^{0.5H}$ and $U_{out2} \in R^{0.5H \times 1}$, $b_{out2} \in R$ (ReLU(x)=max(0, x))[1] are the learned weights and bias ([1] ReLU(x)=max(0,x); [1] Sigmoid(x)=1/(1+e$^{-x}$);).

The empirically strong and fast to evaluate ReLU activation function was used for hidden layers units in all the present neural networks. The uniqueness rate values are in the range [0,1]. Therefore, in the final step, the Sigmoid activation function was applied in the second layer to output a float value in this range. It follows that any featurization on the uniqueness rates (the output of the model) is not applied and the model is trained with the actual uniqueness rate values without any intermediate featurization steps.

Training and Testing Interface

The present PUNQ model building comprises two main steps, performed on an immutable snapshot of the database. In some embodiments, the first step includes generation of a random training set. In some embodiments, the first step includes training the present PUNQ model, using the training data, until the mean q-error of the validation test starts to converge to its best absolute value. In some embodiments, in the training phase, the early stopping technique was used.

The present PUNQ model is trained to minimize the mean q-error. The q-error is the ratio between the estimated and the actual uniqueness rate (or vice versa). Formally, assuming that y is the true uniqueness rate, and y the estimated rate, then the q-error is defined as follows.

$$q-\text{error}(y, \hat{y}) = \hat{y} > y ? \frac{\hat{y}}{y} : \frac{y}{\hat{y}}$$

This widely-used metric is the appropriate one when considering the cardinality estimation problem.

Following the training phase, and in order to predict the uniqueness rate of an input query, the (encoded) query is simply presented to the present PUNQ model, and the model outputs the estimated uniqueness rate, as described hereinunder. The model was trained and tested using the TensorFlow framework, using the Adam training optimizer.

Hyperparameter Search and Model Costs

To optimize the model's performance, the hyperparameter space was searched. Different settings were considered, where the number of the batch size (16, 32, 64, . . . , 2048), hidden layer size (16, 32, 64, . . . , 1024), and learning rate (0.001, 0.01) were varied. All the resulting 112 different hyperparameters combinations were examined. It turned out that the hidden layer size has the most impact on the models accuracy on the validation test. Until it reaches the best result, the bigger the hidden layer size is, the more accurate the model is on the validation test. Afterwards, quality declines due to over-fitting. Further, both the learning rate and the batch size mainly influence the training convergence behavior rather than the model accuracy. Averaged over 5 runs over the validation set, the best configuration has a 128 batch size, a 512 hidden layer size, and a 0.001 learning rate. These settings are thus used throughout the present model evaluation.

Under these settings, the present PUNQ model converges to a mean q-error of approximately 3.5, after running about 200 passes on the training set. Averaged over 5 runs, the 200 epochs training phase takes nearly 30 minutes.

With these settings, the disk-serialized model size is about 0.5 MB. This includes all the learned weights and biases as described herein.

PUNQ Evaluation

The present PUNQ model was examined on how well it transforms limited cardinality estimation models that predict cardinalities with duplicates, into ones that predict set-theoretic cardinalities. To this end, the four different limited models, MSCN, CRN, Improved PostgreSQL, and Improved MSCN were extended. Each model was extended as detailed below. For clarity, the following notation was used for the extended model of model M as PUNQ(M). Given query Q whose set-theoretic cardinality needs to be estimated (i.e., without duplicates), PUNQ(M) functions as follows.

Calculate C=M(Q), model's M estimated cardinality with duplicates of query Q.

Calculate U=PUNQ(Q), i.e., the uniqueness rate of query Q, obtained from the present PUNQ model.

Return U·C, the predicted set-theoretic cardinality.

Each of the four abovementioned limited models was evaluated over two test workloads. In addition, the results were compared with those of the PostgreSQL version 11 cardinality estimation component, as postgreSQL supports all SQL queries.

The workloads were created using the same queries generator (using a different random seed) as provided herein. In order to ensure a fair comparison between the models, CRN, MSCN and the present PUNQ models were trained with the same types of queries, where all the models training sets were generated using similar queries generators. In particular, these models were trained with conjunctive queries with only up to two joins only.

Evaluation Workloads

The evaluation uses the IMDb dataset, over two different query workloads:

UnqCrd_test1, a synthetic workload with 450 unique queries, with zero to two joins.

UnqCrd_test2, a synthetic workload with 450 unique queries, with zero to five joins. This dataset is designed to examine how the models generalize beyond 2 joins.

TABLE 22

Distribution of joins

| Number of Joins | 0 | 1 | 2 | 3 | 4 | 5 | overall |
|---|---|---|---|---|---|---|---|
| UnqCrd_test1 | 150 | 150 | 150 | 0 | 0 | 0 | 450 |
| UnqCrd_test2 | 75 | 75 | 75 | 75 | 75 | 75 | 450 |

The experiments examined the abovementioned four models and PostgreSQL. Except for the PostgreSQL model, all models estimate cardinalities with duplicates. Thus, the abovementioned four models were extended, using the present PUNQ model, to estimate cardinality without duplicates.

The Quality of Estimates

The UnqCrd_test1 workload was examined on two state-of-the-art limited models, MSCN and CRN. This workload includes queries with up to two joins, and the MSCN, CRN and PUNQ models were trained over such conjunctive queries. FIG. 16 and Table 23 depict the present PUNQ model uniqueness rates estimations. It is clear that the present PUNQ model estimates are very accurate, where 75% of the examined queries uniqueness rates were predicted accurately with a q-error smaller than 1.93. That is, the ratio between the estimated rates and the actual rates does not exceed 1.93, whether it is over or underestimated. These results are similar for queries with 0, 1, and 2 joins.

The fact that the present PUNQ model uniqueness rate estimates (U) are very accurate, along with the fact that the present CRN and the MSCN models cardinality estimates with duplicates (C) are accurate as well, is thus reflected in accurate cardinality estimates without duplicates (U·C).

TABLE 23

Uniqueness rates estimation q-errors on the UnqCrd_test1 workload. A presented tables depict the percentiles, maximum, and mean q-errors of the test (the p'th percentile, is the q-error value below which p % of the test q-errors are found)

|  | 50th | 75th | 90th | 95th | 99th | max | mean |
|---|---|---|---|---|---|---|---|
| PUNQ | 1.12 | 1.93 | 3.71 | 5.59 | 13.65 | 139 | 2.27 |

Figure 21:
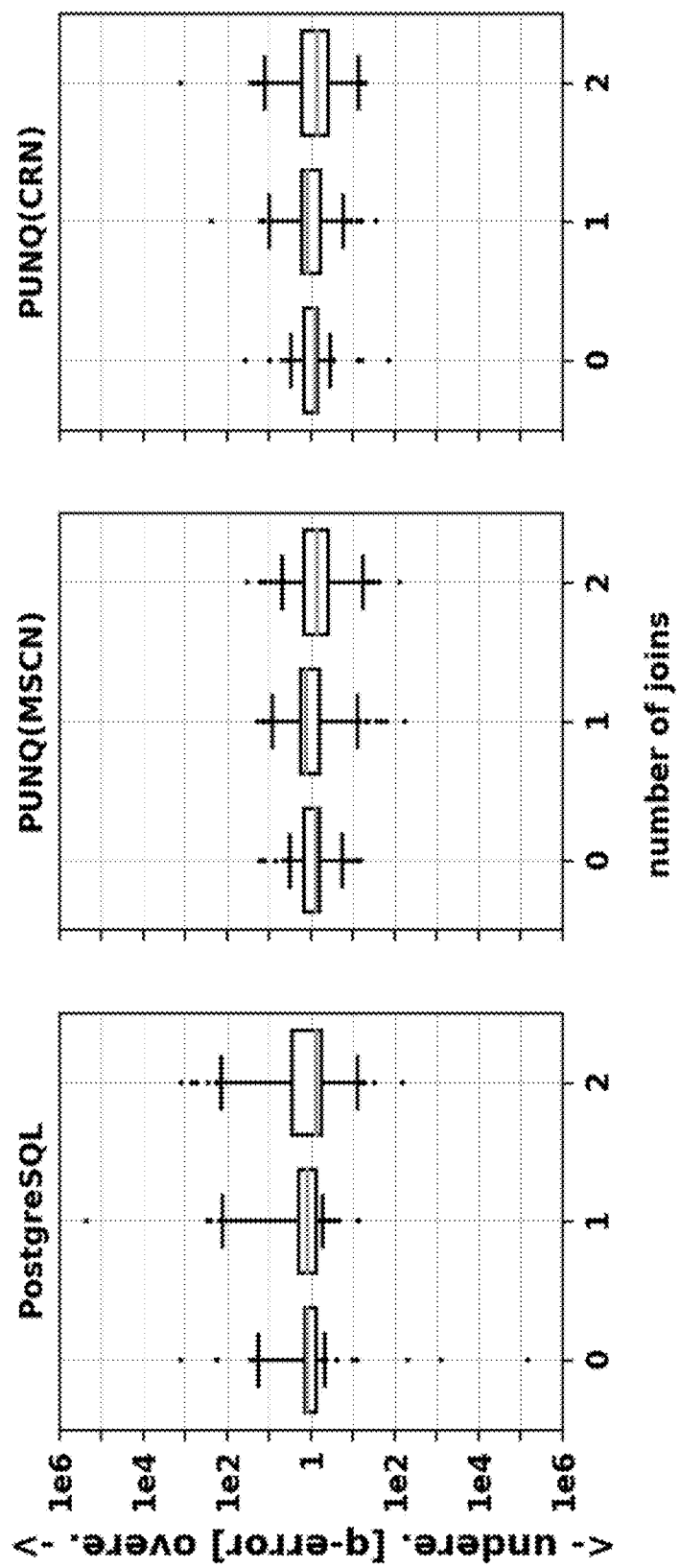
FIG. 21: Cardinality estimation q-errors on the UnqCrd_test1 workload, according to exemplary embodiments of the present invention.
Figure 22:
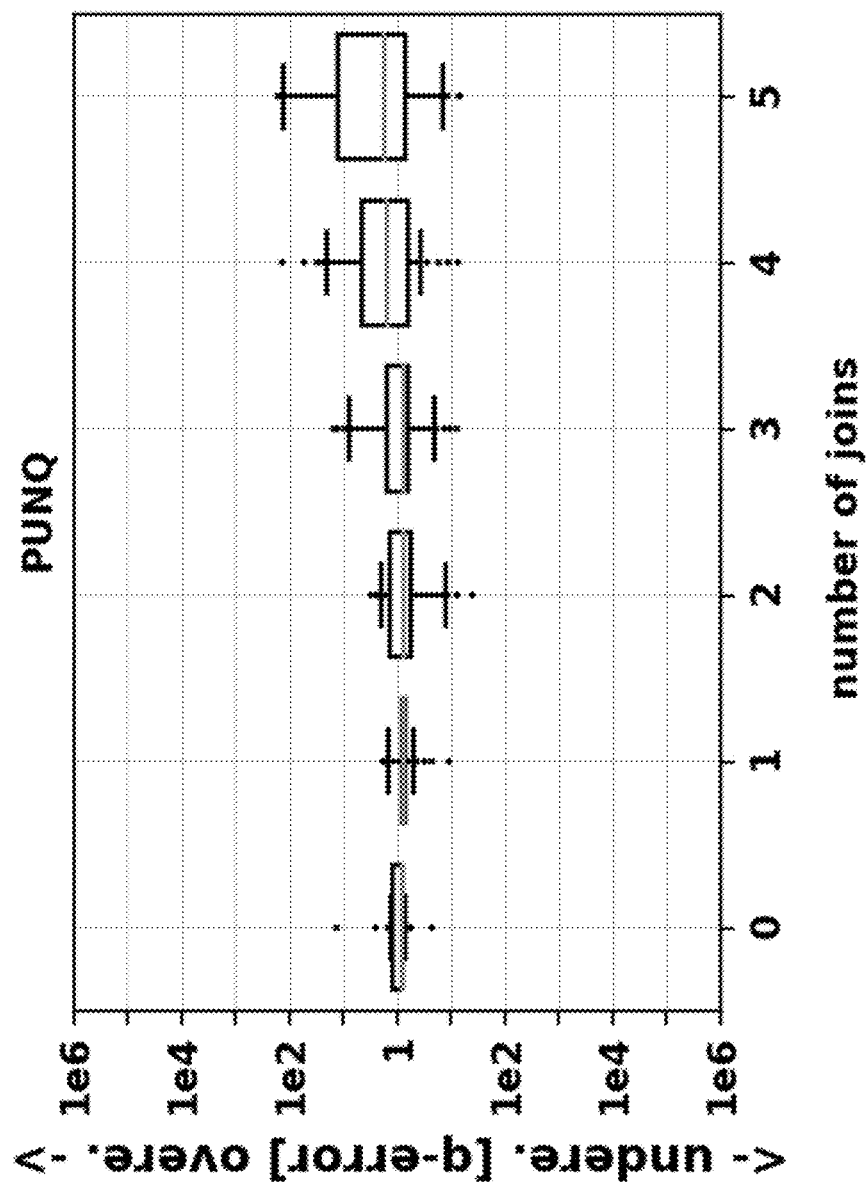
FIG. 22: Uniqueness rates estimation q-errors on the UnqCrd_test2 workload, according to exemplary embodiments of the present invention.

As a consequence, examining the results in FIG. 21 and Table 24, it is apparent that when the present CRN and MSCN models are extended to estimate cardinalities without duplicates using the present PUNQ model, the estimates are still very accurate. Observe that the models we extend were originally tailored to estimate cardinalities with duplicates only. Note that postgreSQL model was not extended using the present PUNQ model, as it supports any SQL queries as is. Interestingly, it obtained the worst results among the examined models.

TABLE 24

Cardinality estimation q-errors on the UnqCrd_test1 workload

|  | 50th | 75th | 90th | 95th | 99th | max | mean |
|---|---|---|---|---|---|---|---|
| PostgreSQL | 1.82 | 4.93 | 27.26 | 163 | 926 | 372207 | 1214 |
| PUNQ(MSCN) | 2.13 | 4.83 | 10.05 | 16.37 | 60.53 | 222 | 5.66 |
| PUNQ(CRN) | 2.05 | 4.27 | 9.98 | 15.24 | 49.11 | 1037 | 7.49 |

Generalizing to Additional Joins

In some embodiments, the present PUNQ model was further used for generalizing to queries with more than 2 joins, and how limited models adapt to such queries under the present PUNQ model extension. The UnqCrd_test2 workload which includes queries with zero to five joins was used for this. The MSCN, CRN, and PUNQ models were trained with conjunctive queries that have only up to two joins. To examine the limited cardinality estimation models more broadly, two limited models were used, the improved postgreSQL model, and the improved MSCN model, in addition to the present CRN and MSCN models.

Figure 28A:
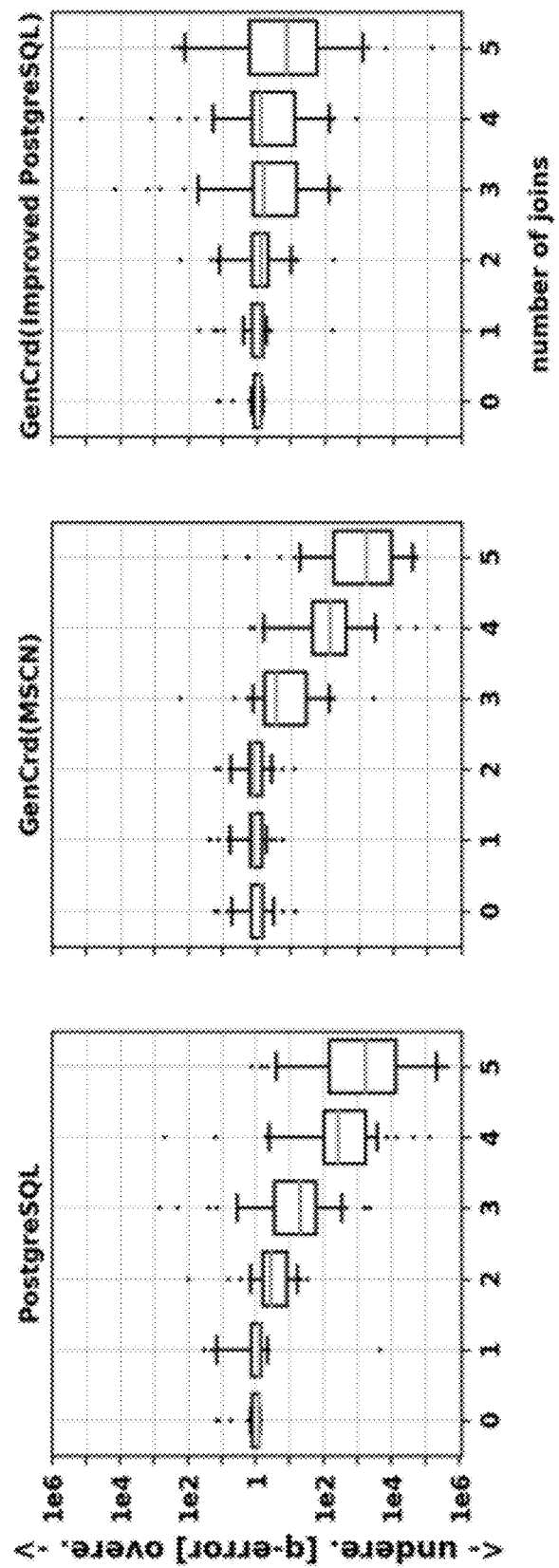
FIGS. 28A-28B: Cardinality estimation q-errors on the GenCrd_test2 workload, according to exemplary embodiments of the present invention.

FIG. 28 and Table 25 depict the present PUNQ model uniqueness rate estimations. Note that the present PUNQ model estimates are very accurate when considering queries with zero to two joins, whereas the estimates tend to over-estimate as the number of joins increases, starting from 3 joins. This is to be expected as the present PUNQ model was trained with queries with up to two joins only. Nevertheless, the overall estimates still relatively accurate.

TABLE 25

Uniqueness rates estimation q-errors on the UnqCrd_test2 workload

|  | 50th | 75th | 90th | 95th | 99th | max | mean |
|---|---|---|---|---|---|---|---|
| PUNQ | 1.75 | 3.55 | 9.9 | 18.08 | 109 | 214 | 6.62 |

Figure 23A:
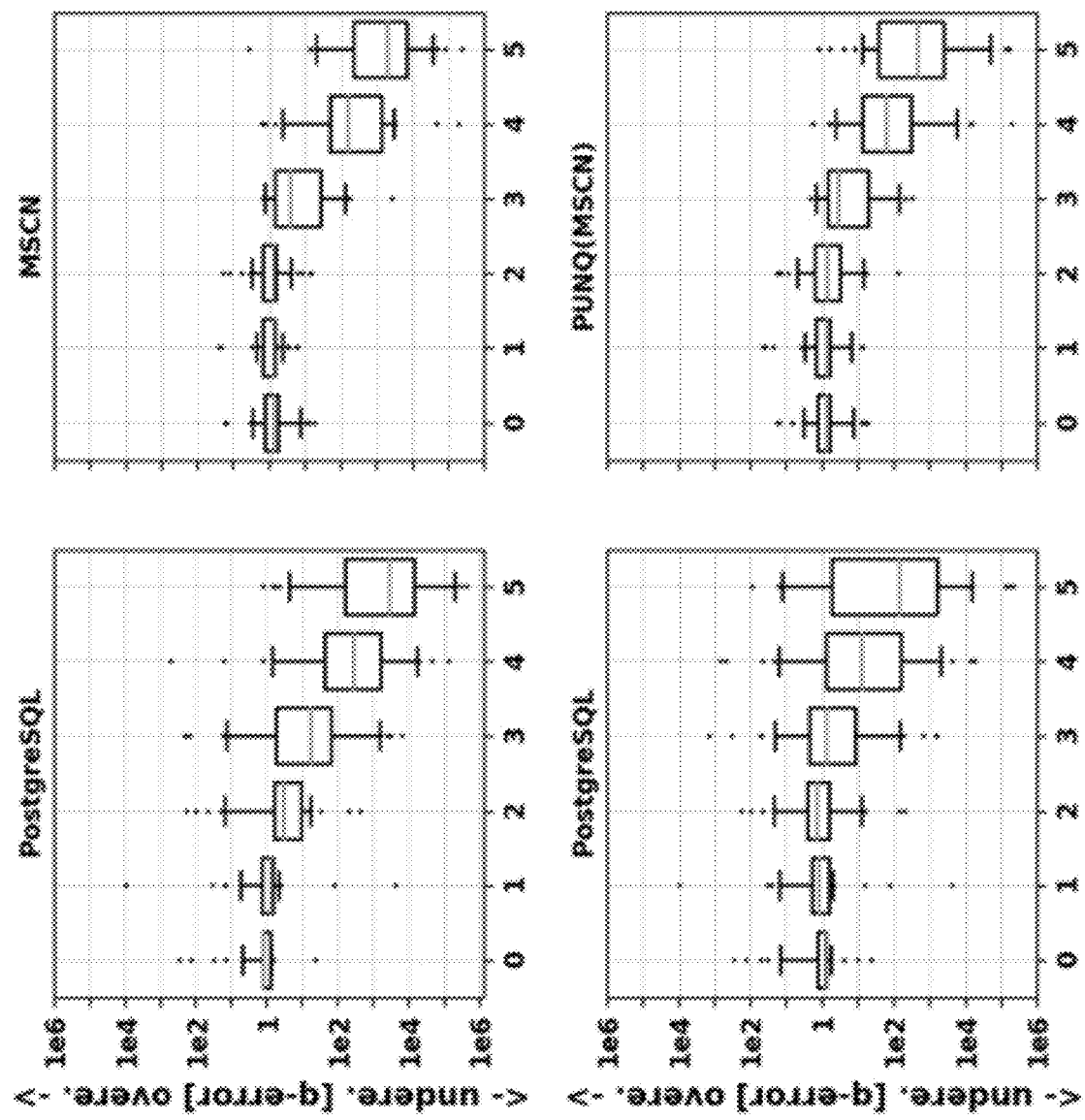
FIGS. 23A-23C: Cardinality estimation q-errors on the UnqCrd_test2 workload, according to exemplary embodiments of the present invention.
Figure 23B:
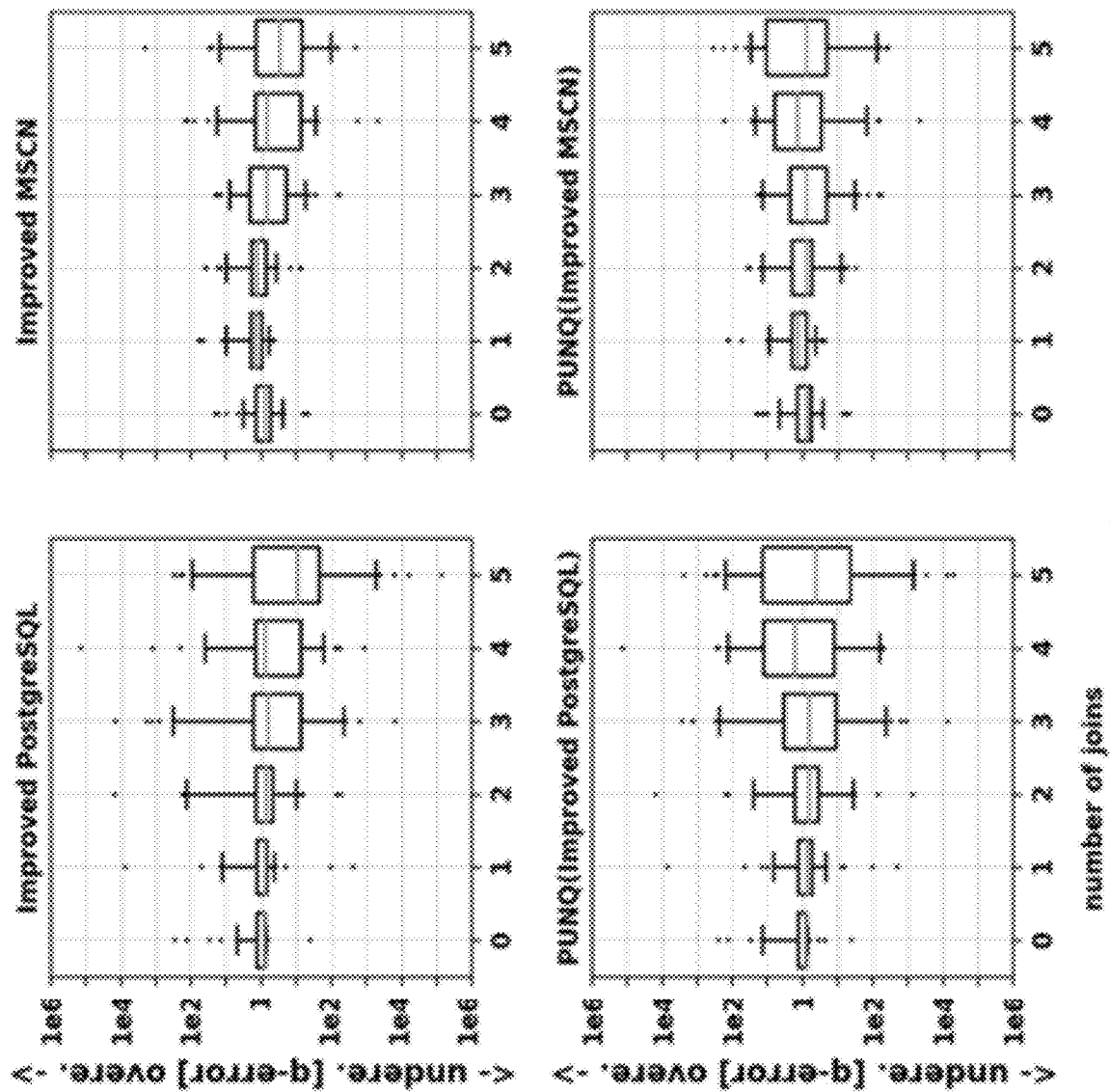
Figure 23C:
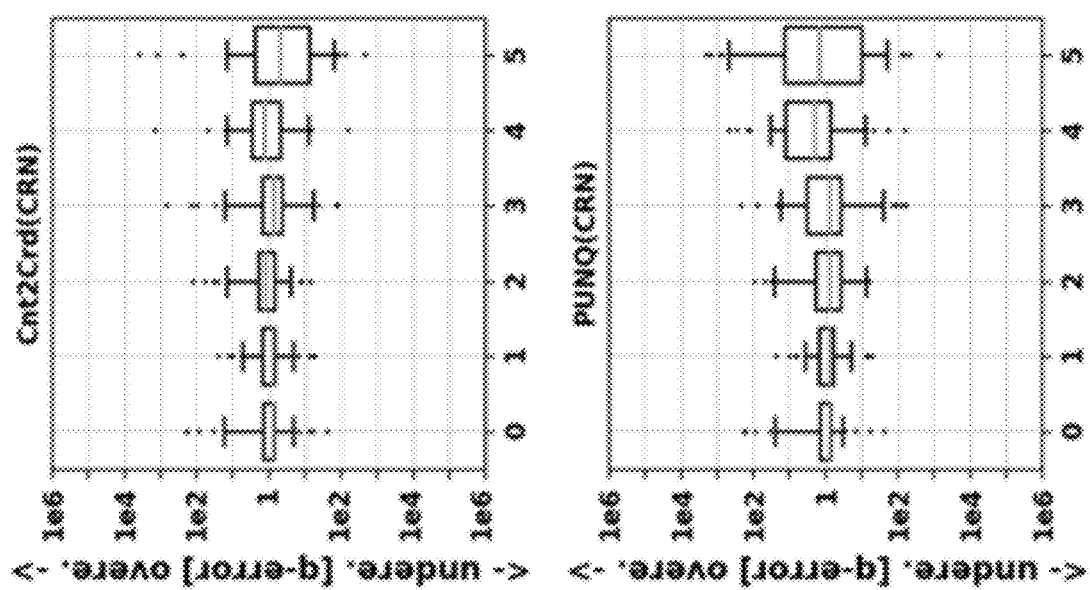

FIGS. 23A-23C represent a fuller picture of how the limited models estimates are affected when they are extended to estimate cardinalities without duplicates. In the upper part of the present GenCrd Algorithm, the limited models' cardinality estimates errors with duplicates are presented, i.e., the models' original estimates. In the bottom part, the models' estimates errors on the same queries, when the models are extended to estimate set-theoretic cardinalities using the present PUNQ model, are shown.

According to box-plots definition, 50% of the test queries are located within the box boundaries, and 90% are located between the horizontal lines. Observe that the boxes' boundaries and the horizontal lines were hardly changed in the extended models box-plots, compared with the original models box-plots. It was concluded that for each model and for each number of joins, the majority of the queries are located in the same error domains. That is, the models' accuracies were hardly changed after extending them using the present PUNQ model. They maintained almost the same quality of estimates for set-theoretic cardinality, as the original models' quality for estimating cardinality with duplicates.

In queries with more than 2 joins, the present PUNQ model suffers from slightly overestimated uniqueness rates, which directly affect the extended models set-theoretic cardinality estimates. This is depicted via their box-plots horizontal lines moving a bit upwards as compared with the box-plots of the original models estimates.

Table 26 shows the cardinality estimates errors percentiles and means using the examined extended models.

TABLE 26

Cardinality estimation q-errors on the UnqCrd_test2 workload.

| | 50th | 75th | 90th | 95th | 99th | max | mean |
|---|---|---|---|---|---|---|---|
| PostgreSQL | 3.95 | 34.95 | 651 | 2993 | 20695 | 331152 | 2029 |
| PUNQ(MSCN) | 4.85 | 59.65 | 1189 | 5476 | 86046 | 288045 | 3430 |
| PUNQ(Imp. Post.) | 3.51 | 20.97 | 134 | 444 | 9770 | 136721 | 563 |
| PUNQ(Imp. MSCN) | 3.15 | 10.35 | 33.73 | 88.61 | 244 | 3298 | 24.46 |
| PUNQ(CRN) | 3.31 | 10.81 | 39.95 | 90.98 | 778 | 3069 | 35.71 |

Thus it is clear that the PUNQ(CRN) and PUNQ(Improved MSCN) models are significantly more robust in generalizing to queries with additional joins as compared with the other examined models. In particular, the two models are more robust than postgreSQL. This is despite the fact that postgreSQL can estimate cardinalities without duplicates by default, without the need to extend it using the present PUNQ model, as was done for the other limited models.

These results highlight the usefulness of the present PUNQ model in extending limited models. PUNQ therefore presents a tool to extend limited models, while keeping their quality of set-theoretic estimates roughly without change.

PUNQ Prediction Time

As described above, to estimate cardinalities without duplicates by extending limited cardinality estimation models, the present PUNQ model was used along with the estimated cardinalities of these models. Therefore, the prediction time of cardinalities without duplicates by extending limited models, consists of two parts. First, the prediction time of the limited model. Second, the prediction time of the uniqueness rate, obtained from the present PUNQ model.

The prediction times of the limited models vary, depending on the model itself. Table 9 depicts the average prediction time in milliseconds, for estimating cardinality with duplicates of a single query, when using different limited models.

TABLE 27

Average prediction time of a single query.

| Model | MSCN | CRN | Imp. MSCN | Imp. PostgreSQL |
|---|---|---|---|---|
| Prediction time | 0.25 ms | 15 ms | 35 ms | 75 ms |

The prediction time of the present PUNQ model, includes the time for converting the input query Q to the representing sets of vectors A, T, J, and P. Then presenting these vectors to the present PUNQ neural network, as described 2.4. On average, this process takes 0.05 ms, per query. This includes the overhead introduced by the Tensor-Flow framework. Therefore, the prediction time overhead due to using the present PUNQ model, when extending limited models, is minor (0.05 ms), as compared with the limited models' prediction times (of cardinalities with duplicates).

Supporting AND, OR & NOT

Several cardinality estimation models consider only conjunctive queries (i.e., queries that only use the AND operator). Other frequently used operators are the OR and NOT operators. To estimate the cardinalities of queries with OR and NOT with such models, their architectures were altered. Changing architectures is complex, as each model is structured in a different way. Therefore, a uniform alternative approach for estimating cardinalities for general queries was introduced, namely the present GenCrd algorithm. Using this approach, it was possible to use any limited model, that only supports conjunctive queries, to estimate cardinalities for queries with the AND, OR, and NOT operators.

The Present GenCrd Algorithm

Consider estimating the cardinality of a general query Q. The present GenCrd algorithm relies mainly on two observations.

First Observation: Given a general query Q that includes AND, OR, and NOT operators, we can represent Q as multiple conjunctive queries, union-ed with OR. That is, query Q can be transformed to a query of the form $Q_1$ OR $Q_2$ OR ... OR $Q_n$. It was therefore possible to represent query Q as a list of conjunctive queries $[Q_1, Q_2, \ldots, Q_n]$ where each $Q_1$ includes only AND operators (with the same SELECT and FROM clauses as in query Q). This was done by converting Q's WHERE clause into disjunctive normal form (DNF), using simple logical transformation rules, and by considering each conjunctive disjunct as a separate query. For simplicity, it was referred to this list $[Q_1, Q_2, \ldots, Q_n]$ as the DNF-list, and denote it as $Q_{1,2,\ldots,n}$.

Second Observation: Consider estimating the cardinality of a general query Q, using its representing DNF-list of conjunctive queries $[Q_1, Q_2, \ldots, Q_n]$. Query Q's cardinality can be calculated by a simple algorithm, as follows:

Calculate $a=|Q_1|$.
Calculate $b=|Q_{2,3,\ldots,n}|$
Calculate $c=|Q_1 \cap Q_{2,3,\ldots,n}|$•Then, $|Q|=a+b-c$.

Quantity a can be calculated using any cardinality estimation model that supports conjunctive queries. Quantity b is calculated, recursively, using the same algorithm, since the list contains only conjunctive queries, and forms a proper input for the algorithm. Similarly, quantity c is calculated, recursively, as described below:

$$|Q_1 \cap Q_{2,3,\ldots,n}| = |Q_1 \cap [Q_2, Q_3, \ldots, Q_n]| \quad (1)$$

Equation 1 is equivalent to Equation 2:

$$|[Q_1 \cap Q_2, Q_1 \cap Q_3, \ldots, Q_1 \cap Q_n]| \quad (2)$$

Therefore, same recursive algorithm was used since the resulting list also contains conjunctive queries and forms a proper input with fewer queries.

The algorithm is exponential in the size of the DNF-list. Given a query Q for cardinality estimation, using the present GenCrd algorithm, the cardinality estimation model was called at most C(m) times, where m is the size of the representing DNF-list:

$$C(m)=2^3-1$$

C(m) is an upper bound. As the number of OR operators is usually small, this expression is practically not prohibitive.

FIG. 24 shows an exemplary GenCRD algorithm of the present disclosure. In the present GenCrd Algorithm, Q1∩Q2 is the intersection query of Q1 and Q2 whose SELECT and FROM clauses are identical to Q1's (and Q2's) clauses, and whose WHERE clause is Q1's AND Q2's WHERE clauses. Function GetDNFlist returns the list of conjunctive queries representing query Q. Function Cardinality(Q) can be implemented by using any limited cardinality estimation model for estimating the cardinality of the given input conjunctive query Q (see for example FIG. 25).

As described, during the execution of the present GenCrd algorithm multiple conjunctive queries were created from multiple smaller queries. These queries may often contain contradictory predicates. Therefore, to reduce the prediction time and errors, the ImplyFalse algorithm was used, before directly using the cardinality estimation models. If ImplyFlase returns True, then query Q has zero-cardinality, and therefore there is no need to call the cardinality estimation model subroutine. This way, the actual number of times for call the cardinality estimation model is practically smaller than the upper bound given in the formula for C(m).

Depending on its implementation, Function Cardinality (Q) returns the cardinality of Q with, or without, duplicates. In the first (respectively, second) case, the present GenCrd therefore returned cardinalities with (respectively, without) duplicates. A generic method to estimate set-theoretic cardinalities was shown, using PUNQ. Thus, function Cardinality(Q) is implemented such that it returns set-theoretic cardinalities.

The ImplyFalse Algorithm

The ImplyFalse algorithm takes as input a conjunctive query (Q) with equality joins, and checks whether there are any contradictory predicates, if there are, it returns True, otherwise, False.

The ImplyFalse algorithm runs in four main stages. It first initializes three maps with single element classes. Initially, each class includes a single column, with initial values accordingly. In the first For-loop, it unions the classes of the columns that must be equal using the function UnionClasses (c1,c2) which unions the classes of columns c1 and c2 into a single class. Hence, each class includes all the columns that must have equal values. In the second For-loop, it updates the maps according to the columns' predicates. Finally, in the last For-loop, it checks whether there are any contradictory predicates.

Determining whether a conjunctive Boolean expression is equivalent to False has been shown to be a co-NP-complete problem in its full generality. However, this case is tractable, and the problem is solved in linear time in the number of columns used in the input query. This is due to the form of the examined conjunctive queries (comparison to constants). The examined conjunctive queries include joins of one type only, equality join (col1,op,col2) where op is =. In addition, the columns' predicates are of the form (col,op,val) where op E [<, =, >] (Operator ≤ can be expressed with <,= and OR. Similarly, operator≥).

In FIG. 26, the Map[c] operator returns the corresponding value of the appropriate class in which column c is located. The ∞, ⊥ symbols denote an infinity and uninitialized value, respectively. Functions Min(x,y) and Max(x,y) return the minimum and the maximum between x and y, respectively.

GenCRD Evaluation

It was further examined how well the present GenCrd algorithm, transforms limited cardinality estimation models that only handles conjunctive queries into ones that support queries with the AND, OR, and NOT operators. To do so the same four models that were used in the present PUNQ evaluation were extended. Each model was extended by simply using the model in the present GenCrd algorithm as a subroutine, replacing the Cardinality function used in the algorithm. The present GenCrd extended model of M was denoted as the present GenCrd(M).

Each of the four examined limited models was evaluated over two test workloads. In addition, the results were compared with those of the PostgreSQL version 11 cardinality estimation component, as postgreSQL supports all SQL queries. The workloads were created using the same queries generator (using a different random seed). In order to ensure a fair comparison, the present CRN and MSCN models were trained similarly.

Evaluation Workloads

The evaluation uses the IMDb dataset, over two different query workloads:

the present GenCrd_test1, a synthetic workload with 450 unique queries, with zero to two joins.

the present GenCrd_test2, a synthetic workload with 450 unique queries, with zero to five joins. This dataset is designed to examine how the models generalize beyond 2 joins.

Both workloads are equally distributed in the number of joins. From these workloads DNF-lists were generated, each representing a general query. For each number of joins, the queries are uniformly distributed in terms of the size of the representing DNF-list, from 1 to 5. That is, each query has representing DNF-lists of sizes 1 (conjunctive query without any OR and NOT operators), up to 5 (general query whose representing DNF-list includes 5 such conjunctive queries).

TABLE 28

Distribution of joins. For each number of joins the representing DNF-list size is equally distributed from 1 to 5.

| number of joins | 0 | 1 | 2 | 3 | 4 | 5 | overall |
|---|---|---|---|---|---|---|---|
| GenCrd_test1 | 150 | 150 | 150 | 0 | 0 | 0 | 450 |
| GenCrd_test2 | 75 | 75 | 75 | 75 | 75 | 75 | 450 |

All the examined models, except for the PostgreSQL model, are limited to supporting only conjunctive queries. Therefore, the present GenCrd algorithm was used with these models embedded within it to estimate the cardinalities of the examined queries.

The Quality of Estimates

We examined the present GenCrd_test1 workload using two state-of-the-art limited models, MSCN and CRN. Recall that this workload includes queries with up to two joins, as MSCN and CRN were trained over such conjunctive queries.

Figure 27:
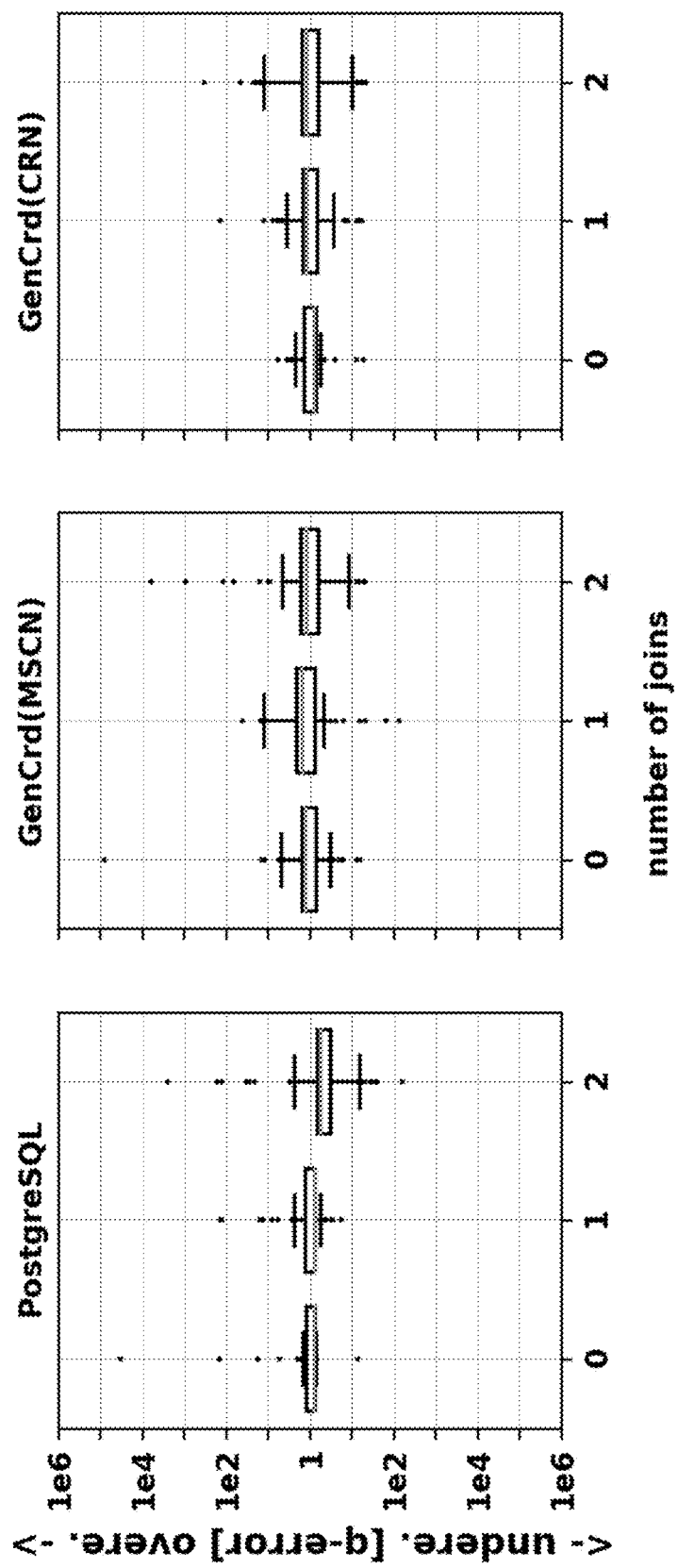
FIG. 27: Cardinality estimation q-errors on the GenCrd_test1 workload, according to exemplary embodiments of the present invention.

Although the MSCN and CRN models were initially tailored to estimate cardinalities for conjunctive queries only, examining the results in FIG. 27 and Table 29, it is apparent that these models are successfully extended to estimate cardinalities accurately for general queries using the present GenCrd algorithm.

TABLE 29

Cardinality estimation q-errors on the present GenCrd_test1 workload

|  | 50th | 75th | 90th | 95th | 99th | max | mean |
|---|---|---|---|---|---|---|---|
| PostgreSQL | 1.32 | 2.57 | 7.42 | 16.57 | 154 | 52438 | 132 |
| GenCrd(MSCN) | 2.01 | 3.59 | 7.68 | 11.97 | 94.12 | 92684 | 232 |
| GenCrd(CRN) | 1.68 | 2.83 | 6.45 | 10.65 | 30.43 | 538 | 4.83 |

The present GenCrd algorithm is an "analytic" algorithm, therefore it does not include any training, in contrast of the present PUNQ model. Therefore, when using the present GenCrd algorithm, the number of joins, in queries in the DNF-list, has no direct effect on the results accuracy.

The quality of estimates merely depends on the quality of the limited cardinality estimation models (that are used as subroutines in the present GenCrd algorithm). In contrast, the present PUNQ model estimations, are intrinsically affected by the number of joins, and it over-estimates as the number of joins increases.

Generalizing to Additional Joins

The present GenCrd algorithm was examined with queries with more than 2 joins. To do so the present GenCrd_test2 workload which includes queries with zero to five joins was used.

Figure 28B:
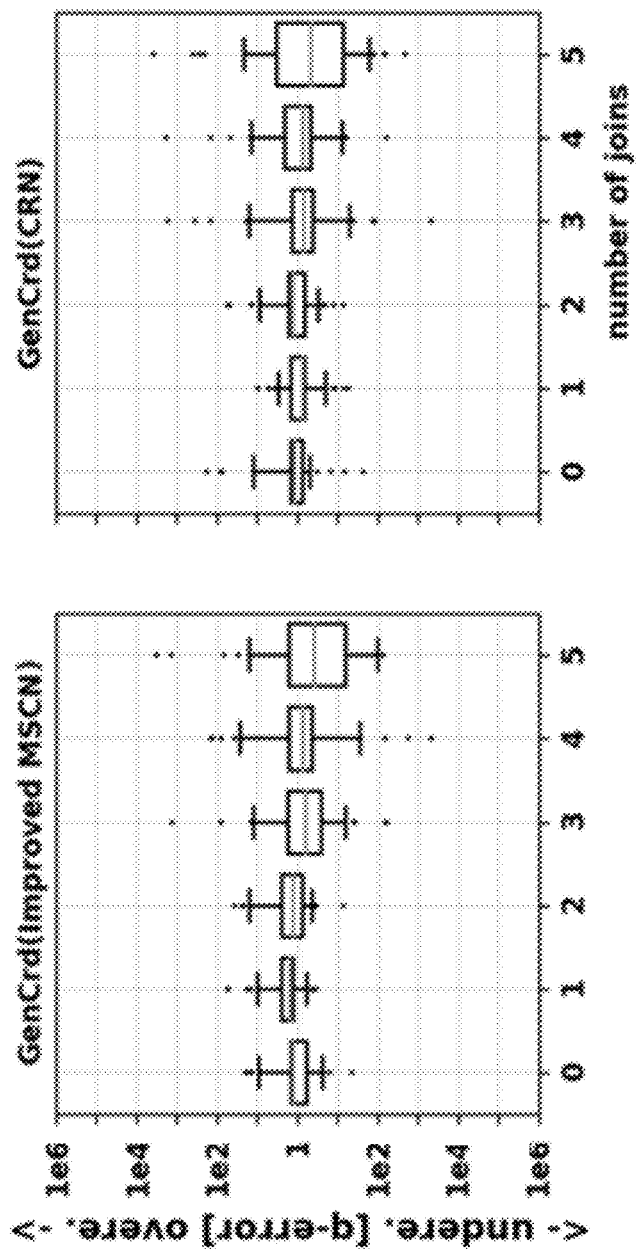

As can be seen in FIGS. 28-28B, queries with 3 joins and more have poorer estimates, as compared with the estimates of queries with zero to two joins. This decline in quality is not directly due to the present GenCrd algorithm. The decline stems from training the MSCN and CRN models over conjunctive queries that have only up to two joins. Thus, when MSCN and CRN are used as the present GenCrd subroutines, DNF-list queries with more joins are estimated not as well by the original MSCN, or CRN, models.

Comparing, over several workloads, q-error results when using a limited model (M), and different workloads (with general queries) q-error results when using the extended model (the present GenCrd(M)), it appears that there is no significant change in the model's overall quality. That is, the present GenCrd maintained the same quality of estimates as the original model's quality of estimates, when M is used as subroutine. The present GenCrd(M) algorithm obtains an estimation for a given query Q by simply summing and subtracting several cardinality estimates, where each of these estimates is obtained using the limited model (M).

Table 30 displays the experimental results over the present GenCrd_test2 workload. All the limited models were initially tailored to estimate cardinalities for conjunctive queries only. Hence, these results highlight the usefulness of the present GenCrd method in extending limited models.

TABLE 30

Cardinality estimation q-errors on the present GenCrd_test2 workload

|  | 50th | 75th | 90th | 95th | 99th | max | mean |
|---|---|---|---|---|---|---|---|
| PostgreSQL | 8.57 | 168 | 3139 | 12378 | 316826 | 647815 | 8811 |
| GenCrd(MSCN) | 4.17 | 84.92 | 1887 | 6769 | 60405 | 278050 | 2611 |
| GenCrd(Impr. Post.) | 2.18 | 10.97 | 82.75 | 286 | 2363 | 162894 | 750 |
| GenCrd(Impr. MSCN) | 2.89 | 8.45 | 27.1 | 73.59 | 537 | 5183 | 38.43 |
| GenCrd(CRN) | 2.26 | 6.03 | 17.49 | 71.17 | 632 | 6025 | 47.24 |

GenCrd Prediction Time

Examining the results of the conducted experiments it was found that the size of the DNF-list does not affect the quality of the estimates. That is, queries with representing DNF-lists of different sizes, are estimated similarly as long as they have the same number of joins (the higher the number of joins is, the worst the results are). However, the DNF-list size directly affects the prediction time. The larger the DNF-list is, the larger the prediction time is, according to the upper bound C(m) formula.

Table 31 depicts the average prediction time in milliseconds, for estimating the cardinality of a single query, when examining different models, with different DNF-list sizes.

The PostgreSQL prediction time is not affected by the size of the DNF-list, since it does not use the present GenCrd.

TABLE 31

Average prediction time of a single query in ms

| | DNF - list size | | | | |
|---|---|---|---|---|---|
| Model | 1 | 2 | 3 | 4 | 5 |
| PostgreSQL | 1.82 | 1.82 | 1.82 | 1.82 | 1.82 |
| GenCrd(MSCN) | 0.25 | 0.6 | 0.87 | 1.25 | 1.78 |
| GenCrd(Imp. Post.) | 75 | 166 | 261 | 374 | 541 |
| GenCrd(Imp. MSCN) | 35 | 77 | 120 | 186 | 254 |
| GenCrd(CRN) | 15 | 33 | 53 | 72 | 105 |

Despite the prediction time increase, time is still in the order of milliseconds. Furthermore, the present GenCrd algorithm can easily be parallelized by estimating the cardinality of all the sub-queries in parallel. I.e., by paralleling all the calls done to the limited model. The estimation times described are based on the sequential version of the present GenCrd.

Estimating set-theoretic cardinalities (i.e., without duplicates), is a fundamental problem in query planning and optimization. Recently suggested NN-based models are very limited. Converting each such model to provide set-theoretic estimates is complex. This invention introduces a uniform way for conversion by introducing a neural network, PUNQ, for providing the ratio between the set-theoretic estimate and the estimate with duplicates.

Another deficiency of recent models is the lack of support for more general queries, i.e., ones employing the AND, OR and NOT operators. To overcome this deficiency without altering existing restricted models (that handle only conjunctive queries), this invention introduces a recursive algorithm, the present GenCrd. the present GenCrd provides estimates for queries employing the AND, OR and NOT operators. the present GenCrd uses existing models, unaltered, as subroutines. This provides a uniform extension of any restricted estimator into one supporting general queries.

For both extensions, providing set-theoretic estimates and estimating richer queries, extensive experimentation are presented. The experiments show that both extensions are accurate and highly practical. Thus, these extension methods are highly promising and practical for solving the cardinality estimation problem.

Interestingly, with the extensions that were presented herein, it was possible to estimate cardinalities of queries with GROUP BY (the cardinality is that of the same query with a modified SELECT CLAUSE, i.e., selecting on DISTINCT grouping attributes).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving a pair of target queries associated with a database, having an identical FROM clause;
applying a trained machine learning (ML) model to the pair of target queries, to estimate a containment rate, representing a percentage of rows in an execution result of a first query of the target pair of queries, that are also included in an execution result of the second query of the target pair of queries, over said database.

2. The method of claim 1, further comprising:
receiving a plurality of pairs of queries associated with the database, wherein the queries in each pair in said plurality of pairs of queries have an identical FROM clause;
at a training stage, training a machine learning model to estimate containment rates between said pairs of queries over said database, on a training set comprising: (i) said plurality of pairs of queries, and (ii) labels associated with containment rates between each of said pairs of queries over said database.

3. The method of claim 2, further comprising generating a vector representation of (i) each query of each of said plurality of pairs of queries and (ii) said target pair of queries, and wherein said training set comprises said vector representations.

4. The method of claim 2, wherein all of said queries in said plurality of pairs of queries and said target pair of queries are conjunctive queries without OR and NOT operators.

5. The method of claim 1, further comprising:
receiving a first cardinality value representing a number of rows of the first query of the target pair of queries over said database; and
determining a second cardinality value, representing a number of rows of the second query of the target pair of queries over said database, based on (i) the containment rate, and (ii) the first cardinality value.

6. The method of claim 1, wherein applying the trained ML model to the pair of target queries comprises:
for each query of the target pair of queries, producing vector set representation comprising: (a) a first set of vectors T, representing tables included in the FROM clause, (b) a second set of vectors J representing join clauses included in the query, and (c) a third set of vectors P, representing predicates included in the query;
calculating a vector representation QVec of each query of the target pair of queries based on the sets of vectors; and
applying the trained ML model on the vector representation QVec of the queries of the target pair of queries.

7. A method comprising:
receiving a target query;
forming an intersection query of said target query and a provided query, wherein said intersection query has a FROM clause identical to that of said target query and said provided query;
applying a cardinality estimation model to said target query and said intersection query, to determine cardinality values of each of said target query and intersection query over a database; and
estimating a containment rate, representing a percentage of rows in an execution result of said target query over said database that are also included in an execution result of said provided query over said database, based on said cardinality values of said target query and said intersection query.

8. A method comprising:
providing a set of queries over a database;
receiving a target query having a specified FROM clause;
selecting, from said set of queries, a query having a FROM clause identical to said specified FROM clause;
providing a cardinality value of said selected query;
applying a containment rate estimation model to estimate (i) a containment rate of said selected query in said target query over said database, and (ii) a containment rate of said target query in said selected query over said database; and
determining a cardinality value of said target query over said database, based on (i), (ii), and said provided cardinality value of said selected query.

9. The method of claim 8, wherein said containment rate estimation model is a machine learning model trained over a training set comprising:
(i) a plurality of pairs of queries associated with a database, wherein the queries in each of said pairs of queries have an identical FROM clause; and
(ii) labels associated with containment rates between each of said pairs of queries over said database.

10. The method of claim 8, wherein said determining does not comprise executing said target query over said database.

11. The method of claim 8, wherein said selecting comprises selecting, from said set of queries, two or more queries having a FROM clause identical to said specified FROM clause, and wherein said applying comprises applying said containment rate estimation model to estimate (i) a containment rate between each of said two or more selected queries and said target query, and (ii) a containment rate between said target query and each of said two or more selected queries.

12. The method for claim 11, wherein said determining comprises determining two or more cardinality values of said target query over said database, using, with respect to each of said two or more selected queries, (i), (ii), and said cardinality value of said selected query.

13. The method of claim 12, further comprising determining a combined cardinality value of said target value based on at least one of: a median value of all of said determined two or more cardinality values, a mean value of all of said determined two or more cardinality values, and a modified mean value of all of said determined two or more cardinality values based on excluding a specified percentage of outlier values from said determined two or more cardinality values.

14. A method comprising
receiving a plurality of queries associated with a database;
at a training stage, training a machine learning model on a training set comprising:
  (i) said plurality of queries, and
  (ii) labels associated with a uniqueness rate of each of said queries over said database; and
at an inference stage, applying said trained machine learning model to a target query to estimate a uniqueness rate, representing a percentage of rows that are unique in an execution result of said target query over said database.

15. The method of claim 14, wherein said target query comprises a DISTINCT keyword.

16. The method of claim 14, wherein said uniqueness rate of said target query represents a proportion of unique result rows in a set of result rows set of an execution of said target query on said database.

17. The method of claim 14, further comprising calculating a set-theoretic cardinality value of said target query based, at least in part, on said uniqueness rate and a known cardinality value of said target query.

* * * * *